US012777109B2

(12) United States Patent
Park et al.

(10) Patent No.: US 12,777,109 B2
(45) Date of Patent: Oct. 27, 2026

(54) HINGE STRUCTURE AND FOLDING ELECTRONIC DEVICE COMPRISING SAME

(71) Applicant: Samsung Electronics Co., Ltd., Suwon-si (KR)

(72) Inventors: Daehyeong Park, Suwon-si (KR); Jongkeun Kim, Suwon-si (KR); Jongyoon Kim, Suwon-si (KR); Hyungsoo Kim, Suwon-si (KR); Soobin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 18/828,442

(22) Filed: Sep. 9, 2024

(65) Prior Publication Data

US 2024/0430348 A1 Dec. 26, 2024

Related U.S. Application Data

(63) Continuation of application No. PCT/KR2022/019075, filed on Nov. 29, 2022.

(30) Foreign Application Priority Data

Mar. 31, 2022 (KR) ........................ 10-2022-0040618
Jun. 16, 2022 (KR) ........................ 10-2022-0073250

(51) Int. Cl.
*H04M 1/02* (2006.01)
*F16C 11/04* (2006.01)

(52) U.S. Cl.
CPC ......... *H04M 1/0216* (2013.01); *F16C 11/045* (2013.01)

(58) Field of Classification Search
CPC ............... H04M 1/0216; H04M 1/022; H04M 1/10268; F16C 11/045; G06F 1/1681
(Continued)

(56) References Cited

U.S. PATENT DOCUMENTS 10,845,850 B1 11/2020 Kang et al.
11,231,754 B2 1/2022 Kang et al.
(Continued)

FOREIGN PATENT DOCUMENTS

CN 111508371 A 8/2020
CN 112911033 A * 6/2021 ............ H04M 1/022
(Continued)

OTHER PUBLICATIONS

International Search Report dated Mar. 23, 2023, issued in International Patent Application No. PCT/KR2022/019075.
(Continued)

*Primary Examiner* — Nathan P Brittingham
(74) *Attorney, Agent, or Firm* — Jefferson IP Law, LLP

(57) ABSTRACT

The disclosure relates to a foldable electronic device and a hinge structure included therein. The foldable electronic device includes a display, a first housing and a second housing, and a hinge housing in which the hinge structure is seated. The hinge structure includes a fixed bracket having a first rail and a second rail, a first rotating member fastened to the first rail, a second rotating member fastened to the second rail, a first link member coupled with a rail structure formed on the first rotating member, a second link member coupled with a rail structure formed on the second rotating member, a first arm member fastened to the first link member, and a second arm member fastened to the second link member. The first arm member includes a seventh rail disposed at a position extending from the fifth rail structure.

15 Claims, 45 Drawing Sheets

(58) Field of Classification Search
USPC .................................................... 455/575.1
See application file for complete search history.

(56) References Cited

U.S. PATENT DOCUMENTS

| | | | | |
|---|---|---|---|---|
| 11,336,759 | B2 | 5/2022 | Liao et al. | |
| 11,516,324 | B2 | 11/2022 | Park et al. | |
| 11,516,931 | B2 | 11/2022 | Kim et al. | |
| 11,543,854 | B2 | 1/2023 | Park et al. | |
| 11,662,781 | B2 | 5/2023 | Kang et al. | |
| 11,726,530 | B2 | 8/2023 | Kang et al. | |
| 11,783,734 | B2 | 10/2023 | Han | |
| 11,846,997 | B2 | 12/2023 | Liao et al. | |
| 2020/0267858 | A1 | 8/2020 | Kim et al. | |
| 2020/0348732 | A1 | 11/2020 | Kang et al. | |
| 2021/0026407 | A1 | 1/2021 | Park et al. | |
| 2021/0041921 | A1* | 2/2021 | Kang | H04M 1/022 |
| 2021/0165466 | A1 | 6/2021 | Kang et al. | |
| 2021/0271294 | A1 | 9/2021 | Liao et al. | |
| 2021/0274028 | A1 | 9/2021 | Park et al. | |
| 2021/0355988 | A1 | 11/2021 | Cheng et al. | |
| 2021/0368032 | A1* | 11/2021 | Liao | G06F 1/1681 |
| 2023/0037466 | A1 | 2/2023 | Park et al. | |
| 2023/0087236 | A1 | 3/2023 | Han | |
| 2023/0152849 | A1 | 5/2023 | Park et al. | |
| 2023/0231941 | A1* | 7/2023 | Jiang | G06F 1/1681 361/679.01 |
| 2023/0251692 | A1 | 8/2023 | Kang et al. | |
| 2023/0359252 | A1 | 11/2023 | Kang et al. | |
| 2025/0071196 | A1* | 2/2025 | Lin | G06F 1/1616 |
| 2025/0130612 | A1* | 4/2025 | Cao | G06F 1/1681 |

FOREIGN PATENT DOCUMENTS

| | | | |
|---|---|---|---|
| CN | 111692196 | B | 10/2021 |
| JP | 2020-27246 | A | 2/2020 |
| KR | 10-2017-0022685 | A | 3/2017 |
| KR | 10-2018-0125650 | A | 11/2018 |
| KR | 10-2019-0097898 | A | 8/2019 |
| KR | 10-2020-0101229 | A | 8/2020 |
| KR | 10-2020-0126524 | A | 11/2020 |
| KR | 10-2021-0068880 | A | 6/2021 |
| KR | 10-2022-0023521 | A | 3/2022 |
| KR | 10-2022-0032914 | A | 3/2022 |
| WO | 2020/186889 | A1 | 9/2020 |
| WO | 2022/010137 | A1 | 1/2022 |

OTHER PUBLICATIONS

Extended European Search Report dated Apr. 26, 2024, issued in European Patent Application No. 22834834.8.

Indian Office Action dated Aug. 27, 2026, issued in Indian Application No. 202417072198.

* cited by examiner

HINGE STRUCTURE AND FOLDING ELECTRONIC DEVICE COMPRISING SAME

CROSS-REFERENCE TO RELATED APPLICATION(S)

This application is a continuation application, claiming priority under § 365(c), of an International application No. PCT/KR2022/019075, filed on Nov. 29, 2022, which is based on and claims the benefit of a Korean patent application number 10-2022-0040618, filed on Mar. 31, 2022, in the Korean Intellectual Property Office, and of a Korean patent application number 10-2022-0073250, filed on Jun. 16, 2022, in the Korean Intellectual Property Office, the disclosure of each of which is incorporated by reference herein in its entirety.

TECHNICAL FIELD

Various embodiments of the disclosure relate to a hinge structure and a foldable electronic device including the same.

BACKGROUND ART

A portable electronic device such as a smartphone may provide a call function and various functions based on various types of applications. In a process of providing the various functions, the portable electronic device may output screens corresponding to the respective functions. A user may want to use a wider screen when using the various functions. However, in a general portable electronic device, the overall size may be increased when a display device is enlarged to display a screen, and therefore portability may be deteriorated. Accordingly, a foldable portable electronic device is provided so as to increase the size of a screen while maintaining portability.

DETAILED DESCRIPTION OF THE INVENTION

Technical Problem

Technical Solution

A foldable electronic device (or, a portable electronic device, a portable communication device, a foldable electronic device, or a foldable electronic device having a communication function) according to various embodiments of the disclosure includes a display, a first housing and a second housing in which at least a portion of the display is accommodated, a hinge structure that connects the first housing and the second housing, and a hinge housing in which the hinge structure is seated. The hinge housing further supports the hinge structure so that the foldable electronic device can more stably and durably function for numerous times of folding actions of the device. The hinge structure according to an embodiment of the disclosure includes a fixed bracket that is fixed to the hinge housing and that includes a first rail and a second rail. A fixed bracket provides the supporting point for the various components of the hinge structure so that the overall folding and unfolding motion can work more stably. The hinge structure further includes a first rotating member including a first rail structure inserted into the first rail and a second rail structure that extends from the first rail structure, a second rotating member including a third rail structure inserted into the second rail and a fourth rail structure that extends from the third rail structure. Each of first and second rotating members supports the stable folding motion for the electronic device. The hinge structure further includes a first link member including a portion coupled with the first housing and a third rail coupled with the second rail structure, a second link member that is coupled with the second housing and that includes a fourth rail coupled with the fourth rail structure. Each of first and second link members supports the first and second housing so that it enhances durability of each housings. Furthermore, in combination with the rails and rail members, first and second link members enables the first region and the second region of display become flat in the folded state. The hinge structure further includes a first arm member including a fifth rail structure fastened with a fifth rail disposed adjacent to the third rail of the first link member, and a second arm member including a sixth rail structure fastened with a sixth rail disposed adjacent to the fourth rail of the second link member. The first arm member according to an embodiment of the disclosure includes a seventh rail disposed at a position extending from the fifth rail structure, and the second arm member includes an eighth rail disposed at a position extending from the sixth rail structure. Those various rail structures enhances the softer and smoother performance of the folding action by using the rail included in the each arm members.

Advantageous Effects of the Invention

BEST MODE

Hereinafter, various embodiments of the disclosure will be described with reference to the accompanying drawings.

An embodiment of the disclosure to be described below provides a hinge structure for reducing stress in a folding region of a display by operating the hinge structure used to fold the display with respect to four axes and forming the folding region of the display in a water-drop shape (or, a dumbbell shape) to which the gravity having a predetermined magnitude is applied, and a foldable electronic device including the hinge structure.

Furthermore, an embodiment of the disclosure provides a hinge structure for reducing infiltration of foreign matter by protecting a folding region of a display using a smaller space and firmly maintaining a close contact state in a folded state of housings supporting the display by optimizing the size of the dumbbell-shaped folding region of the display, and a foldable electronic device including the hinge structure.

In addition, an embodiment of the disclosure provides a hinge structure having a property of being robust to an external impact by implementing a more stable dumbbell-shaped folding region, and a foldable electronic device including the hinge structure.

Other aspects according to embodiments of the disclosure will be mentioned as needed in a process of describing the embodiments.

A hinge structure and a foldable electronic device including the same according to an embodiment to be described below support folding the foldable electronic device with a parallel gap in a dumbbell-type folding structure.

Furthermore, various embodiments of the disclosure may reduce stress acting stress acting on a display by using a dumbbell-type structure.

Moreover, various embodiments of the disclosure may reduce infiltration of foreign matter into the foldable electronic device with the parallel gap and may provide a property of being robust to an external impact.

In addition, various embodiments of the disclosure may secure an arrangement space in the electronic device by using the dumbbell-type structure.

Various other aspects and effects provided by the hinge structure and the electronic device including the same according to the various embodiments may be mentioned depending on embodiments in the detailed description of the disclosure.

Figure 1:
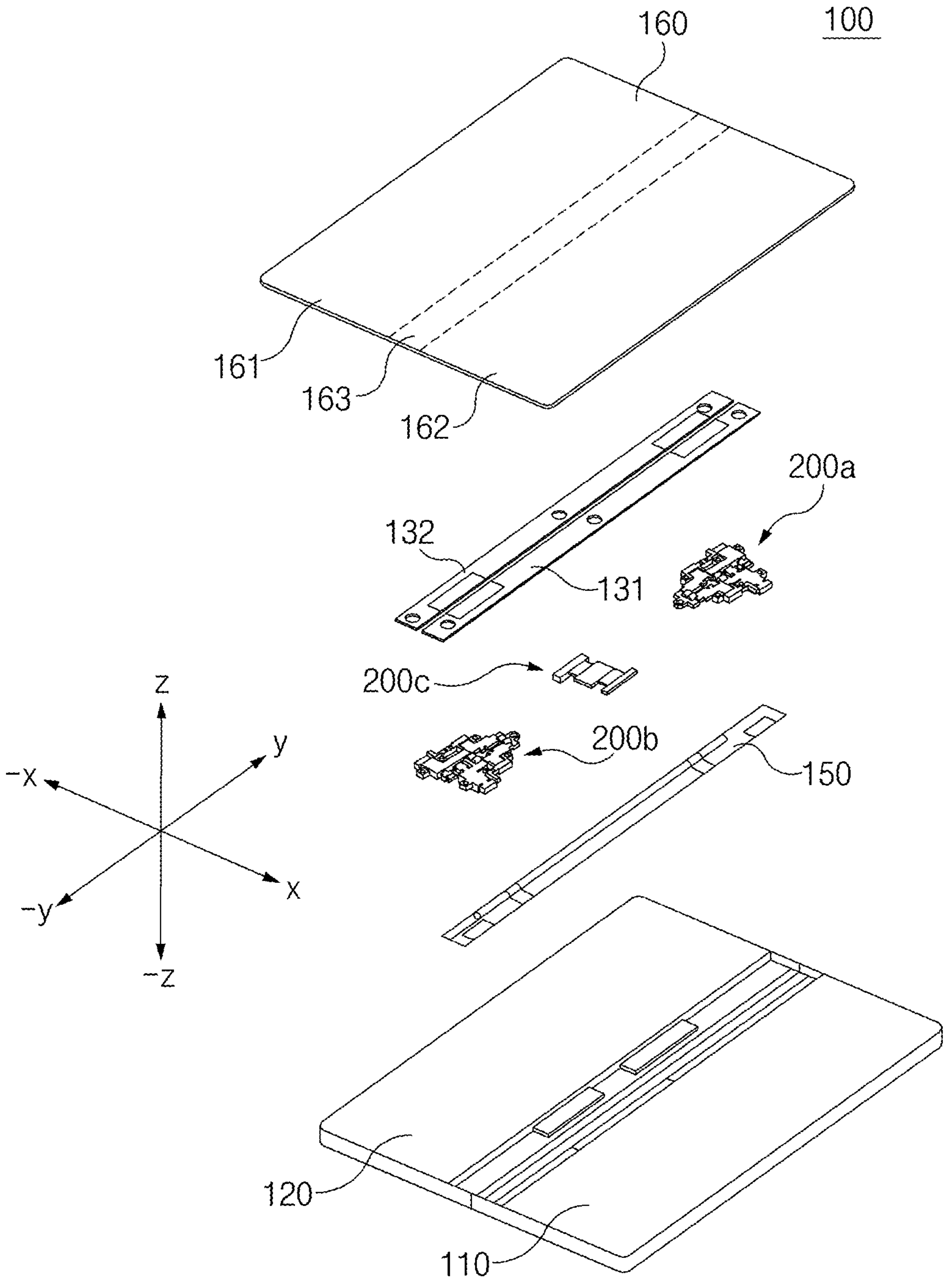
FIG. 1 is an exploded perspective view of an electronic device according to an embodiment.

FIG. 1 is an exploded perspective view of an electronic device according to an embodiment.

Referring to FIG. 1, the electronic device 100 according to an embodiment (or, a folding-type electronic device, a portable electronic device, a portable communication device, a foldable electronic device, or a portable device) includes a first housing 110, a second housing 120, a hinge housing 150, a display 160, and one or more hinge structures 200*a*, 200*b*, and 200*c*. When the electronic device 100 is in a folded state, a folding region of the display 160 may be formed in a water-drop shape (or, a water-drop shape or a dumbbell shape to which the gravity is applied), and thus the electronic device 100 may support securing folding R (curvature) such that a crack or buckling does not occur in the folding region of the display 160. Furthermore, when the electronic device 100 is in the folded state, the folding region of the display having a dumbbell shape may be disposed in a predetermined space of the housings 110 and 120, and thus a clearance between the housings 110 and 120 disposed in the shape of "11" may be reduced. Accordingly, a gap between the housings 110 and 120 of the electronic device 100 may be reduced, and a reduction in the overall size of the electronic device 100 and interruption or reduction of infiltration of foreign matter between the housings 110 and 120 may be achieved.

The first housing 110 is connected with the second housing 120 through the one or more hinge structures 200*a*, 200*b*, and 200*c*. The first housing 110 may include a bottom region on which the display 160 is seated and a sidewall or a separately provided frame that is disposed at an edge of the bottom region and that surrounds a border of the display 160 or an edge of a region on which the display 160 is seated. In addition, a back cover may be disposed on a rear surface of the first housing 110. Here, the back cover may be omitted. At least a portion of the first housing 110 may be attached with a first region 161 of the display 160. Alternatively, a portion of an edge of a front surface of the first housing 110 may be attached with at least a portion of an edge of the first region 161 of the display 160. In this regard, an adhesive layer may be disposed between the front surface of the first housing 110 and the first region 161 of the display 160.

At least a portion of the inside of the first housing 110 may be provided in a hollow form. At least one of at least one circuit board, at least one battery, or at least one camera module may be disposed in the first housing 110. The circuit board and the battery disposed in the first housing 110 may be electrically connected with at least one circuit board and at least one battery disposed in the second housing 120 through a flexible circuit board (not illustrated). For example, the flexible circuit board (not illustrated) may extend from a partial region of the first housing 110 to a partial region of the second housing 120 across the hinge housing 150. A partial region of the flexible circuit board (not illustrated) may be located in the hinge housing 150. For example, a processor and a memory may be disposed on the circuit board disposed in the first housing 110.

At least a portion of the first housing 110 may be formed of a metallic material, or at least a portion of the first housing 110 may be formed of a non-metallic material. To support at least a portion of the display 160, the first housing 110 may be formed of a material having a predetermined stiffness. In an embodiment, a portion of the first housing 110 that faces the second housing 120 may include a depression, at least a portion of which is recessed such that the hinge housing 150 is disposed therein when the electronic device 100 is in an unfolded state.

The first housing 110 may be connected to the one or more hinge structures 200*a*, 200*b*, and 200*c* and may be rotated in the clockwise or counterclockwise direction by external pressure applied from the outside to move from any point rather than 0 between the −x-axis and the x-axis to any point between the z-axis and the −z-axis. In the folded state of the electronic device 100, the first housing 110 may be disposed parallel to the z-axis, or may be disposed parallel to the second housing 120. While the first housing 110 is disposed parallel to the second housing 120, at least a part of three borders (or, edges) of the first housing 110 (e.g., the remaining borders other than the border adjacent to the second housing 120 in the unfolded state of the electronic device) may be disposed to make contact with three borders of the second housing 120 (e.g., the remaining borders other than the border adjacent to the first housing 110 in the unfolded state of the electronic device 100).

The second housing 120 may be connected with the first housing 110 through the one or more hinge structures 200*a*, 200*b*, and 200*c*. The second housing 120 may include a front surface on which at least a portion (e.g., a second region 162) of the display 160 is seated and a frame that surrounds the front surface or a border of at least a portion of the second region 162 of the display 160. At least a portion of the second housing 120 may be attached with the second region 162 of the display 160. Alternatively, a portion of an edge of the front surface of the second housing 120 may be attached with an edge of the second region 162 of the display 160. In this regard, an adhesive layer may be disposed between the front surface of the second housing 120 and the second region 162 of the display 160.

Similarly to the first housing 110, the second housing 120 may have an empty space formed in at least a portion thereof. At least one circuit board and at least one battery may be disposed in the second housing 120. Alternatively, at least one battery may be disposed in one of the first housing 110 and the second housing 120, or may be disposed in both the first housing 110 and the second housing 120. At least one of the printed circuit board or the battery disposed in the second housing 120 may be electrically connected with a component (e.g., at least one of the printed circuit board or the battery) disposed in the first housing 110 through the flexible circuit board.

Similarly to the first housing 110, at least a portion of the second housing 120 may be formed of a metallic material, or at least a portion of the second housing 120 may be formed of a non-metallic material. To support at least a portion of the display 160, the second housing 120 may be formed of a material having a predetermined stiffness. In an embodiment, a portion of the second housing 120 that faces the first housing 110 (or, a portion adjacent to the first housing 110) may include a depression (e.g., a recess portion), at least a portion of which is recessed such that the hinge housing 150 is disposed therein when the electronic device 100 is in the unfolded state. The depression of the second housing 120 may be disposed adjacent to the depression of the first housing 110. A back cover may be disposed on a rear surface of the second housing 120. Here, the back cover may be omitted.

When the electronic device 100 is in the unfolded state, at least a portion of the hinge housing 150 may be disposed in the depressions formed on the portions of the first housing 110 and the second housing 120 that face each other or are adjacent to each other. The hinge housing 150 may be provided in a form extending longer in the y-axis direction that in the x-axis direction as a whole. However, the disclosure is not limited thereto, and the hinge housing 150 may have a form longer in the x-axis direction than in the y-axis direction depending on the type of the electronic device 100. A structure (e.g., a boss or a hook) for fixing the one or more hinge structures 200*a*, 200*b*, and 200*c* may be disposed on a partial region of an inner surface of the hinge housing 150.

At least a portion of the display 160 may have flexibility. For example, the display 160 may include the first region 161 at least partially disposed on the first housing 110, the second region 162 at least partially disposed on the second housing 120, and a third region 163 (or, a bending region or a folding region) located between the first region 161 and the second region 162.

When the electronic device 100 is in the folded or unfolded state, at least portions of the first region 161 and the second region 162 may be disposed in a flat state, and when the electronic device 100 is in the folded state, at least a portion of the third region 163 may have a bent state. For example, the first region 161 and the second region 162 may remain in a planar state regardless of a state of the electronic device 100 (the positions of flat surfaces being changed), and the third region 163 may be deformed into a bent state or a flat state depending on a state of the electronic device 100. For example, when the electronic device 100 is in the unfolded state, the third region 163 may have a planar state (or, a flat state), and when the electronic device 100 is in the folded state, at least a portion of the third region 163 may have a curved state (or, a bent state).

The display 160 may include various layers. For example, the display 160 may include an outer protective layer (or, a glass layer or a polymer layer) having a predetermined transparency and a specified size, a display panel layer that is disposed under the outer protective layer and that displays a screen, or at least one first back layer disposed under the display panel layer. The first back layer (or, a back panel or a back portion) may include at least one of an impact absorbing layer (or, an embo) or a heat radiating layer (or, a metal sheet layer). Additionally or alternatively, the first back layer may further include an electromagnetic induction panel (e.g., a digitizer). The display 160 may further include a second back layer disposed under the first back layer. The second back layer (or, a back panel or a back portion) may include at least one metal layer (or, metal sheet), at least a portion of which is formed of a metallic material. The second back layer may include a specified pattern (e.g., a lattice pattern or a slit pattern) such that at least a portion thereof can be bent. Alternatively, at least a portion of the second back layer may be formed of another bendable material (e.g., a polymer material, rubber, or a leather material). At least one of the first back layer or the second back layer may be omitted.

The one or more hinge structures 200*a*, 200*b*, and 200*c* may be disposed in the hinge housing 150, and at least some hinge structures (e.g., 200*a* and 200*b*) among the plurality of hinge structures 200*a*, 200*b*, and 200*c* may have similar structures and forms. The structure in which the two hinge structures 200*a* and 200*b* (or, interlocking hinge structures) having similar forms and the hinge structure 200*c* (or, a non-interlocking hinge structure) having a different form are disposed in the hinge housing 150 has been described as an example with reference to FIG. 1. However, the disclosure is not limited thereto, and three or more hinge structures 200*a* and 200*b* having similar forms may be disposed, the hinge structure 200*c* having a different form may be omitted, or two or more hinge structures 200*c* may be mounted in the hinge housing 150. Some hinge structures 200*a* and 200*b* among the one or more hinge structures 200*a*, 200*b*, and 200*c* may perform a hinge operation based on eight axes (or, virtual axes) to allow the third region 163 of the display 160 to form a dumbbell shape.

The foldable electronic device 100 may include wing plates 131 and 132 (or, plates). The wing plates 131 and 132 may be coupled with the one or more hinge structures 200*a*, 200*b*, and 200*c* and may be disposed to cover surfaces of the one or more hinge structures 200*a*, 200*b*, and 200*c* facing in the z-axis direction when the electronic device 100 is in the unfolded state. The wing plates 131 and 132 may be provided in a form separated from the housings 110 and 120. Accordingly, gaps may be formed between the wing plates 131 and 132 and the housings 110 and 120. The wing plates 131 and 132 may be disposed to correspond to at least a portion of a lower surface (e.g., a surface facing in the −z-axis direction) of the third region 163 of the display 160. The wing plates 131 and 132 may rotate in the clockwise or counterclockwise direction depending on hinge operations of the one or more hinge structures 200*a*, 200*b*, and 200*c*. For example, while the first wing plate 131 rotates in the counterclockwise direction, the second wing plate 132 may rotate in the clockwise direction, and while the first wing plate 131 rotates in the clockwise direction, the second wing plate 132 may rotate in the counterclockwise direction. The first wing plate 131 may support a flat first surface of the third region 163 of the display 160 that is folded in a dumbbell shape, and the second wing plate 132 may support a flat second surface (a surface symmetrical to the first surface with respect to the z-axis) of the third region 163 of the display 160 that is folded in a dumbbell shape.

Figure 2:
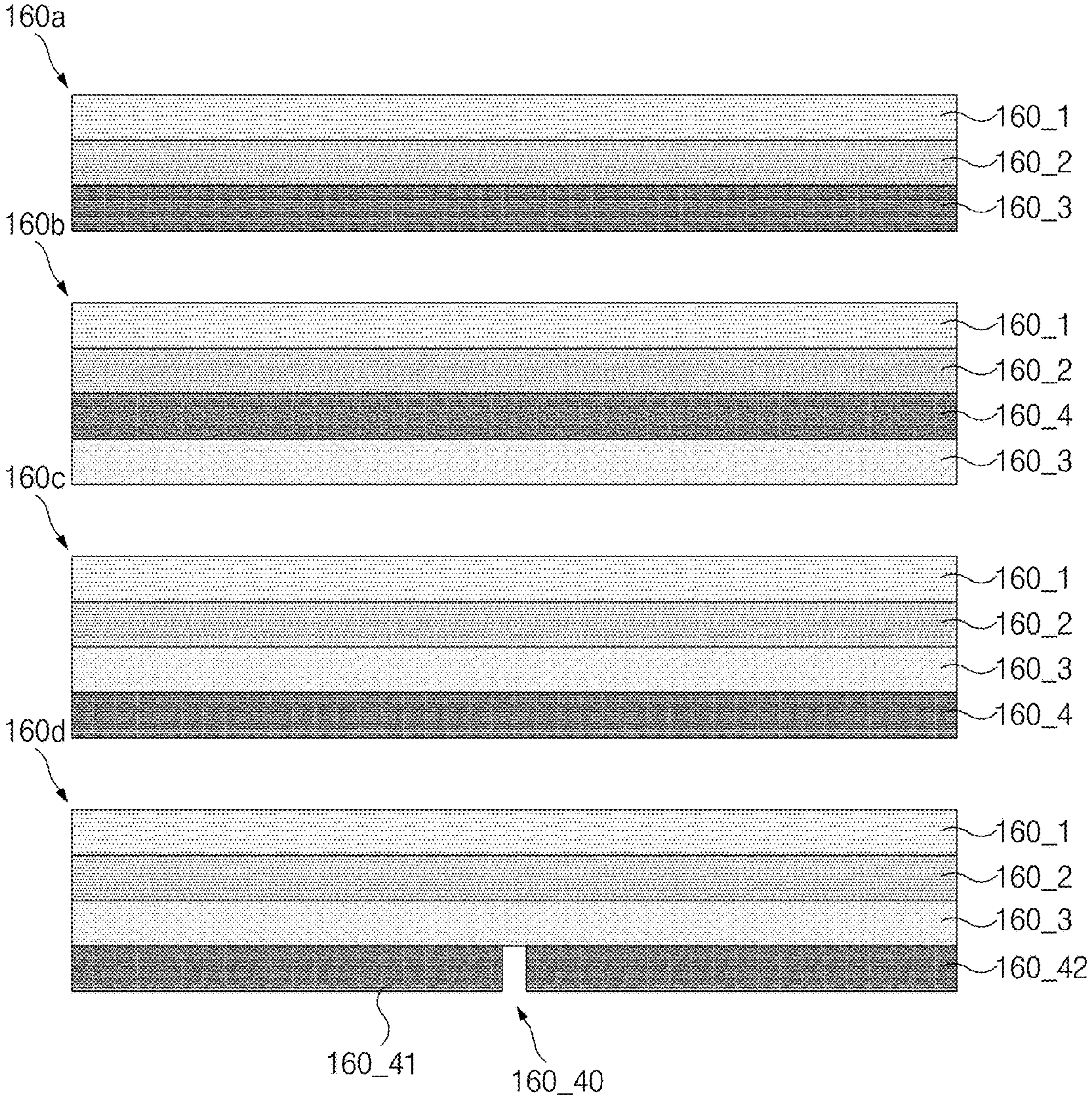
FIG. 2 is a view illustrating examples of a display structure of the electronic device according to an embodiment.

FIG. 2 is a view illustrating examples of a display structure of the electronic device according to an embodiment.

Referring to FIGS. 1 and 2, one of various types of displays to be described with reference to FIG. 2 may be applied to the display 160 of the electronic device 100 described with reference to FIG. 1 (or, at least one of electronic devices to be described below). The various types of displays may include, for example, one of a first type display 160*a* including three layers (e.g., a front protective layer 160_1, a panel layer 160_2, and a panel protection layer 160_3) and second to fourth type displays 160*b*, 160*c*, and 160*d* including four layers (e.g., the front protective layer 160_1, the panel layer 160_2, a pen input layer 160_4, and the panel protection layer 160_3). In the first to fourth type displays 160*a*, 160*b*, 160*c*, and 160*d*, the front protective layer 160_1 may be formed such that at least a portion is transparent and may be disposed on an upper surface of the panel layer 160_2 to reduce or prevent damage to the panel layer 160_2 by external pressure or force. The front protective layer 160_1 may be formed of at least one material among various materials such as glass, reinforced glass, transparent plastic, and a polymer. The panel layer 160_2 may include a plurality of pixels disposed therein, and at least some of the plurality of pixels may be disposed in a matrix form and implements a screen using power supplied from a power supply (e.g., a battery).

The panel layer 160_2 may further include a touch layer capable of recognizing a touch of a user. The panel protection layer 160_3 is disposed under the panel layer 160_2 and protects the panel layer 160_2. The panel protection layer 160_3 may include, for example, at least one of an impact absorbing layer (or, an embo) or at least one heat radiating layer (or, at least one metal sheet layer). For example, in a case in which the panel protection layer 160_3 (or, a support layer) includes a metal layer, at least a portion of the metal layer may be formed of at least one of SUS or copper. At least a portion of the panel protection layer 160_3 may include a lattice pattern region (e.g., 163*a*, 163*b*, and 163*c*). Alternatively, a portion of the panel protection layer 160_3 disposed under the third region 163 of the display 160 may include the lattice pattern region (e.g., 163*a*, 163*b*, and 163*c*).

The second type display 160*b* and the third type display 160*c* exemplify forms that differ from each other in terms of the sequence in which the pen input layer 160_4 (or, digitizer-integrated) and the panel protection layer 160_3 are arranged. In addition, in a case in which the panel protection layer 160_3 includes an impact absorbing layer and at least one metal layer, the pen input layer 160_4 may be disposed between the impact absorbing layer and the metal layer. The fourth type display 160*d* exemplifies a form in which the pen input layer is divided. For example, the fourth type display 160*d* may include a first pen input layer 160_41 and a second pen input layer 160_42 separated from the first pen input layer 160_41, and a gap 160_40 may be formed between the first pen input layer 160_4 and the second pen input layer 160_4. The gap 160_40 may be disposed under the third region 163 of the display 160. In the above-described first to fourth type displays 160*a*, 160*b*, 160*c*, and 160*d*, the remaining layers other than the panel layer 160_2 may be selectively omitted.

Figure 3:
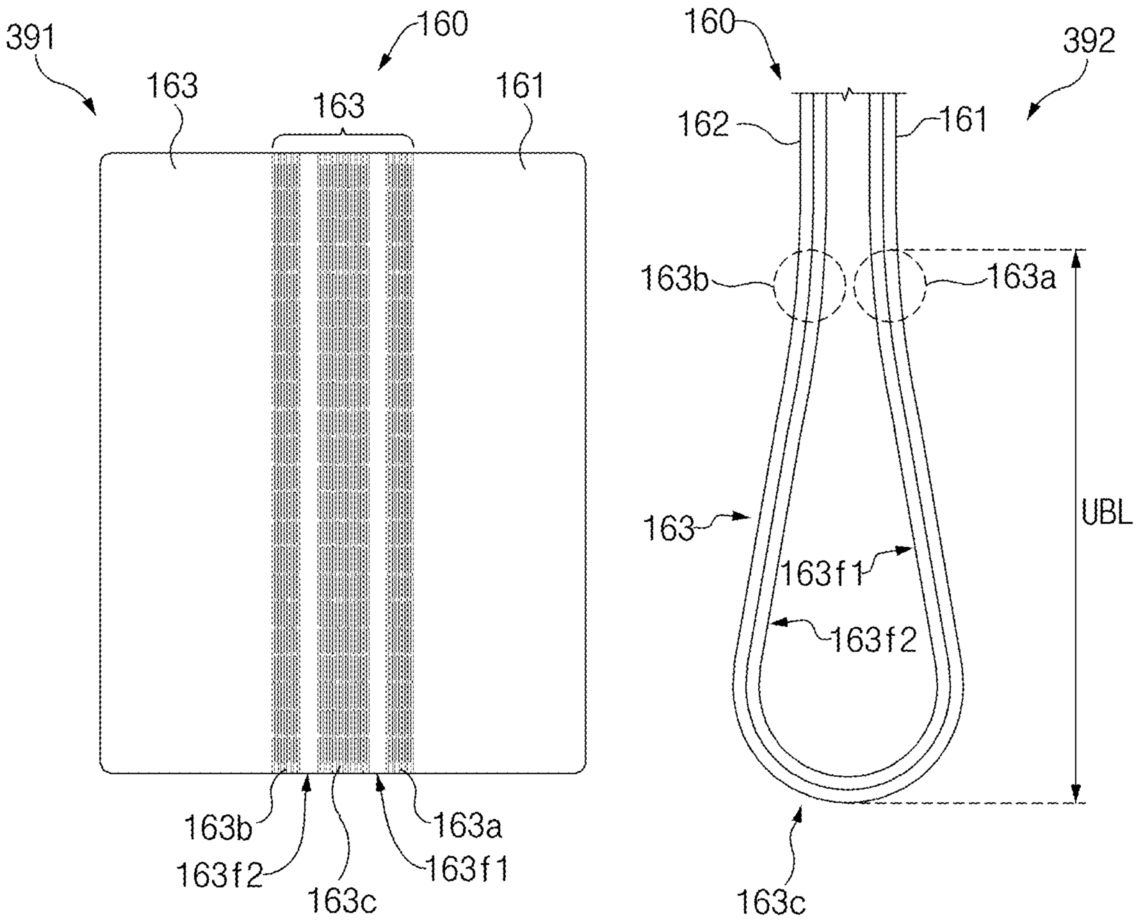
FIG. 3 is a view illustrating one example of a folded form of a display of the electronic device according to an embodiment.

FIG. 3 is a view illustrating one example of a folded form of the display of the electronic device according to an embodiment. In FIG. 3, FIG. 391 illustrates a state in which the display of the electronic device is unfolded, and FIG. 392 illustrates a state in which the display of the electronic device is folded. In addition, lattice regions 163*a*, 163*b*, and 163*c* illustrated in FIG. 391 are for convenience of description, and in a case in which the display is placed on the lattice regions 163*a*, 163*b*, and 163*c*, the corresponding lattice regions 163*a*, 163*b*, and 163*c* may not be observed from the front. Furthermore, even in FIG. 392, for convenience of description, the regions 161, 162, 163 of the display 160 are indicated, and a structure represented by double layers in FIG. 392 may mean a panel layer (e.g., the panel layer 160_2 of FIG. 2, a layer located inside) and a support layer or a support substrate (e.g., the panel protection layer 160_3 of FIG. 2) (e.g., a layer located outside) that supports the panel layer and in which the lattice regions 163*a*, 163*b*, and 163*c* are formed.

Referring to FIGS. 1 to 3, the display 160 of the electronic device 100 may include the first region 161 (or, the first portion or the first position), the second region 162 (or, the second portion or the second position), and the third region 163 (or, the third portion, the third position, or the folding region). The first to third regions 161, 162, and 163 may be connected with each other. The third region 163 is disposed between the first region 161 and the second region 162. Accordingly, one side of the third region 163 (e.g., a left edge with respect to the illustrated drawing) is connected with a right edge of the first region 161, and an opposite side of the third region 163 (e.g., a right edge with respect to the illustrated drawing) is connected with a left edge of the second region 162. Based on the vertical direction of the illustrated drawing, the first region 161, the second region 162, and the third region 163 may have the same length. Based on the horizontal direction of the illustrated drawing, the widths of the first region 161 and the second region 162 may be formed to be the same as, or similar to, each other. The third region 163 may have a width that is the same as or similar to the width of the first region 161 or the second region 162, or may have a width that is shorter than the width of the first region 161 or the second region 162. The division of the first to third regions 161, 162, and 163 may be applied to each or at least one of the various types of displays described above with reference to FIG. 2.

The third region 163 may be a folded region when the electronic device 100 is in the folded state. A lattice pattern or a lattice pattern region (e.g., 163*a*, 163*b*, and 163*c*) may be formed in all or part of a panel protection layer (e.g., the panel protection layer 160_2) disposed under the third region 163. Referring to the illustrated drawing, the third region 163 may form a water-drop shape that is fallen by the gravity in a direction from an upper side to a lower side based on the illustrated drawing. In this regard, the third region 163 includes the convex region 163*c* (or, the first lattice pattern region 163*c*) that is convex in a lower direction, flat regions 163*f*1 and 163*f*2 extending from opposite sides of the convex region 163*c* to the boundaries (or, edges) of the first region 161 and the second region 162, and the bent regions 163*a* and 163*b* formed between the flat regions 163*f*1 and 163*f*2, the third region 163, the first region 161, and the second region 162 (regions having a reverse curvature when viewed in the direction in which the convex region 163*c* is bent, the second lattice pattern region 163*a* and the third lattice pattern region 163*b*). The bent regions 163*a* and 163*b* may have a curvature in a direction different from (or, opposite to) the direction in which the convex region 163*c* is convex. The length UBL of the folding portion (or, the third region 163 or the folding region) of the display 160 may include a length from the bent regions 163*a* and 163*b* to an end point of the convex region 163*c* (the lowermost point of the convex region 163*c*). The length UBL of the folding portion may affect the widths of the wing plates 131 and 132 and the sizes of the depressions of the first housing 110 and the second housing 120 described with reference to FIG. 1.

The direction in which the lattice pattern corresponding to the convex region 163*c* (or, the first lattice pattern region 163*c*) is bent may differ from the directions in which the lattice patterns corresponding to the bent regions 163*a* and 163*b* (or, the second lattice pattern region 163*a* and the third lattice pattern region 163*b*) are bent. For example, the convex region 163*c* may be bent in a rear direction from the region of the display 160 on which a screen is displayed, and the bent regions 163*a* and 163*b* may be bent from the rear direction to the direction toward the surface of the display 160 on which the screen is displayed. A lattice pattern may be omitted in the panel protection layer (e.g., the panel protection layer 160_2) corresponding to the flat regions 163*f*1 and 163*f*2.

The lattice patterns formed in the bent regions 163*a* and 163*b* and the lattice pattern formed in the convex region 163*c* may have the same or similar form. For example, the lattice patterns formed in the bent regions 163*a* and 163*b* may include at least one of a half etching type (e.g., a type in which grooves are formed in a predetermined pattern on a surface of a metal layer) or an etching hole type (e.g., a type in which a plurality of holes or empty spaces penetrating front and rear surfaces of a metal layer are arranged in a predetermined pattern). Alternatively, some of the lattice patterns of the bent regions 163*a* and 163*b* may be formed in a half etching type, and the others may be formed in an etching hole type. In another example, in a case in which the panel protection layer 160_3 includes a material having ductility greater than or equal to a specified magnitude (e.g., carbon fiber reinforced plastics (CFRP) or glass fiber reinforced plastics (GFRP)), an etching shape may be omitted. As the lattice pattern of the convex region 163*c* has a relatively higher curvature than the bent regions 163*a* and 163*b*, a lattice pattern different from the bent regions 163*a* and 163*b* may be formed to take a more flexible shape. For example, at least one of an etching size or an etching depth of the lattice pattern of the convex region 163*c* may be larger than those of the bent regions 163*a* and 163*b*, and a gap between patterns (e.g., grooves or holes) may be smaller than those of the bent regions 163*a* and 163*b*.

Figure 4:
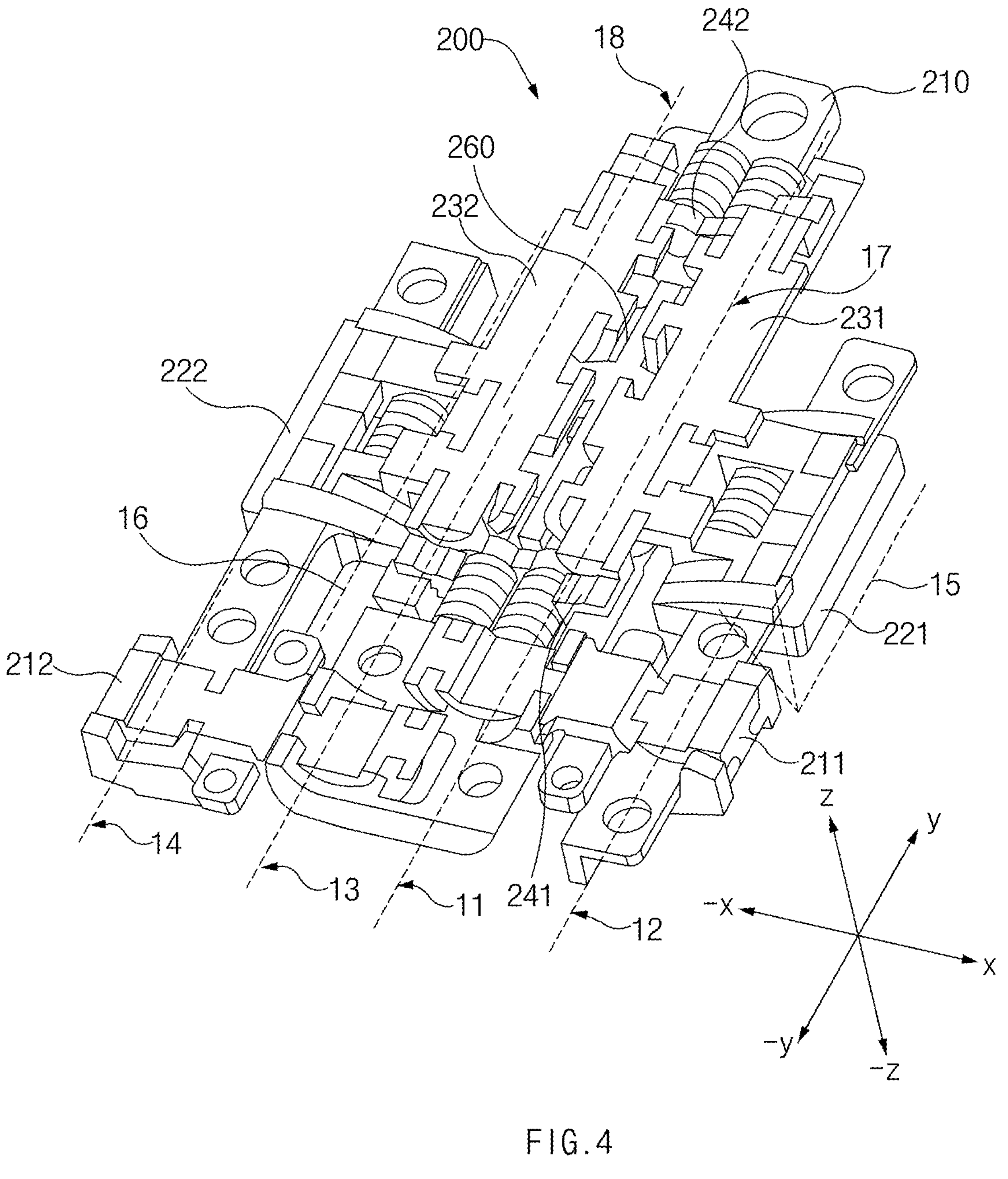
FIG. 4 is a view illustrating one example of a first type hinge structure according to an embodiment.
Figure 5:
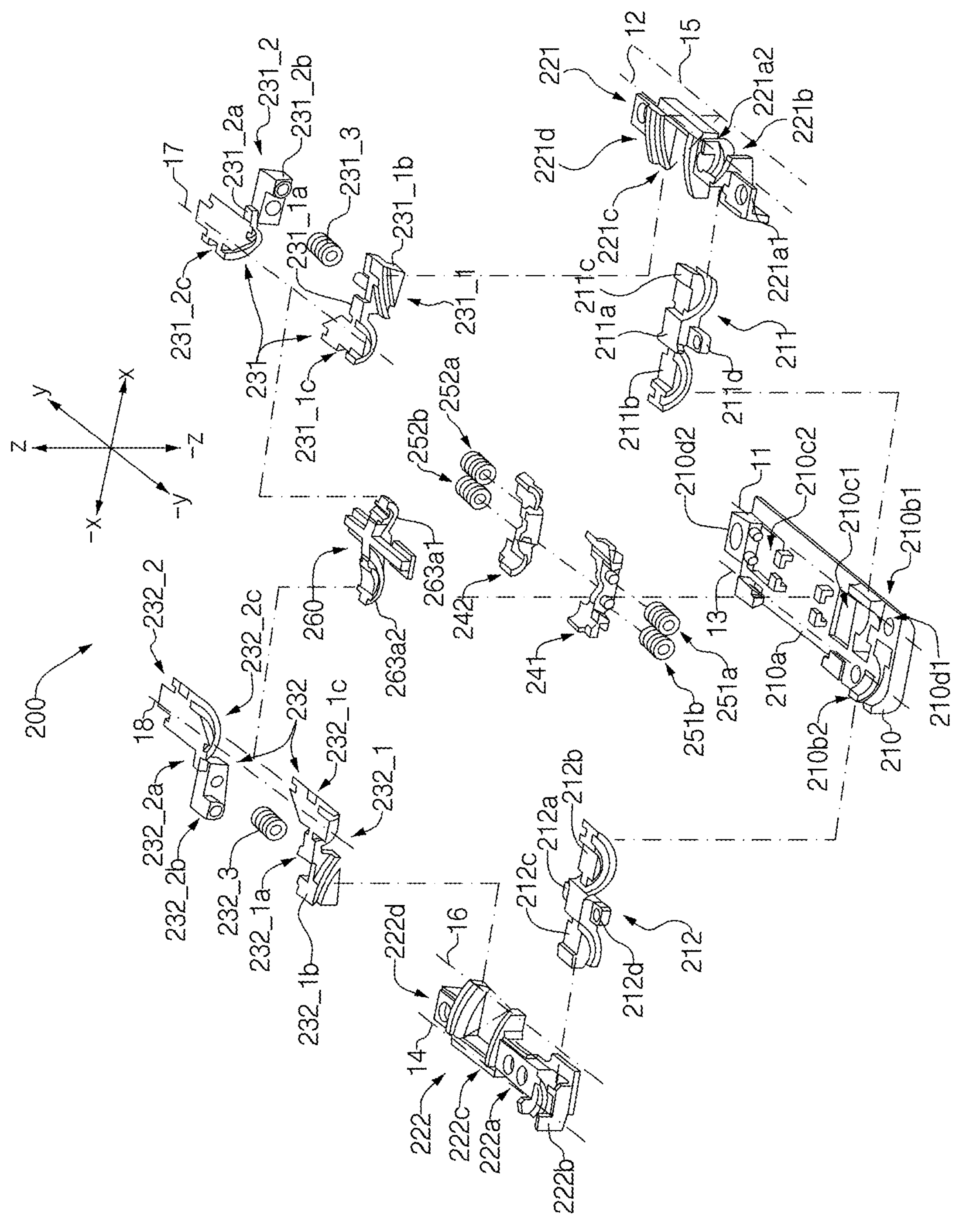
FIG. 5 is an exploded perspective view of the first type hinge structure according to an embodiment as viewed in a first direction.
Figure 6:
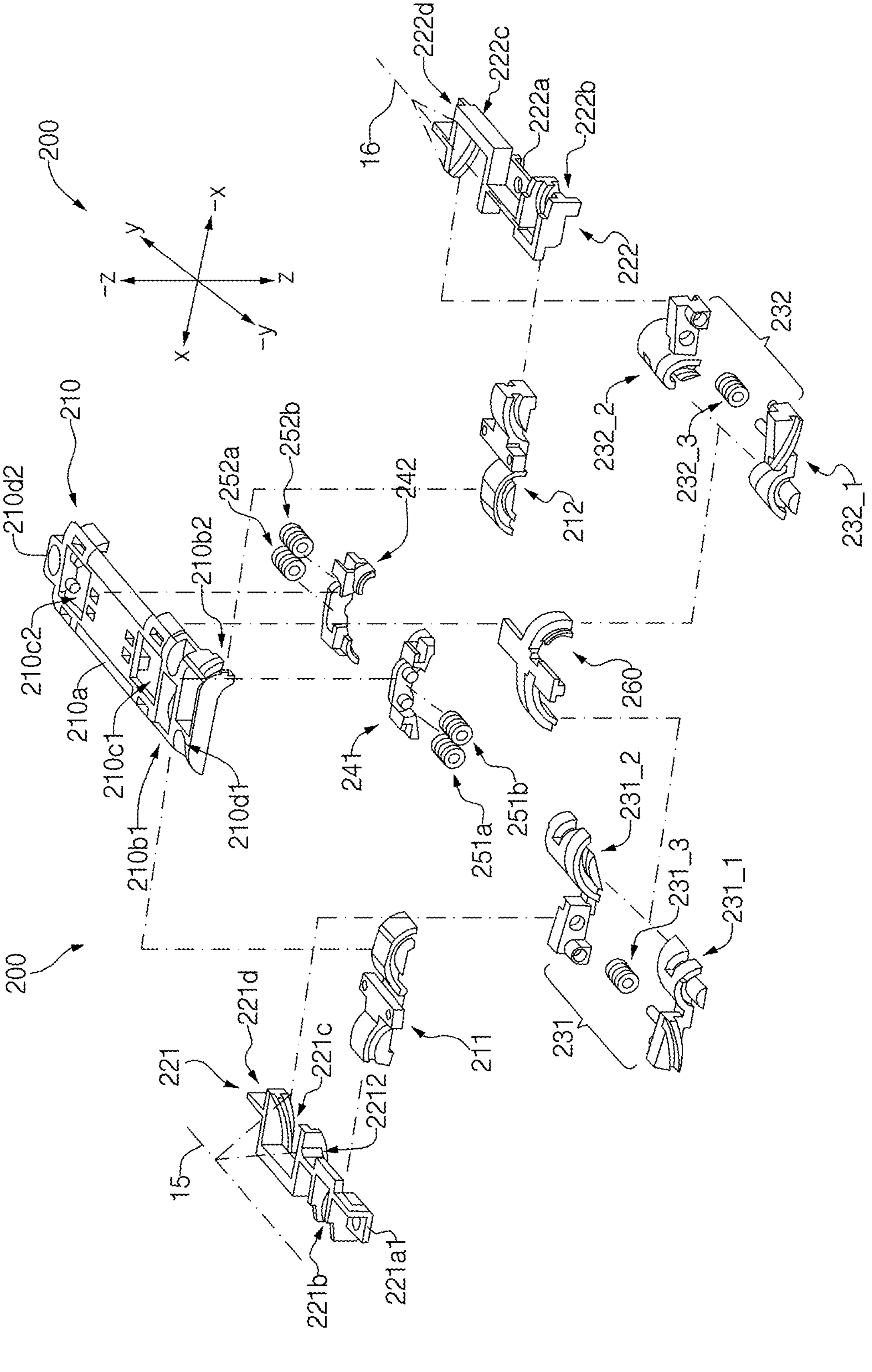
FIG. 6 is an exploded perspective view of the first type hinge structure according to an embodiment as viewed in a second direction.

FIG. 4 is a view illustrating one example of a first type hinge structure according to an embodiment, FIG. 5 is an exploded perspective view of the first type hinge structure according to an embodiment as viewed in a first direction, and FIG. 6 is an exploded perspective view of the first type hinge structure according to an embodiment as viewed in a second direction.

Referring to FIGS. 1 to 6, the first type hinge structure 200 may be at least one of the hinge structures 200*a* and 200*b* described above with reference to FIG. 1. The first type hinge structure 200 includes a fixed bracket 210 (or, a bracket or a center bracket), a first rotating member 211 (or, a first rotating structure or a first rotating body), a second rotating member 212 (or, a second rotating structure or a second rotating body), a first link member 221 (or, a first slide link, a first rotation support structure, or a first link rotation member), a second link member 222 (or, a second slide link, a second rotation support structure, or a second link rotation member), a first arm member 231 (or, a first arm structure or a first arm), a second arm member 232 (or, a second arm structure or a second arm). The first type hinge structure 200 may further include a first cam member 241 (or, a first cam or a first cam structure), a second cam member 242 (or, a second cam or a second cam structure), and an interlocking member 260 (or, a link member, a link interlocking member, an arm interlocking member, or a motion conversion structure).

At least a portion of the fixed bracket 210 may be seated on and fixed to one side of the hinge housing 150. For example, the fixed bracket 210 may be fixed to at least one of a −y-axis edge or a y-axis edge of the hinge housing 150. The fixed bracket 210 includes a structure (e.g., a first rail 210*b*1 and a second rail 210*b*2) to which a portion of the first rotating member 211 (e.g., a first rail structure 211*b* or a first rail structure of the first rotating member) and a portion of the second rotating member 212 (e.g., a third rail structure 212*b* or a first rail structure of the second rotating member) are rotatably fastened.

The first rail 210*b*1 of the fixed bracket 210 forms a virtual axis (e.g., a first axis 11, a first virtual axis, or a first fixed axis) about which the first rail structure 211*b* is able to rotate in place while rotating. A portion of an opposite side of the first rotating member 211 (e.g., a second rail structure 211*c* or a second rail structure of the first rotating member) may rotate or curvedly slide with respect to a second axis 12 (or, a second virtual axis or a first moving axis) different from the first axis 11. The second rail 210*b*2 forms a virtual axis (e.g., a third axis 13, a third virtual axis, or a second fixed axis) about which the second rail structure 211*c* is able to rotate in place while rotating. A portion of an opposite side of the second rotating member 212 (e.g., a fourth rail structure 212*c* or a second rail structure of the second rotating member) may rotate or curvedly slide with respect to a fourth axis 14 (or, a fourth virtual axis or a second moving axis) different from the third axis 13. The first axis 11 and the third axis 13 may be located on the same first xy plane, and the second axis 12 and the fourth axis 14 may be located on a second xy plane different from the first axis 11 and the third axis 13. Accordingly, the minimum linear distance between the first axis 11 and the display 160 may be equal to the distance (or, the shortest distance or the minimum linear distance) between the third axis 13 and the display 160. The distance (or, the shortest distance or the minimum linear distance) between the second axis 12 and the display 160 may be equal to the distance (or, the shortest distance or the minimum linear distance) between the fourth axis 14 and the display 160. According to an embodiment, when the electronic device 100 is in an unfolded state, the distance (or, the shortest distance or the minimum linear distance) between the first and third axes 11 and 13 and the rear surface of the display 160 may differ from the distance (or, the shortest distance or the minimum linear distance) between the second and fourth axes 12 and 14 and the rear surface of the display 160. Alternatively, when the electronic device 100 is in the unfolded state, the distance (or, the shortest distance or the minimum linear distance) between the first and third axes 11 and 13 and the rear surface of the display 160 may be shorter than the distance (or, the shortest distance or the minimum linear distance) between the second and fourth axes 12 and 14 and the rear surface of the display 160.

The fixed bracket 210 may include a structure to which the first cam member 241 is fastened so as to be movable in the first direction for a cam motion (e.g., a structure that forms a first cam hole 210*c*1 (or, a recess)). The fixed bracket 210 may include a structure to which the second cam member 242 is fastened so as to be movable in a direction different from the first direction for a cam motion (a structure that forms a second cam hole 210*c*2 (or, a recess)). The fixed bracket 210 may include a structure on which the interlocking member 260 supporting the interlocking of the first arm member 231 and the second arm member 232 is seated.

The fixed bracket 210 may be formed of a material having a predetermined stiffness (e.g., a metallic material or reinforced plastic having a predetermined stiffness) to support movement of the first rotating member 211, the second rotating member 212, the first arm member 231, the second arm member 232, the first cam member 241, the second cam member 242, and the interlocking member 260 in a hinge operation process. In the above description, it is exemplified that the fixed bracket 210 is provided as a separate component and fixed to the hinge housing 150. However, one shape of the hinge housing 150 may be integrally provided as the shape of the fixing bracket 210. In the illustrated drawing, the fixed bracket 210 is illustrated and described as an integrated structure on which at least some of the first rotating member 211, the second rotating member 212, the first arm member 231, the second arm member 232, the first cam member 241, the second cam member 242, and the interlocking member 260 are seated. However, the disclosure is not limited thereto. For example, the fixed bracket 210 may include a first portion to which the first rotating member 211 and the second rotating member 212 are fastened to perform a hinge operation, a second portion on which the first cam member 241 and the second cam member 242 are seated and that supports the cam members 241 and 242 in a process in which the cam members 241 and 242 move in the −y-axis or y-axis direction, and a third portion that supports the interlocking member 260 in a process in which the interlocking member 260 moves in the −y-axis or y-axis direction, and at least a part of the first to third portions may be separately provided and may be fixed to the hinge housing 150, or may be integrated into the hinge housing 150. For example, the first portion may be formed independently of the other portions, or at least part of the second portion may be independently formed and may be fixed to the hinge housing 150. Alternatively, at least one portion of the fixed bracket 210 may be integrated with the hinge housing 150, and the other portions of the fixed bracket 210 may be independently provided and may be seated on the hinge housing 150.

The first rotating member 211 includes a portion (e.g., the first rail structure 211*b*) fastened to one side (e.g., the first rail 210*b*1) of the fixed bracket 210 and thereafter fastened to perform a hinge operation and a portion (e.g., the second rail structure 211*c*) coupled to one side of the first link member 221 (e.g., a third rail 221*b*, or the first rail of the first link member). While the first link member 221 coupled to the first housing 110 performs a hinge operation, the first rail structure 211*b* fastened with the fixed bracket 210 may perform a rotary motion in place, and the second rail structure 211*c* coupled to the first link member 221 may rotate (or, slide) within the first link member 221 (e.g., the third rail 221*b*) while moving in one direction (e.g., the counterclockwise direction while the electronic device 100 is folded in an unfolded state or the clockwise direction while the electronic device 100 is unfolded in a folded state). The first rotating member 211 may contact the fixed bracket 210 and the first link member 221 with friction therebetween while a hinge operation is repeated, and the first rotating member 211 may be formed of a material (e.g., a metallic material) having a predetermined strength or higher that is capable of withstanding the friction. At least a portion of the first wing plate 131 of the wing plates 131 and 132 may be fixed to the first rotating member 211.

The second rotating member 212 includes a portion (e.g., the third rail structure 212*b*) fastened to an opposite side (e.g., the second rail 210*b*2) of the fixed bracket 210 and thereafter fastened to perform a hinge operation and a portion (e.g., the fourth rail structure 212*c*) coupled to one side of the second link member 222 (e.g., a fourth rail 222*b*, or the first rail of the second link member). While the second link member 222 coupled to the second housing 120 performs a hinge operation, the third rail structure 212*b* fastened with the fixed bracket 210 may perform a rotary motion in place, and the fourth rail structure 212*c* coupled to the second link member 222 may rotate (or, slide) within the second link member 222 (e.g., the fourth rail 222*b*) while moving in one direction (e.g., the counterclockwise direction while the electronic device 100 is folded in an unfolded state or the clockwise direction while the electronic device 100 is unfolded in a folded state). Similarly to the first rotating member 211, the second rotating member 212 may contact the fixed bracket 210 and the second link member 222 with friction therebetween while a hinge operation is repeated, and the second rotating member 212 may be formed of a material (e.g., a metallic material) having a predetermined strength or higher that is capable of withstanding the friction. For example, the second rotating member 212 may be formed of the same material as that of the first rotating member 211. A portion of the second wing plate 132 of the wing plates 131 and 132 may be fixed to the second rotating member 212.

The second rotating member 212 may move in an opposite direction to that of the first rotating member 211. For example, the third rail structure 212*b* of the second rotating member 212 may rotate in place in the clockwise direction while the first rail structure 211*b* of the first rotating member 211 rotates in place in the counterclockwise direction. While the second rail structure 211*c* of the first rotating member 211 rotates in the counterclockwise direction and the second rail structure 211*c* slides in the counterclockwise direction within the third rail 221*b* of the first link member 221 (the sliding operation is relative, and thus the third rail 221*b* of the first link member 221 slides in the clockwise direction relative to the second rail structure 211*c*), the fourth rail structure 212*c* of the second rotating member 212 may slide in the counterclockwise direction within the fourth rail 222*b* of the second link member 222 while rotating in the counterclockwise direction (the sliding operation is relative, and thus the fourth rail 222*b* of the second link member 222 slides in the clockwise direction relative to the fourth rail structure 212*c*).

The first axis 11 about which the first rail structure 211*b* of the first rotating member 211 rotates (a virtual axis that the first rail structure 211*b* forms while rotating along the first rail 210*b*1 of the fixed bracket 210) and the third axis 13 about which the third rail structure 212*b* of the second rotating member 212 rotates (a virtual axis that the third rail structure 212*b* forms while rotating along the second rail 210*b*2 of the fixed bracket 210) may be fixed axes about which the rail structures rotate in place. The second axis 12 about which the second rail structure 211*c* of the first rotating member 211 rotates (a virtual axis that the second rail structure 211*c* forms while sliding or rotating within the third rail 221*b* during movement of the first link member 221) and the fourth axis 14 about which the fourth rail structure 212*c* of the second rotating member 212 rotates (a virtual axis that the fourth rail structure 212*c* forms while sliding or rotating within the fourth rail 222*b* during movement of the second link member 222) may be moving axes formed while the rail structures (the second rail structure 211*c* and the fourth rail structure 212*c*) move.

The first link member 221 includes a structure coupled and fixed to one side of the first housing 110. The first link member 221 includes a structure (e.g., the third rail 221*b* or the first rail of the first link member 221) on which a portion of the first rotating member 211 (e.g., the second rail structure 211*c*) is seated. The first link member 221 includes a structure (e.g., a fifth rail 221*c* or the second rail of the first link member 221) on which a portion of the first arm member 231 (e.g., a fifth rail structure 231_1*b* and 231_2*b*) is seated. The first link member 221 may be formed longer in the x-axis direction than in the y-axis or −y-axis direction to accommodate the structure (e.g., the third rail 221*b*) on which the second rail structure 211*c* is seated and the structure (e.g., the fifth rail 221*c*) on which the fifth rail structure 231_1*b* and 231_2*b* is seated. In this regard, the first link member 221 may include a first link body 221*a*1 fixed to the first housing 110, a second link body 221*a*2 spaced apart from the first link body 221*a*1 by a predetermined distance, the third rail 221*b* (or, the first rail of the first link member 221) disposed between the first link body 221*a*1 and the second link body 221*a*2, the fifth rail 221*c* (or, the second rail of the first link member 221), and a first link fixing part 221*d* formed adjacent to the fifth rail 221*c*. The second link body 221*a*2 may be disposed between the third rail 221*b* and the fifth rail 221*c*.

The first link member 221 moves the first rotating member 211 and the first arm member 231 (rotates the first rotating member 211 and the first arm member 231 in the clockwise or counterclockwise direction) while the coupled first housing 110 rotates in one direction (e.g., the clockwise or counterclockwise direction). In this regard, the position of the axis (e.g., the second axis 12) related to the third rail 221*b* and the position of the axis (e.g., a fifth axis 15 or a third moving axis) related to the fifth rail 221*c* may be changed (e.g., moved in the clockwise or counterclockwise direction) in response to movement of the first housing 110. The moving axis (e.g., the second axis 12) formed by the third rail 221*b* and the moving axis (e.g., the fifth axis 15) formed by the fifth rail 221*c* may be formed in different positions on the zy plane (or, with respect to the y-axis). Alternatively, when the electronic device 100 is in an unfolded state, the second axis 12 may be formed over the upper surface of the fixed bracket 210, and the fifth axis 15 may be formed under the upper surface of the fixed bracket 210. When the electronic device 100 is in a folded state, the second axis 12 may be located inside the housings 110 and 120 of the electronic device 100 that is in the folded state, and the fifth axis 15 may be located outside the housings 110 and 120 that are in the folded state.

The second link member 222 includes a structure coupled and fixed to one side of the second housing 120. The second link member 222 includes a structure (e.g., the fourth rail 222*b* or the first rail of the second link member 222) on which a portion of the second rotating member 212 (e.g., the fourth rail structure 212*c*) is seated. The second link member 222 includes a structure (e.g., a sixth rail 222*c* or the second rail of the second link member 222) on which a portion of the second arm member 232 (e.g., a sixth rail structure 232_1*b* and 232_2*b*) is seated. The second link member 222 may be formed longer in the x-axis direction than in the y-axis or −y-axis direction to accommodate the structure (e.g., the fourth rail 222*b*) on which the fourth rail structure 212*c* is seated and the structure (e.g., the sixth rail 222*c*) on which the sixth rail structure 232_1*b* and 232_2*b* is seated. In this regard, the second link member 222 may include a link body 222*a* fixed to the second housing 120, a second link fixing part 222*d*, the fourth rail 222*b* (or, the second rail of the second link member 222) formed on one side of the link body 222*a* (e.g., the −y-axis direction), and the sixth rail 222*c* (or, the second rail of the second link member 222) disposed between the link body 222*a* and the second link fixing part 222*d*. The position in which the fourth rail 222*b* is formed on the second link member 222 and the position in which the third rail 221*b* is formed on the first link member 221 may differ from each other with respect to the Y-axis.

The second link member 222 moves the second rotating member 212 and the second arm member 232 (rotates the second rotating member 212 and the second arm member 232 in the clockwise or counterclockwise direction) while the coupled second housing 120 rotates in one direction (e.g., the clockwise or counterclockwise direction). In this regard, the position of the axis (e.g., the fourth axis 140) related to the fourth rail 222*b* and the position of the axis (e.g., a sixth axis 16 or a fourth moving axis) related to the sixth rail 222*c* may be changed (e.g., moved in the clockwise or counterclockwise direction) in response to movement of the second housing 120. The moving axis (e.g., the fourth axis 14) formed by the fourth rail 222*b* and the moving axis (e.g., the sixth axis 16) formed by the sixth rail 222*c* may be formed in different positions on the zy plane (or, with respect to the y-axis). Alternatively, when the electronic device 100 is in an unfolded state, the fourth axis 14 may be formed over the upper surface of the fixed bracket 210, and the sixth axis 16 may be formed under the upper surface of the fixed bracket 210. When the electronic device 100 is in a folded state, the fourth axis 14 may be located inside the housings 110 and 120 of the electronic device 100 that is in the folded state, and the sixth axis 16 may be located outside the housings 110 and 120 that are in the folded state. The fourth axis 14 may be located on the same plane as the second axis 12 with respect to the xy plane, and the sixth axis 16 may be located on the same plane as the fifth axis 15 with respect to the xy plane (a plane different from the plane on which the second axis 12 or the fourth axis 14 is located).

The first arm member 231 includes a structure fastened with the first link member 221 coupled with the first housing 110 (e.g., the fifth rail structure 231_1*b* and 231_2*b* or the rail structure of the first arm member 231). The fifth rail structure 231_1*b* and 231_2*b* may move (e.g., slide or rotate) with respect to the fifth axis 15 along the fifth rail 221*c* formed on the first link member 221. The first arm member 231 includes a structure fastened with the interlocking member 260 (e.g., a seventh rail 231_1*c* and 231_2*c* or a rail of the first arm member 231). The seventh rail 231_1*c* and 231_2*c* may move (e.g., slide or rotate in an oblique direction) with respect to a seventh axis 17 (or, a seventh virtual axis or a third fixed axis) along a first interlocking wing 263*a*1 formed on the interlocking member 260. The first arm member 231 may have a separate structure in relation to assembly with the interlocking member 260 (e.g., a first lower arm structure 231_1 as a lower structure of the first arm member 231 and a first upper arm structure 231_2 as an upper structure of the first arm member 231). The first arm member 231 may further include an elastic member 231_3 disposed between the first lower arm structure 231_1 and the first upper arm structure 231_2 to prevent separation of the first link member 221 from the fifth rail 221*c*. According to various embodiments, the elastic member may include a plate spring, a coil spring, and/or an elastomer (e.g., rubber).

The first lower arm structure 231_1 may include a first lower arm body 231_1*a*, the first lower arm rail structure 231_1*b* extending to one side (e.g., the x-axis direction) with respect to the first lower arm body 231_1*a*, and the first lower arm rail 231_1*c* extending to an opposite side (e.g., the −x-axis direction) with respect to the first lower arm body 231_1*a*. The first upper arm structure 231_2 may include a first upper arm body 231_2*a*, the first upper arm rail structure 231_2*b* extending to one side (e.g., the x-axis direction) with respect to the first upper arm body 231_2*a*, and the first upper arm rail 231_2*c* extending to an opposite side (e.g., the −x-axis direction) with respect to the first upper arm body 231_2*a*. The first lower arm rail structure 231_1*b* (or, a first portion of the fifth rail structure 231_1*b* and 231_2*b*) and the first upper arm rail structure 231_2*b* (or, a second portion of the fifth rail structure 231_1*b* and 231_2*b*), when assembled, may form the fifth rail structure 231_1*b* and 231_2*b* that rotates about the fifth axis 15. The first lower arm rail 231_1*c* (or, a first portion of the seventh rail 231_1*c* and 231_2*c*) and the first upper arm rail 231_2*c* (or, a second portion of the seventh rail 231_1*c* and 231_2*c*), when assembled, may form the seventh rail 231_1*c* and 231_2*c* that rotates about the seventh axis 17.

The second arm member 232 includes a structure fastened with the second link member 222 coupled with the second housing 120 (e.g., the sixth rail structure 232_1*b* and 232_2*b* or the rail structure of the second arm member 232). The sixth rail structure 232_1*b* and 231_2*b* may move (e.g., slide or rotate) with respect to the sixth axis 16 along the sixth rail 222*c* formed on the second link member 222. The second arm member 232 includes a structure fastened with the interlocking member 260 (e.g., an eighth rail 232_1*c* and 232_2*c* or a rail of the second arm member 232). The eighth rail 232_1*c* and 232_2*c* may move (e.g., slide or rotate in an oblique direction) with respect to an eighth axis 18 (or, an eighth virtual axis or a fourth fixed axis) along a second interlocking wing 263*a*2 formed on the interlocking member 260. The second arm member 232 may have a separate structure in relation to assembly with the interlocking member 260 (e.g., a second lower arm structure 232_1 as a lower structure of the second arm member 232 and a second upper arm structure 232_2 as an upper structure of the second arm member 232). The second arm member 232 may further include an elastic member 232_3 disposed between the second lower arm structure 232_1 and the second upper arm structure 232_2 to prevent separation of the second link member 222 from the sixth rail 222*c*.

The second lower arm structure 232_1 may include a second lower arm body 232_1*a*, the second lower arm rail structure 232_1*b* extending to one side (e.g., the −x-axis direction) with respect to the second lower arm body 232_1*a*, and the second lower arm rail 232_1*c* extending to an opposite side (e.g., the x-axis direction) with respect to the second lower arm body 232_1*a*. The second upper arm structure 232_2 may include a second upper arm body 232_2*a*, the second upper arm rail structure 232_2*b* extending to one side (e.g., the −x-axis direction) with respect to the second upper arm body 232_2*a*, and the second upper arm rail 232_2*c* extending to an opposite side (e.g., the x-axis direction) with respect to the second upper arm body 232_2*a*. The second lower arm rail structure 232_1*b* (or, a first portion of the sixth rail structure 232_1*b* and 232_2*b*) and the second upper arm rail structure 232_2*b* (or, a second portion of the sixth rail structure 232_1*b* and 232_2*b*), when assembled, may form the sixth rail structure 232_1*b* and 232_2*b*. The second lower arm rail 232_1*c* (or, a first portion of the eighth rail 232_1*c* and 232_2*c*) and the second upper arm rail 232_2*c* (or, a second portion of the eighth rail 232_1*c* and 232_2*c*), when assembled, may form the eighth rail 232_1*c* and 232_2*c*.

The first cam member 241 is seated on one side of the fixed bracket 210 (e.g., a region of the fixed bracket 210 biased in the −y-axis direction or an adjacent portion on which the first rail 210*b*1 and the second rail 210*b*2 are formed) and performs a cam operation during rotation of the first arm member 231 and the second arm member 232 while making contact with at least portions of the first arm member 231 and the second arm member 232. At least one elastic member (e.g., a first elastic member 251*a* and a second elastic member 251*b*) may be disposed between the one side of the fixed bracket 210 and the first cam member 241 such that the first cam member 241 is brought into close contact with one side of the first arm member 231 and one side of the second arm member 232. An elastic force provided by the at least one elastic member may provide a free-stop function at various angles of the electronic device 100 by changing a frictional force (or torque) by contact between the first cam member 241, the first arm member 231, and the second arm member 232.

The second cam member 242 is seated on an opposite side of the fixed bracket 210 spaced apart from the first cam member 241 by a predetermined gap (e.g., a region of the fixed bracket 210 biased in the y-axis direction or above the interlocking member 260 (e.g., a point of the interlocking member 260 in the y-axis direction)) and performs a cam operation during rotation of the first arm member 231 and the second arm member 232 while making contact with at least portions of the first arm member 231 and the second arm member 232. In this regard, at least one elastic member (e.g., a third elastic member 252*a* and a fourth elastic member 252*b*) may be disposed between the opposite side of the fixed bracket 210 and the second cam member 242 such that the second cam member 242 is brought into close contact with an opposite side of the first arm member 231 and an opposite side of the second arm member 232. An elastic force provided by the at least one elastic member may provide a free-stop function at various angles of the electronic device 100 by changing a frictional force (or torque) by contact between the second cam member 242, the first arm member 231, and the second arm member 232. In the above description, it is exemplified that the two cam members are disposed. However, the disclosure is not limited thereto, and one cam member or three or more cam members may be disposed.

The interlocking member 260 may be seated on a portion of the fixed bracket 210 and may perform a linear motion in the −y-axis or y-axis direction. The interlocking member 260 includes the first interlocking wing 263*a*1 and the second interlocking wing 263*a*2. The first interlocking wing 263*a*1 may be coupled with the seventh rail 231_1*c* and 231_2*c* of the first arm member 231. The second interlocking wing 263*a*2 may be coupled with the eighth rail 232_1*c* and 232_2*c* of the second arm member 232. While the first arm member 231 and the second arm member 232 rotate in the clockwise direction (or, the counterclockwise direction) and the counterclockwise direction (or, the clockwise direction), respectively, the first interlocking wing 263*a*1 and the second interlocking wing 263*a*2 may change the rotary motion of the first arm member 231 and the second arm member 232 to a linear motion. Accordingly, the interlocking member 260 may allow the first arm member 231 and the second arm member 232 to move in conjunction with each other.

Figure 7:
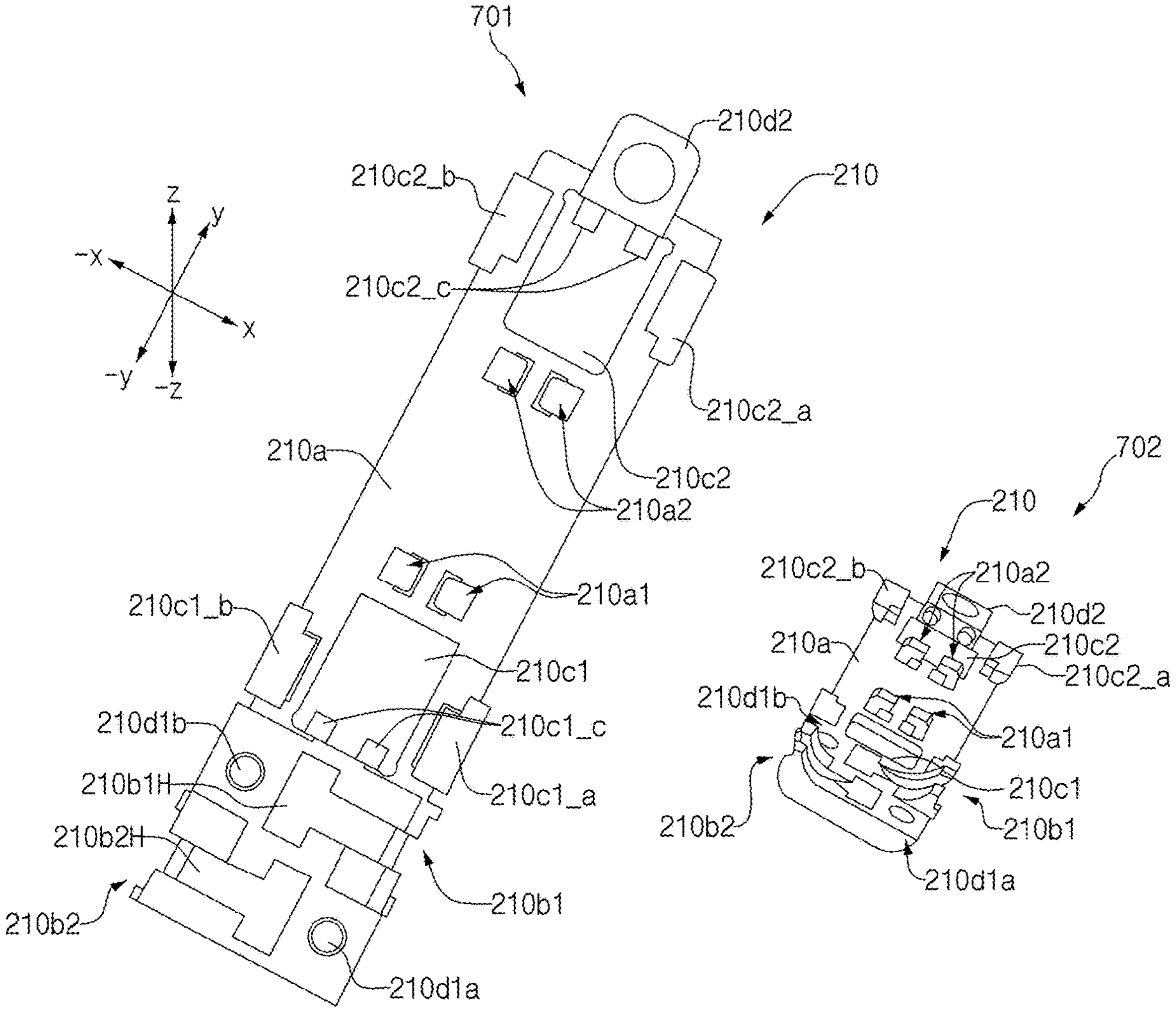
FIG. 7 is a view illustrating one example of a structure of a fixed bracket according to an embodiment.

FIG. 7 is a view illustrating one example of a structure of the fixed bracket according to an embodiment. In FIG. 7, FIG. 701 is a view illustrating an arrangement state of the fixed bracket 210 in the first direction, and FIG. 702 is a view illustrating an arrangement state of the fixed bracket 210 inclined at a predetermined angle.

Referring to FIGS. 5 to 7, the fixed bracket 210 according to an embodiment may include a bracket body 210*a*, the first rail 210*b*1, the second rail 210*b*2, the first am hole 210*c*1, the second cam hole 210*c*2, and a bracket fixing part 210*d*2.

For example, the bracket body 210*a* may be formed such that the length in the y-axis direction is longer than the length in the x-axis direction. A front surface (e.g., a surface facing in the z-axis direction) of the bracket body 210*a* may be formed to be flat. A rear surface of the bracket body 210*a* may have a form similar to that of an inside surface of the hinge housing 150. Accordingly, a section of the bracket body 210*a* in the z-axis direction may have a half-moon shape (or, an arc shape) or a shape in which at least a portion is convex in the −z-axis direction.

The first rail 210*b*1 may be located in the −y-axis direction with respect to the bracket body 210*a*. The first rail structure 211*b* of the first rotating member 211 may be inserted and fastened into the first rail 210*b*1 in the direction from the x-axis to the −x-axis. At least a portion of the first rail 210*b*1 may be formed to be curved to correspond to the shape of the first rail structure 211*b*. Alternatively, the first rail 210*b*1 may include rail protrusions having a half-moon shape (or, an arc shape) and coupled with opposite sides of the first rail structure 211*b* and sidewalls on which the rail protrusions are formed. The first rail 210*b*1 may include a hole 210*b*1H (or, a recess) penetrating from a front direction (e.g., the z-axis direction) to a rear direction (e.g., the −z-axis direction). The fixed bracket 210 may include a first rail fixing hole 210*d*1*b* used to fix the first rail 210*b*1 to the hinge housing 150.

The second rail 210*b*2 may be located in the −y-axis direction with respect to the first rail 210*b*1. The third rail structure 212*b* of the second rotating member 212 may be inserted and fastened into the second rail 210*b*2 in the direction from the −x-axis to the x-axis. At least a portion of the second rail **210*b*2 may be formed to be curved to correspond to the shape of the third rail structure 212*b*. Alternatively, the second rail 210*b*2 may include rail protrusions having a half-moon shape (or, an arc shape) and coupled with opposite sides of the third rail structure 212*b* and sidewalls on which the rail protrusions are formed. The second rail 210*b*2 may include a hole 210*b*2H (or, a recess) penetrating from the front direction (e.g., the z-axis direction) to the rear direction (e.g., the −z-axis direction). The fixed bracket 210 may include a second rail fixing hole 210*d*1*a* used to fix the second rail 210*b*2 to the hinge housing 150. The first rail 210*b*1 and the second rail 210*b*2 may be disposed to alternate with each other. Accordingly, the first rail fixing hole 210*d*1*b* and the second rail fixing hole 210*d*1*a*** may be disposed to be symmetrical to each other in a diagonal direction with respect to the y-axis.

The first cam hole **210*c*1 may be disposed between the bracket body 210*a* and the first rail 210*b*1. The first cam hole 210*c*1 is formed through the front and rear surfaces of the bracket body 210*a*. A structure for mounting the first cam member 241 may be disposed around the first cam hole 210*c*1. For example, at least one first mounting part 210*c*1_*c* used to fix one side of at least one elastic member (e.g., the first elastic member 251*a* and the second elastic member 251*b*) fastened with the first cam member 241 may be disposed. The first mounting part 210*c*1_*c* may be disposed to protrude in the y-axis direction from the sidewall that forms the first rail 210*b*1. In the illustrated drawing, the first mounting part 210*c*1_*c* is illustrated as including two protrusions, but may be modified to correspond to the number of elastic members fastened with the first cam member 241**.

The fixed bracket 210 may include a first guide part **210*c*1_*a* and a second guide part 210*c*1_*b* on which the first cam member 241 is mounted and that prevent separation of the first cam member 241 from the fixed bracket 210. For example, the first guide part 210*c*1_*a* may be disposed to be biased in the x-axis direction with respect to the first cam hole 201*c*1, and the second guide part 210*c*1_*b* may be disposed to be biased in the −x-axis direction with respect to the first cam hole 210*c*1. The first guide part 210*c*1_*a* and the second guide part 210*c*1_*b* may be disposed to be symmetrical to each other with respect to the y-axis center of the first cam hole 210*c*1. At least portions of the z-axis sections of the first guide part 210*c*1_*a* and the second guide part 210*c*1_*b* may have an inverted L shape or a shape symmetrical to the inverted L shape, and the first guide part 210*c*1_*a* and the second guide part 210*c*1_*b* may mount opposite edges of the first cam member 241 and may support the first cam member 241 such that the first cam member 241 is not separated from the fixed bracket 210 while the first cam member 241** moves in the y-axis direction (or, the −y-axis direction).

A first interlocking guide part **210*a*1 and a second interlocking guide part 210*a*2 that mount and guide the interlocking member 260 may be disposed on one side of the bracket body 210*a*. The first interlocking guide part 210*a*1 may mount one edge (e.g., an edge in the −y-axis direction) of the interlocking member 260, and the second interlocking guide part 210*a*2 may mount an opposite edge (e.g., an edge in the y-axis direction) of the interlocking member 260. The sections of the first interlocking guide part 210*a*1 and the second interlocking guide part 210*a*2 in the z-axis direction may have an inverted L shape or a shape symmetrical to the inverted L shape, and the first interlocking guide part 210*a*1 and the second interlocking guide part 210*a*2** may have the form of a pair of hooks spaced apart from each other while facing each other.

The second cam hole **210*c*2 may be disposed at an edge of the bracket body 210*a* in the y-axis direction. The bracket fixing part 201*d*2 that fixes the fixed bracket 210 may be disposed in the y-axis direction with respect to the second cam hole 210*c*2. Similarly to the first cam hole 210*c*1, the second cam hole 210*c*2 may include a hole (or, recess) having a shape in which the second cam member 242 is able to be seated. Structures for mounting and guiding the second cam member 242 may be disposed around the second cam hole 210*c*2. For example, the fixed bracket 210 may include at least one second mounting part 210*c*2_*c* that protrudes in the −y-axis direction from one sidewall forming the second cam hole 210*c*2 (e.g., a sidewall at a y-axis edge or one sidewall forming the bracket fixing part 210*d*2) and mounts at least one elastic member (e.g., the third elastic member 252*a* and the fourth elastic member 252*b*) coupled with the second cam member 242. The number of second mounting parts 210*c*2_*c* may be modified depending on the number of elastic members applied to the second cam member 242**.

A third guide part **210*c*2_*a* and a fourth guide part 210*c*2_*b* that mount and guide the second cam member 242 similarly to the first guide part 210*c*1_*a* and the second guide part 210*c*1_*b* may be disposed around the second cam hole 210*c*2 of the fixed bracket 210. The sections of the third guide part 210*c*2_*a* and the fourth guide part 210*c*2_*b* in the z-axis direction may have an inverted L shape or a shape symmetrical to the inverted L shape, and the third guide part 210*c*2_*a* and the fourth guide part 210*c*2_*b* may be disposed to face each other with respect to the center line of the second cam hole 210*c*2 in the y-axis direction. For example, the third guide part 210*c*2_*a* may guide an edge of the second cam member 242 that faces in the x-axis direction, and the fourth guide part 210*c*2_*b* may guide an edge of the second cam member 242 that faces in the −x-axis direction. Accordingly, the third guide part 210*c*2_*a* and the fourth guide part 210*c*2_*b* may serve to support the second cam member 242 such that the second cam member 242 is not separated from the fixed bracket 210** while performing a cam operation.

Figure 8:
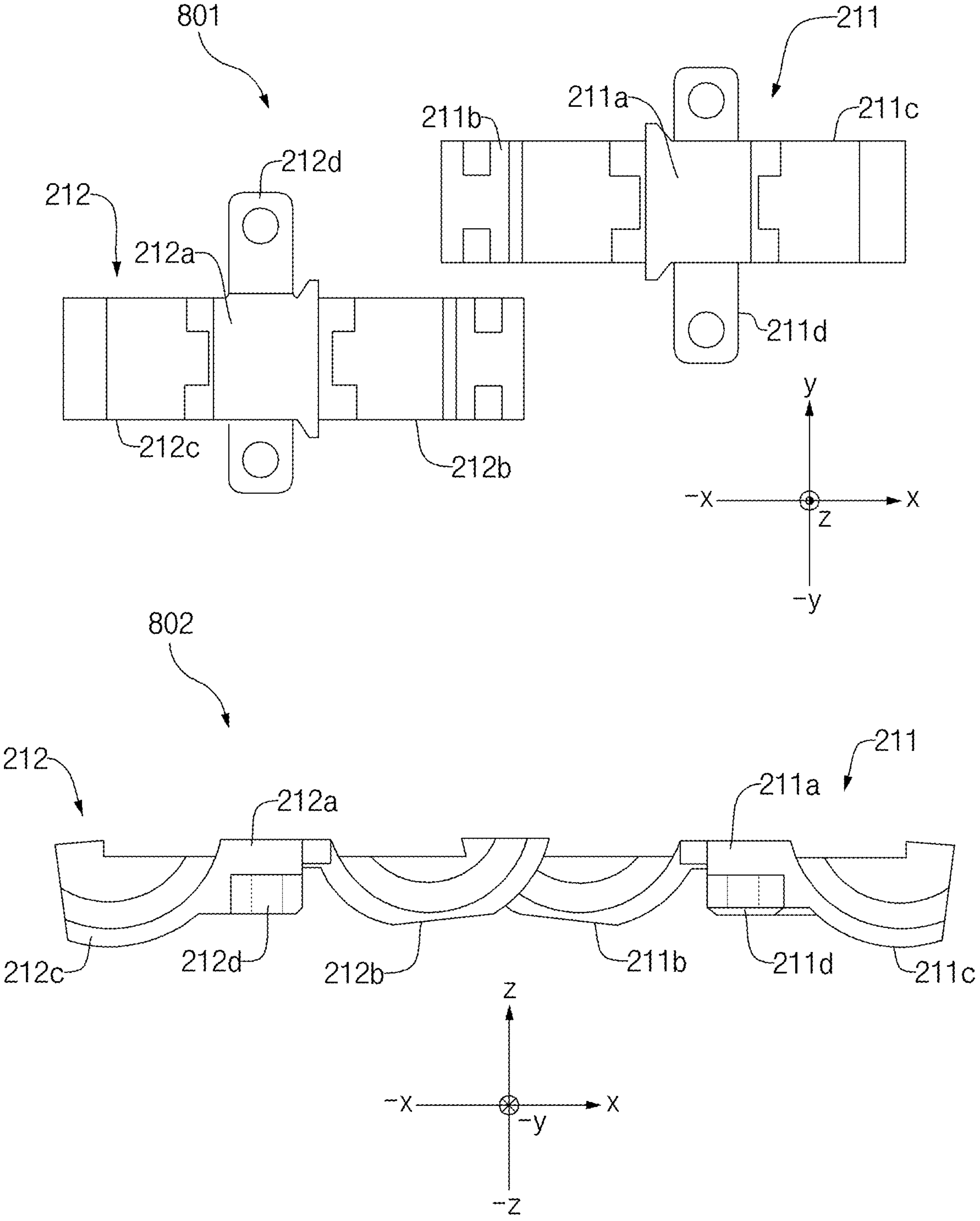
FIG. 8 is a view illustrating one example of rotating members according to an embodiment.

FIG. 8 is a view illustrating one example of the rotating members according to an embodiment. In FIG. 8, FIG. 801 is a view illustrating one example of front surfaces of the rotating members in the z-axis direction, and FIG. 802 is a view illustrating one example of side surfaces of the rotating members in the y-axis direction.

Referring to FIGS. 5 to 8, the rotating members 211 and 212 according to an embodiment may include the first rotating member 211 and the second rotating member 212 disposed to alternate with each other on the xy plane.

The first rotating member 211 may include a first rotating body **211*a*, the first rail structure 211*b*, the second rail structure 211*c*, and a first rotation fixing part 211*d*. The first rail structure 211*b* extends from the first rotating body 211*a* in the first direction (e.g., the −x-axis direction), and the second rail structure 211*c* extends from the first rotating body 211*a* in the second direction (e.g., the x-axis direction). The first rotation fixing part 211*d* may include two protrusions extending from the first rotating body 211*a* in the y-axis direction and the −y-axis direction. The first rotation fixing part 211*d* may include holes penetrating front and rear surfaces of the protrusions (e.g., the direction from the z-axis to the −z-axis). A fastening member (e.g., a screw) may be inserted into the holes, and the first wing plate 131 and the first rotating member 211 may be fastened. The first rail structure 211***b* may include protrusions having a half-moon shape (or, an arc shape) that are fastened with the first rail 210*b*1 of the fixed bracket 210 and a rail groove between the protrusions. The second rail structure 211*c* may include protrusions having a half-moon shape (or, an arc shape) that are fastened with the third rail 221*b* of the first link member 221 and a rail groove between the protrusions. In the illustrated drawing, the rail structure having an I-shaped cross-section is illustrated. However, the disclosure is not limited thereto, and the rail or rail structure may be configured to include only a hook shape that is not separated when rotating through a coupling.

The second rotating member 212 may include a second rotating body 212*a*, the third rail structure 212*b*, the fourth rail structure 212*c*, and a second rotation fixing part 212*d*. The third rail structure 212*b* extends from the second rotating body 212*a* in the second direction (e.g., the x-axis direction), and the fourth rail structure 212*c* extends from the second rotating body 212*a* in the first direction (e.g., the −x-axis direction). The second rotation fixing part 212*d* may include two protrusions extending from the second rotating body 212*a* in the y-axis direction and the −y-axis direction. The second rotation fixing part 212*d* may include holes penetrating front and rear surfaces of the protrusions (e.g., the direction from the z-axis to the −z-axis). A fastening member (e.g., a screw) may be inserted into the holes, and the second wing plate 132 and the second rotating member 212 may be fastened. The third rail structure 212*b* may include protrusions having a half-moon shape (or, an arc shape) that are fastened with the second rail 210*b*2 of the fixed bracket 210 and a rail groove between the protrusions. The fourth rail structure 212*c* may have a structure capable of being coupled with the fourth rail 222*b* of the second link member 222.

For example, when the electronic device 100 is in an unfolded state, an edge of the first rail structure 211*b* of the first rotating member 211 that faces in the −x-axis direction and an edge of the third rail structure 212*b* of the second rotating member 212 that faces in the −x-axis direction may at least partially overlap each other when viewed in the y-axis direction (or, the −y-axis direction). Accordingly, the first rail structure 211*b* and the third rail structure 212*b* may be spaced apart from each other in the y-axis direction such that the first rail structure 211*b* does not collide with the third rail structure 212*b* while performing a rotary motion. Correspondingly, the first rail 210*b*1 and the second rail 210*b*2 formed on the fixing bracket 210 may be spaced apart from each other in the y-axis direction. When the electronic device 100 is in a folded state, the first rail structure 211*b* and the second rail structure 211*c* may be spaced apart from each other by a first distance, and the third rail structure 212*b* and the fourth rail structure 212*c* may be spaced apart from each other by a second distance. Here, the first distance and the second distance may differ from each other. For example, the first distance may be greater than the second distance, and in the folded state of the electronic device 100, a space formed by the first rotating member 211, the second rotating member 212, and the fixed bracket 210 may include a triangular shape. While the first housing 110 and the second housing 120 are disposed in parallel in the shape of "11" in a state in which an edge of the first housing 110 is in contact with or in close contact with an edge of the second housing 120, the folding region of the display 160 may be protected by being disposed in the above-described triangular space.

Figure 9:
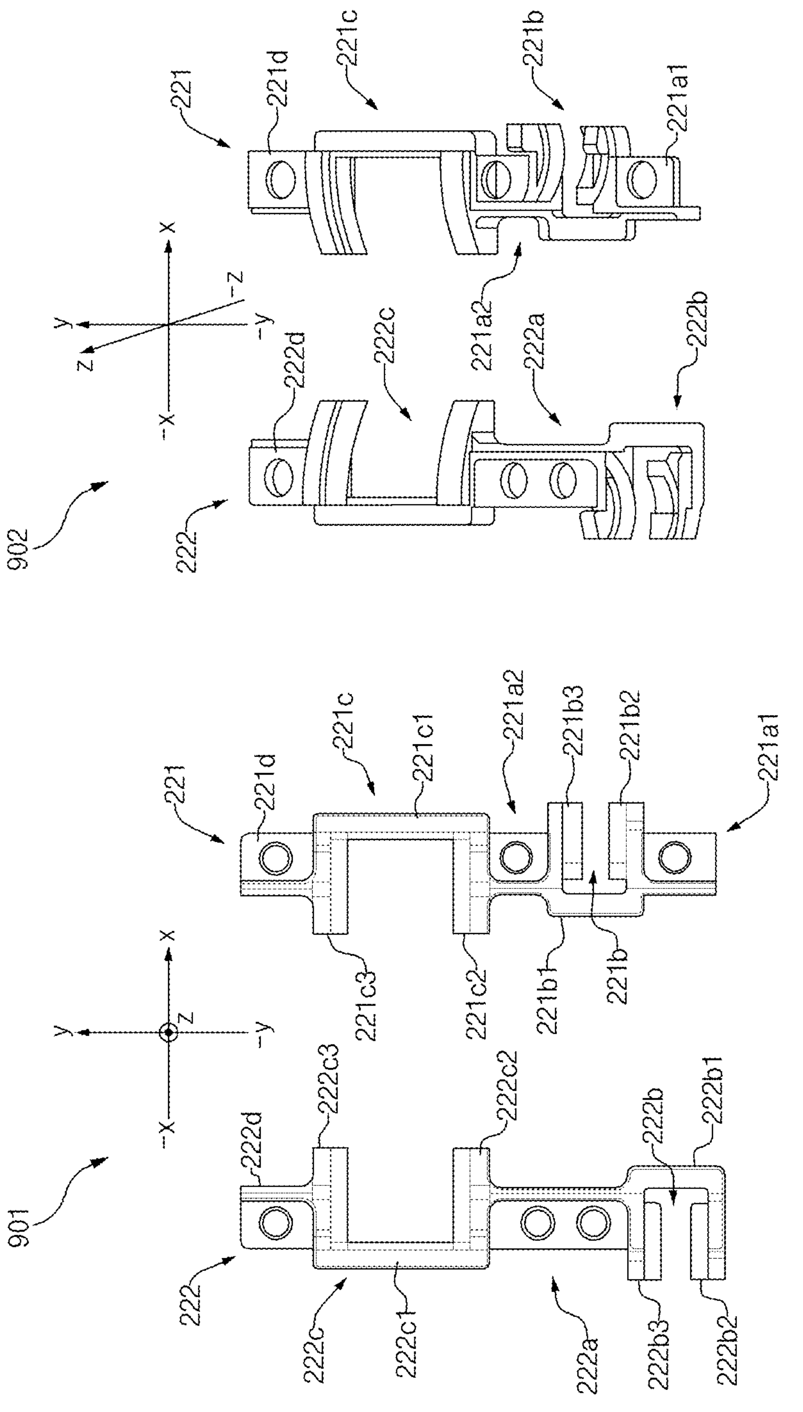
FIG. 9 is a view illustrating one example of link members according to an embodiment.

FIG. 9 is a view illustrating one example of the link members according to an embodiment. In FIG. 9, FIG. 901 is a view illustrating one example of a state in which the front surfaces of the link members are disposed in the z-axis direction, and FIG. 902 is a view illustrating one example of a state in which the link members are inclined at a predetermined angle.

Referring to FIG. 9, the link members 221 and 222 according to an embodiment may include the first link member 221 coupled with the first housing 110 and the second link member 222 coupled with the second housing 120.

The first link member 221 may include the first link body 221*a*1, the second link body 221*a*2, the third rail 221*b*, the fifth rail 221*c*, and the first link fixing part 221*d*. The first link member 221 may be formed such that the length in the y-axis direction is longer than the length in the x-axis direction. A hole may be formed through the front and rear surfaces (e.g., the z-axis~the −z-axis) of the first link body 221*a*1. A fastening member (e.g., a screw or a bolt) may be inserted into the hole of the first link body 221*a*1, and the first link member 221 may be fixed to the first housing 110. The third rail 221*b* may be disposed in the −y-axis direction of the first link body 221*a*1. The third rail 221*b* may include sidewalls 221*b*2 and 221*b*3 formed in a half-moon shape (or, an arc shape) convex from the z-axis direction to the −z-axis direction and having a pair of rail protrusions spaced apart from each other by a predetermined gap and a support member 221*b*1 connecting edges (e.g., −x-axis edges) of the sidewalls 221*b*2 and 221*b*3. The second rail structure 211*c* of the first rotating member 211 may be coupled to the third rail 221*b*. In this regard, the third rail 221*b* may include an opening region formed in the x-axis direction.

The second link body 221*a*2 may be disposed in the −y-axis direction of the third rail 221*b*. Similarly to the first link body 221*a*1, the second link body 221*a*2 may include a hole penetrating the front and rear surfaces, and a fastening member may be inserted into the hole to fix the first link member 221 to the first housing 110. The fifth rail 221*c* may be disposed in the y-axis direction of the first link body 221*a*1. The fifth rail 221*c* may include sidewalls 221*c*2 and 221*c*3 having a pair of rail protrusions protruding in the direction from the −z-axis to the z-axis and spaced apart from each other and a support member 221*c*1 connecting edges (e.g., x-axis edges) of the sidewalls 221*c*2 and 221*c*3. The separation distance between the pair of rail protrusions disposed on the fifth rail 221*c* (or, the separation distance between the sidewalls 221*c*2 and 221*c*3 of the fifth rail 221*c*) may differ from the separation distance between the pair of rail protrusions disposed on the third rail 221*b* (or, the separation distance between the sidewalls 221*b*2 and 221*b*3 of the third rail 221*b*). For example, the separation distance between the pair of rail protrusions disposed on the fifth rail 221*c* may be greater than the separation distance between the pair of rail protrusions disposed on the third rail 221*b*. The separation distance formed in the fifth rail 221*c* may provide a space for assembly of the first arm member 231, and the elastic force provided by the elastic member included in the first arm member 231 may reduce the possibility of separation of the fifth rail structure 231_1*b* and 231_2*b* of the first arm member 231 from the fifth rail 221*c*. The fifth rail 221*c* may include an opening region formed in a direction (e.g., the −x-axis direction) different from that of the third rail 221*b*.

The second link member 222 may include the link body 222*a*, the second fixing part 222*d*, the fourth rail 222*b*, and the sixth rail 222*c*. The link body 222*a* and the second link fixing part 222*d* may include at least one through-hole penetrating the front and rear surfaces, and a fastening member may be inserted into the through-hole to fix the second link member 222 to the second housing 120. The fourth rail 222*b* may include sidewalls 222*b*2 and 222*b*3 on which a pair of rail protrusions spaced apart from each other are disposed to face each other and a connecting member 222*b*1 connecting edges (e.g., edges in the x-axis direction) of the sidewalls 222*b*2 and 222*b*3. Rails disposed in the fourth rail 222*b* may be formed to be convex from the z-axis direction to the −z-axis direction. The direction of the curved surface of the fourth rail 222*b* may be the same as that of the third rail 221*b*. The sixth rail 222*c* may include sidewalls 222*c*2 and 222*c*3 on which a pair of rail protrusions spaced apart from each other are disposed to face each other and a connecting member 222*c*1 connecting edges (e.g., edges in the −x-axis direction) of the sidewalls 222*c*2 and 222*c*3. Rails disposed in the sixth rail 222*c* may be formed to be convex from the −z-axis direction to the x-axis direction. The direction of the curved surface of the sixth rail 222*c* may be the same as that of the fifth rail 221*c*. Similarly to the sixth rail 222*c*, the sixth rail 222*c* may have a gap (e.g., the gap between the rail protrusions formed in the sixth rail 222*c* or the gap between the sidewalls 222*c*2 and 222*c*3 on which the rail protrusions formed in the sixth rail 222*c* are disposed) that is different from the gap of the fourth rail 222*b* (e.g., the gap between the rail protrusions formed in the fourth rail 222*b* or the gap between the sidewalls 222*b*2 and 222*b*3 on which the rail protrusions formed in the fourth rail 222*b* are disposed). For example, the gap of the sixth rail 222*c* in the y-axis direction may be greater than the gap of the fourth rail 222*b* in the y-axis direction. The opening direction of the opening region of the fourth rail 222*b* and the opening direction of the opening region of the third rail 221*b* may be opposite each other, and the opening direction of the opening region of the sixth rail 222*c* and the opening direction of the opening region of the fifth rail 221*c* may face each other. The position of the third rail 221*b* on the y-axis and the position of the fourth rail 222*b* on the y-axis may differ from each other to correspond to the staggered arrangement of the first rail structure 211*b* (or, the second rail structure 211*c*) and the third rail structure 212*b* (or, the fourth rail structure 212*c*). The fifth rail 221*c* and the sixth rail 222*c* may be disposed at the same position on the y-axis.

Figure 10:
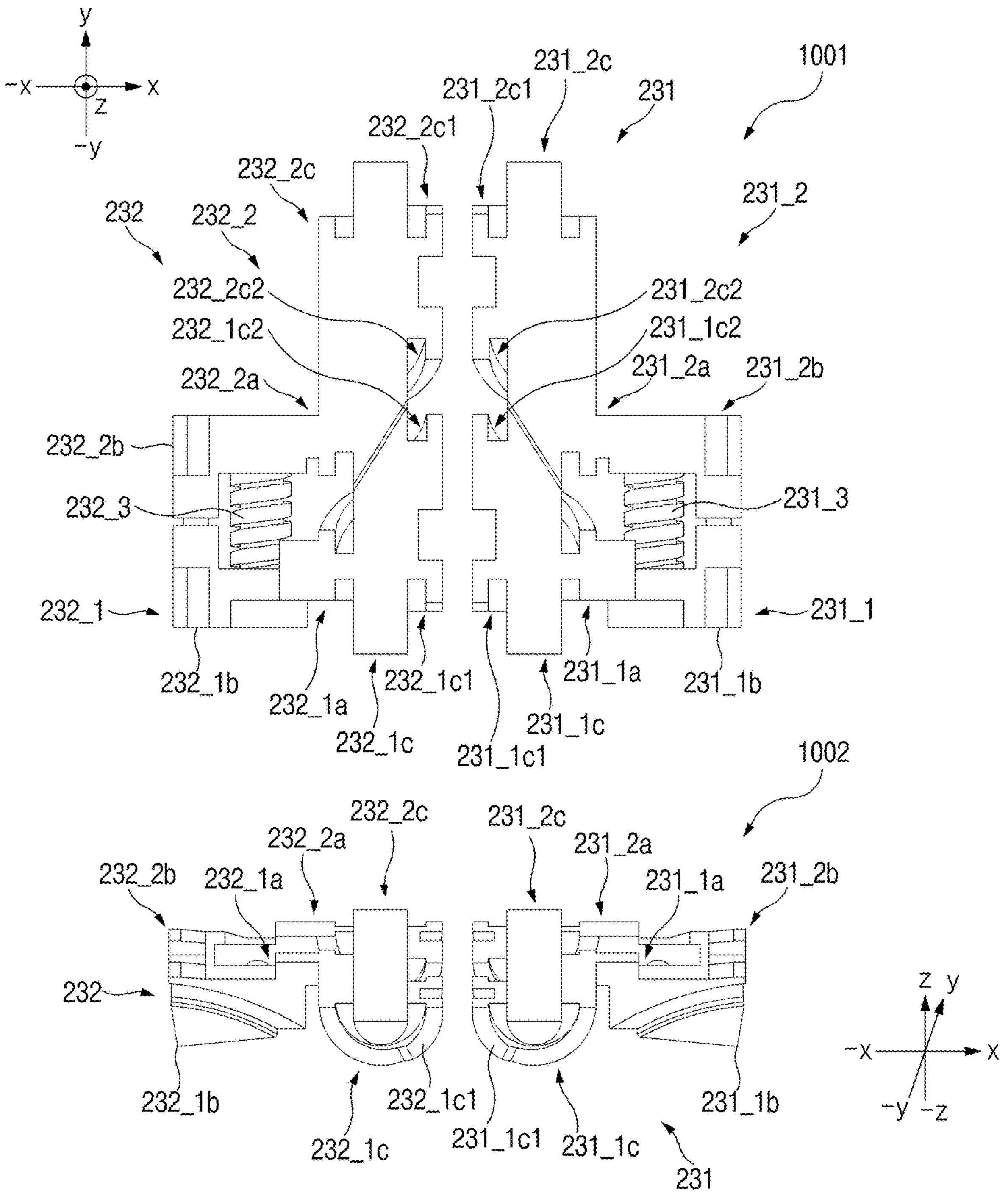
FIG. 10 is a view of arm members according to an embodiment as viewed in the first direction and the second direction.
Figure 11:
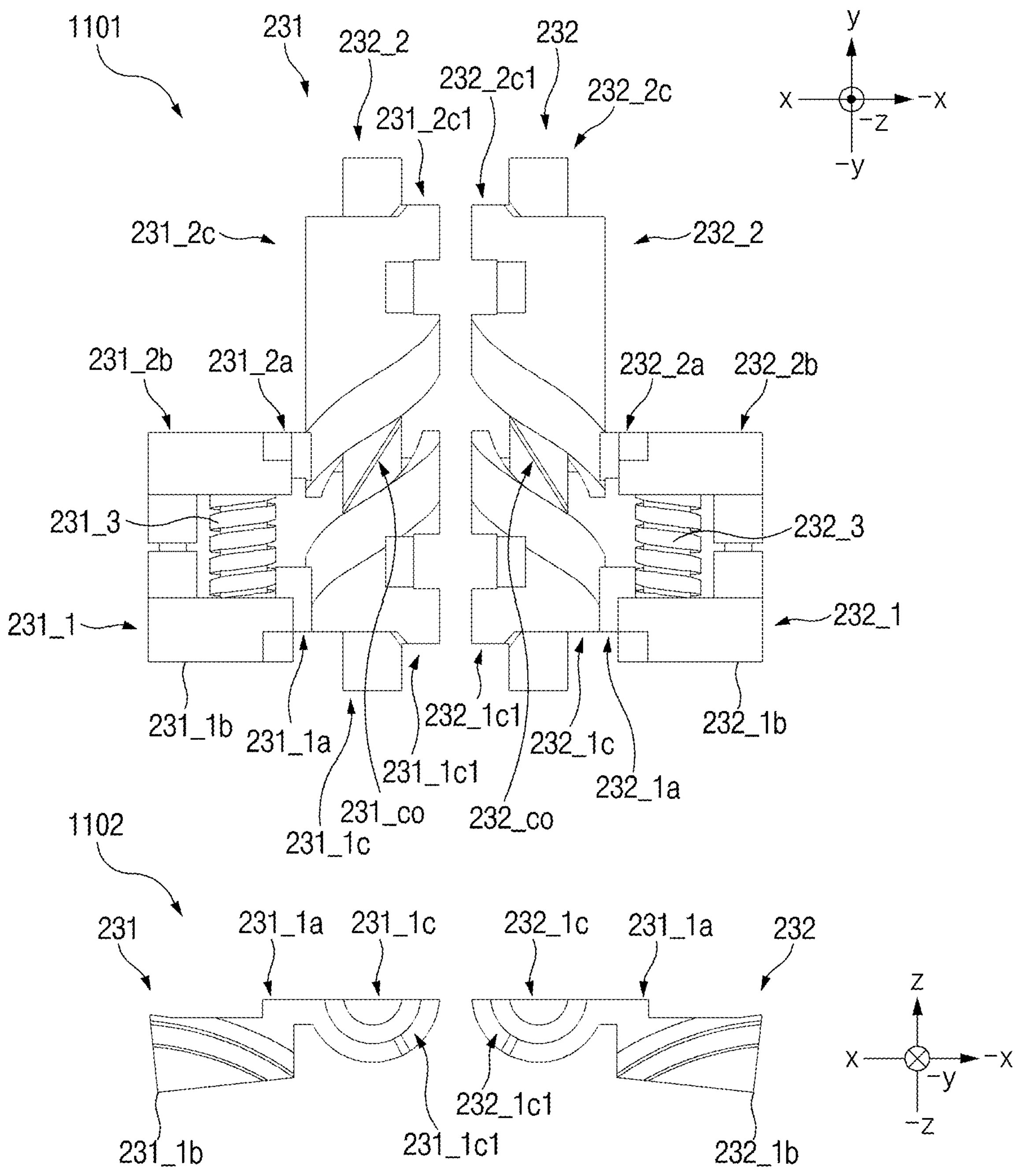
FIG. 11 is a view of the arm members according to an embodiment as viewed in a third direction and a fourth direction.

FIG. 10 is a view of the arm members according to an embodiment as viewed in the first direction and the second direction, and FIG. 11 is a view of the arm members according to an embodiment as viewed in a third direction and a fourth direction. In FIG. 10, FIG. 1001 is a view illustrating one example of front surfaces of the arm members in the z-axis direction, and FIG. 1002 is a view illustrating one example of a state in which the arm members are inclined at a predetermined angle in the y-axis direction. In FIG. 11, FIG. 1101 is a view illustrating one example of the front surfaces of the arm members in the −z-axis direction, and FIG. 1102 is a view illustrating one example of side surfaces of the arm members in the y-axis direction.

Referring to FIGS. 5 to 11, the arm members may include the first arm member 231 and the second arm member 232 symmetrical to each other with respect to the center line in the y-axis direction.

The first arm member 231 may include the first lower arm structure 231_1, the first upper arm structure 231_2, and the fifth elastic member 231_3 (or, the elastic member of the first arm). The first lower arm structure 231_1 may include the first lower arm body 231_1*a*, the first lower arm rail structure 231_1*b*, and the first lower arm rail 231_1*c*. The upper surface (e.g., a surface facing in the z-axis direction) of the first lower arm structure 231_1 may be formed to be flat. At least a portion of the lower surface (e.g., a surface facing in the −z-axis direction) of the first lower arm structure 231_1 may be formed to be convex. The first upper arm structure 231_2 may include the first upper arm body 231_2*a*, the first upper arm rail structure 231_2*b*, and the first upper arm rail 231_2*c*. The upper surface (e.g., a surface facing in the z-axis direction) of the first upper arm structure 231_2 may be formed to be flat, and at least a portion of the lower surface (e.g., a surface facing in the −z-axis direction) of the first upper arm structure 231_2 may be formed to be convex.

The first lower arm rail structure 231_1*b* may be disposed to extend in the x-axis direction with respect to the first lower arm body 231_1*a*. The first lower arm rail structure 231_1*b* may include a protrusion on which the fifth elastic member 231_3 is mounted and a protrusion or recess (or, hole) fastened with the first upper arm rail structure 231_2*b*. For example, at least a portion of a section of the first lower arm rail structure 231_1*b* that faces in the y-axis direction may have a U-shape. A rail structure fastened with a rail on one side of the fifth rail 221*c* may be formed on a surface of the first lower arm rail structure 231_1*b* that faces in the −y-axis direction. The first lower arm rail structure 231_1*b* may include rail protrusions and a recess that have a convex shape in the direction from the −z-axis to the z-axis.

The first lower arm rail 231_1*c* may be disposed to extend in the −x-axis direction with respect to the first lower arm body 231_1*a*. The first lower arm rail 231_1*c* may have a shape protruding in the −y-axis and y-axis directions. A first cam structure 231_1*c*1 (e.g., a structure including at least one ridge and valley) brought into contact with the first cam member 241 may be disposed on one region of the first lower arm rail 231_1*c* that faces in the −y-axis direction. A protrusion protruding in the −y-axis direction from the center of the first lower arm rail 231_1*c* may be used to couple the first cam member 241 and may serve to press the first cam member 241 in the −z-axis direction to reduce movement of the first cam member 241 in the z-axis direction (or, the −z-axis direction). A first slide rail 231_1*c*2 (or, a slide groove or a rail) having a helical shape is formed in the y-axis direction of the first lower arm rail 231_1*c*. The first slide rail 231_1*c*2 may be spaced apart from a second slide rail 231_2*c*2 formed on the first upper arm rail 231_2*c* by a predetermined gap and may form a first slide groove 231_*c*0. The first interlocking wing 263*a*1 of the interlocking member 260 may be coupled to the first slide groove 231_*c*0. A recess in which at least a portion of one side of the interlocking member 260 (e.g., a tail portion of the interlocking member 260) is mounted may be provided on one side of the first lower arm rail 231_1*c*.

The first upper arm rail structure 231_2*b* may be disposed to extend in the x-axis direction with respect to the first lower arm body 231_1*a*. The first upper arm rail structure 231_2*b* may include a protrusion on which the fifth elastic member 231_3 is mounted and a protrusion or recess (or, hole) fastened with the first lower arm rail structure 231_1*b*. For example, at least a portion of a section of the first upper arm rail structure 231_2*b* that faces in the −y-axis direction may have an inverted U-shape. A rail structure fastened with a rail on an opposite side of the fifth rail 221*c* may be formed on a surface of the first upper arm rail structure 231_2*b* that faces in the y-axis direction. The first upper arm rail structure 231_2*b* may include rail protrusions and a recess that have a convex shape in the direction from the −z-axis to the z-axis. The first upper arm rail structure 231_2*b* may be coupled with the first lower arm rail structure 231_1*b* to form the fifth rail structure 231_1*b* and 231_2*b*.

The first upper arm rail 231_2*c* may be disposed to extend in the −x-axis direction with respect to the first upper arm body 231_2*a*. The first upper arm rail 231_2*c* may have a shape protruding in the −y-axis and y-axis directions. A second cam structure 231_2*c*1 (e.g., a structure including at least one ridge and valley) brought into contact with the second cam member 242 may be disposed on one region of the first upper arm rail 231_2*c* that faces in the y-axis direction. A protrusion protruding in the y-axis direction from the center of the first upper arm rail 231_2*c* may be used to couple the second cam member 242 and may serve to press the second cam member 242 in the −z-axis direction to reduce movement of the second cam member 242 in the z-axis direction (or, the −z-axis direction). The second slide rail 231_2*c*2 (or, the slide groove or the rail) having a helical shape is formed in the −y-axis direction of the first upper arm rail 231_2*c*. The second slide rail 231_2*c*2 may be spaced apart from the first slide rail 231_1*c*2 formed on the first lower arm rail 231_1*c* by a predetermined gap and may form the first slide groove 231_*c*0. A recess in which at least a portion of one side of the interlocking member 260 (e.g., a head portion of the interlocking member 260) is mounted may be provided on one side of the first upper arm rail 231_2*c*.

The second arm member 232 may have a structure symmetrical to the first arm member 231 with respect to the y-axis and may have a configuration and a size that are the same as or similar to those of the first arm member 231.

For example, the second arm member 232 may include the second lower arm structure 232_1, the second upper arm structure 232_2, and the sixth elastic member 232_3 (or, the elastic member of the second arm). The second lower arm structure 232_1 may include the second lower arm body 232_1*a*, the second lower arm rail structure 232_1*b*, and the second lower arm rail 232_1*c* that have forms the same as, or similar to, those of the first lower arm structure 231_1 described above. The second upper arm structure 232_2 may include the second upper arm body 232_2*a*, the second upper arm rail structure 232_2*b*, and the second upper arm rail 232_2*c* that have structures the same as, or similar to, those of the first upper arm structure 231_2 described above.

The second lower arm rail structure 232_1*b* may be engaged with the second upper arm rail structure 232_2*b*, and the second lower arm rail 232_1*c* may be engaged with the second upper arm rail 232_2*c*. The sixth elastic member 232_3 may be seated between the second lower arm rail structure 232_1*b* and the second upper arm rail structure 232_2*b* to provide an elastic force in the −y-axis or y-axis direction and may reduce the possibility of separation of the second lower arm rail structure 232_1*b* and the second upper arm rail structure 232_2*b* from the sixth rail 222*c* of the second link member 222.

The second lower arm rail 232_1*c* and the second upper arm rail 232_2*c* may include a second slide groove 232_*c*0 formed by a third slide rail 232_1*c*2 and a fourth slide rail 232_2*c*2 spaced apart from each other by a predetermined gap. At least a portion of the second interlocking wing 263*a*2 of the interlocking member 260 may be seated in or coupled to the second slide groove 232_*c*0. A third cam structure 232_1*c*1 (or, a first cam structure of the second arm member 232) may be disposed on one side of the second lower arm rail structure 232_1*b* (e.g., an edge in the −y-axis direction), and a fourth cam structure 232_2*c*1 (or, a second cam structure of the second arm member 232) may be disposed on one side of the second upper arm rail structure 232_2*b* (e.g., an edge in the y-axis direction).

As described above, the first arm member 231 provides the same structure and role as the second arm member 232 except for the oppositely disposed portions. Accordingly, at least part of description of each component of the first arm member 231 may be identically applied to the second arm member 232, and at least part of description of each component of the second arm member 232 may also be identically applied to the first arm member 231. Therefore, parts not described in relation to each component of the second arm member 232 may be described in the same or similar manner through the drawings illustrated in FIGS. 10 and 11 and the above description about the first arm member 231.

Figure 12:
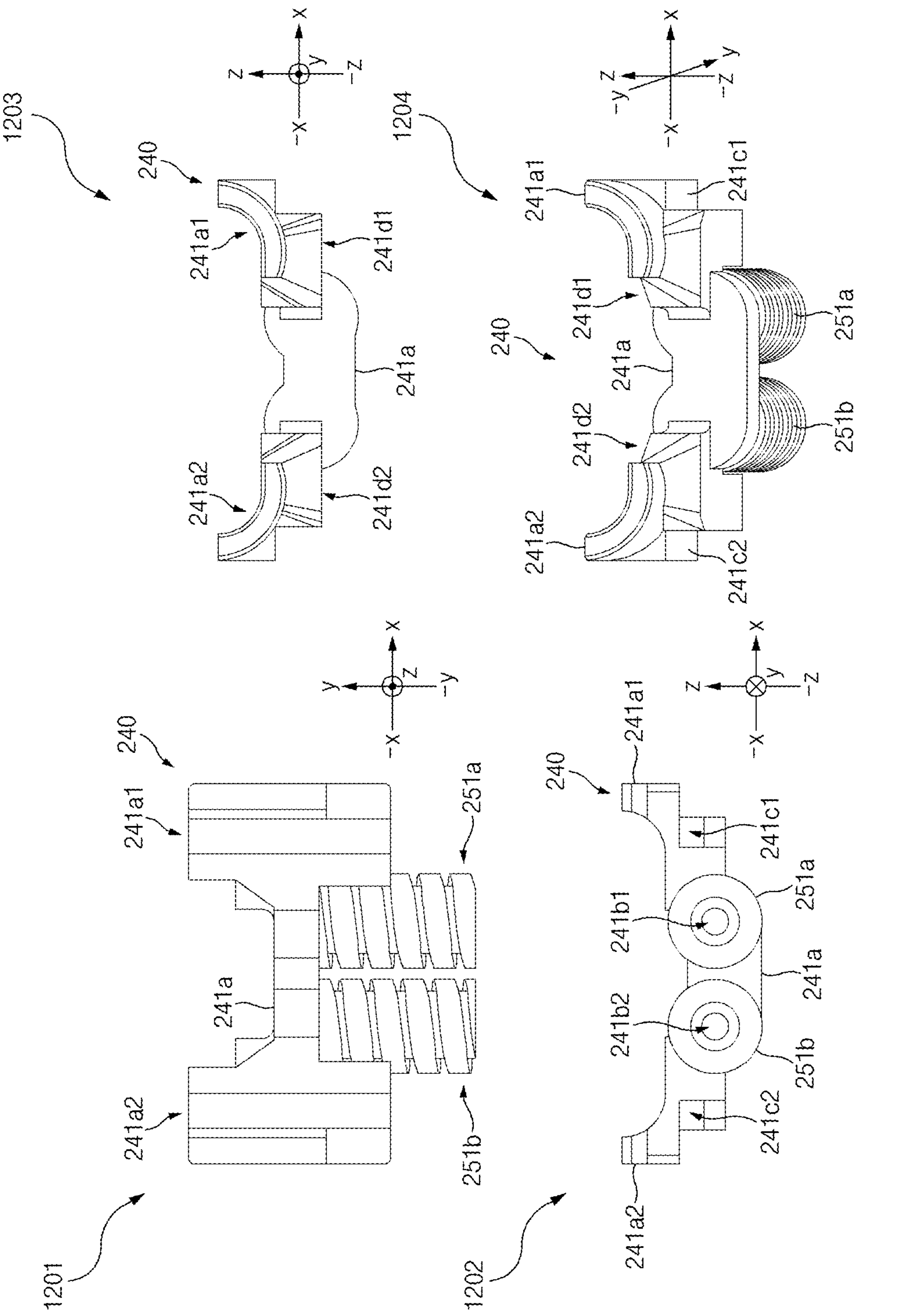
FIG. 12 is a view illustrating one example of cam members according to an embodiment.

FIG. 12 is a view illustrating one example of the cam members according to an embodiment. In FIG. 12, FIG. 1201 is a view illustrating one example of front surfaces of the cam members that face in the z-axis direction, FIG. 1202 is a view illustrating one example of side surfaces of the cam members that face in the y-axis direction, FIG. 1203 is a view illustrating one example of side surfaces of the cam members that face in the −y-axis direction, and FIG. 1204 is a view illustrating one example of a state in which the cam members are inclined in the y-axis direction at a predetermined angle.

Referring to FIGS. 5 to 12, the illustrated cam member is an example of the first cam member 241 of the first and second cam members 241 and 242 described above with reference to FIG. 5. The second cam member 242 may have the same shape and structure as the first cam member 241 and may differ from the first cam member 241 in terms of the position. Accordingly, description of the structure of the second cam member 242 is replaced with description of the structure of the first cam member 241.

The first cam member 241 may include a cam body 241*a*, a first cam wing 241*a*1, a second cam wing 241*a*2, a first cam protrusion 241*b*1, and a second cam protrusion 241*b*2.

The first cam wing 241*a*1 may be formed to extend in the x-axis direction of the cam body 241*a*, and the second cam wing 241*a*2 may be formed to extend in the −x-axis direction of the cam body 241*a*. The first cam wing 241*a*1 may be formed of a curved surface, at least a portion of which is convex toward one direction between the x-axis and the −z-axis (a shape concave when viewed in the z-axis direction). The second cam wing 241*a*2 may be formed of a curved surface, at least a portion of which is convex toward one direction between the −x-axis and the −z-axis (a shape concave when viewed in the z-axis direction). A portion of the first arm member 231 (e.g., the cam protrusion protruding in the −y-axis direction in the first lower arm rail structure 231_1*b*) may be seated on at least a portion of a concave surface of the first cam wing 241*a*1, and a portion of the second arm member 232 (e.g., the protrusion protruding in the −y-axis direction in the second lower arm rail structure 232-1*b*) may be seated on at least a portion of a concave surface of the second cam wing 241*a*2.

The rear surface of the first cam wing 241*a*1 may include a first stepped portion 241*c*1, and the rear surface of the second cam wing 241*a*2 may include a second stepped portion 241*c*2. The first stepped portion 241*c*1 may be disposed to make contact with the first guide part 210*c*1_*a* provided on the fixed bracket 210, and the second stepped portion 241*c*2 may be disposed to make contact with the second guide part 210*c*1_*b* of the fixed bracket 210. While the first cam wing 241*a*1 and the second cam wing 241*a*2 perform a linear motion in the y-axis direction, the first stepped portion 241*c*1 and the second stepped portion 241*c*2 may guide the linear motion of the first cam wing 241*a*1

(may support the first cam wing 241a1 and the second cam wing 241a2 such that the moving directions are constant).

A first cam 241d1 may be formed on the rear surface of the first cam wing 241a1, and a second cam 241d2 may be formed on the rear surface of the second cam wing 241a2. The first cam 241d1 and the second cam 241d2 may have a concave-convex shape in which at least a portion protrudes in the y-axis direction and at least another portion is recessed in the y-axis direction. The first cam 241d1 may be brought into contact with the first cam structure 231_1c1 formed on the first lower arm rail structure 231_1b of the first arm member 231, and the second cam 241d2 may be brought into contact with the second cam structure 231_2c1 formed on the second lower arm rail structure 232_1b of the second arm member 232 to provide a cam function (or, a detent function) of the electronic device 100. In this process, the first elastic member 251a and the second elastic member 251b coupled to the first cam member 241 may push up the first cam wing 241a1 and the second cam wing 241a2 in the y-axis direction, and the fifth elastic member 231_3 provided in the first arm member 231 and the sixth elastic member 232_3 provided in the second arm member 232 may push down the first lower arm rail structure 231_1b and the second lower arm rail structure 232_1b in the −y-axis direction, respectively. Accordingly, while the first cam 241d1, the first cam structure 231_1c1, the second cam 241d2, and the second cam structure 231_2c1 rotate, the positions of ridges and valleys in contact with each other or the positions of ridges in contact with each other may be changed, and the distance between at least one point of the first cam 241d1 and the second cam 241d2 and at least one point of the first cam structure 231_1c1 and the second cam structure 231_2c1 may be changed. The elastic forces provided by the elastic members may be changed to frictional force or torque for free-stop of the electronic device. The shape of the first cam 241d and the second cam 241d2 in the −y-axis direction may be provided as a predetermined recess shape to guide at least part of the first elastic member 251a and the second elastic member 251b mounted on the first cam protrusion 241b1 and the second cam protrusion 241b2.

The first cam protrusion 241b1 and the second cam protrusion 241b2 may protrude in the −y-axis direction from the cam body 241a and may be space apart from each other by a predetermined gap. One side of the first elastic member 251a may be mounted on the first cam protrusion 241b1, and one side of the second elastic member 251b may be mounted on the second cam protrusion 241b2. An opposite side of the first elastic member 251a and an opposite side of the second elastic member 251b may be fixed to the fixed bracket 210.

Figure 13:
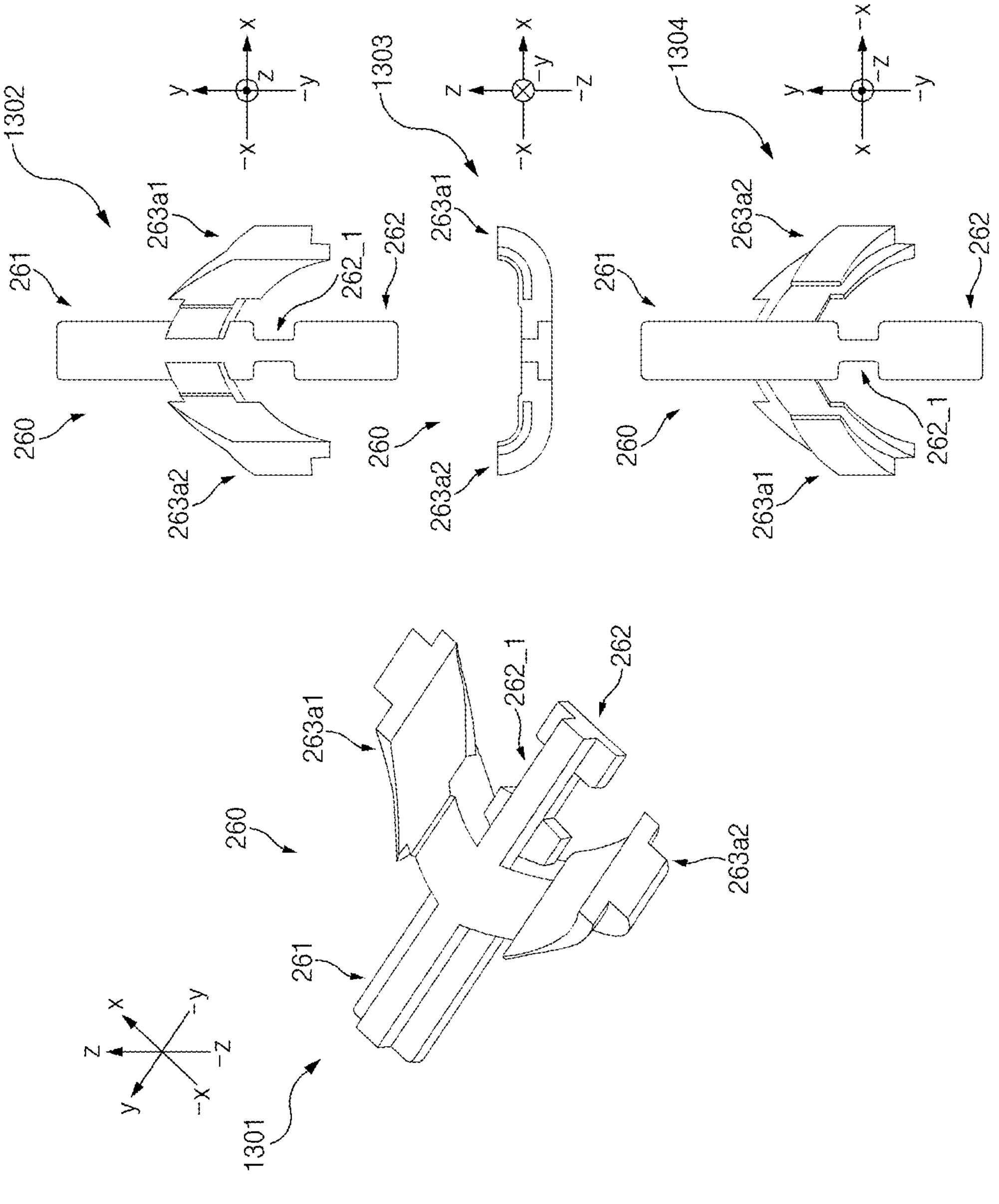
FIG. 13 is a view illustrating one example of an interlocking member according to an embodiment.

FIG. 13 is a view illustrating one example of the interlocking member according to an embodiment. In FIG. 13, FIG. 1301 is a perspective view of the interlocking member, FIG. 1302 is a view illustrating one example of a front surface of the interlocking member that faces in the z-axis direction, FIG. 1303 is a view illustrating one example of a side surface of the interlocking member that faces in the y-axis direction, and FIG. 1304 is a view illustrating one example of a rear surface of the interlocking member that faces in the −z-axis direction.

Referring to FIGS. 5 to 13, the interlocking member 260 may include an upper support part 261, a lower support part 262, the first interlocking wing 263a1, and the second interlocking wing 263a2.

The upper support part 261 may be formed such that the length in the y-axis direction is longer than the length in the x-axis direction and may include a rail protrusion protruding in the z-axis direction. The x-axis section of the upper support part 261 may include, for example, an inverted T shape. The left and right edges of the upper support part 261 may be mounted on the second interlocking guide part 210a2 provided on the fixed bracket 210 and may be supported so as not to deviate from a specified path while performing a linear motion. The upper support part 261 may convert the rotational force transmitted through the first interlocking wing 263a1 and the second interlocking wing 263a2 into a straight line. For example, the upper support part 261 may perform a linear motion in the y-axis direction while the electronic device 100 is changed from an unfolded state to a folded state and may perform a linear motion in the −y-axis direction while the electronic device 100 is changed from the folded state to the unfolded state.

The first interlocking wing 263a1 may be bent in the z-axis direction while extending from one edge (e.g., the −y-axis edge) of the upper support part 261 in an oblique direction between the x-axis and the −y-axis. The first interlocking wing 263a1 may be seated in the first slide groove 231_c0 formed on the first arm member 231. The first interlocking wing 263a1 moves along the first slide groove 231_c0 while the first arm member 231 rotates, thereby changing the rotational force of the first arm member 231 to a straight line. The second interlocking wing 263a2 may be bent in the z-axis direction while extending from one edge (e.g., the −y-axis edge) of the upper support part 261 in an oblique direction between the −x-axis and the −y-axis. The second interlocking wing 263a2 may be formed to have bilateral symmetry with respect to the upper support part 261. The second interlocking wing 263a2 may be seated in the second slide groove 232_c0 formed on the second arm member 232. The second interlocking wing 263a2 moves along the second slide groove 232_c0 while the second arm member 232 rotates, thereby changing the rotational force of the second arm member 232 to a straight line. When the first arm member 231 and the second arm member 232 rotate while the electronic device 100 is changed from a folded state to an unfolded state or from the unfolded state to the folded state, the first interlocking wing 263a1 seated in the first slide groove 231_c0 of the first arm member 231 and the second interlocking wing 263a2 seated in the second slide groove 232_c0 of the second arm member 232 may convert the rotational force depending on the rotation of the first arm member 231 and the second arm member 232 into a linear motion while moving along the slide grooves. Accordingly, the first arm member 231 and the second arm member 232 may simultaneously operate through the interlocking member 260. Thus, the torsion of the housings 110 and 120 between folding and unfolding operations may be reduced, or the occurrence of noise may be reduced.

The lower support part 262 may extend from the −y-axis edge of the upper support part 261 in the −y-axis direction. The lower support part 262 performs a linear motion in the same direction as the upper support part 261. In this process, the lower support part 262 may be supported while being mounted on the first interlocking guide part 210a1 formed on the fixed bracket 210 so as not to deviate from a set travel path. An assembly recess 262_1 used to couple the interlocking member 260 between the first arm member 231 and the second arm member 232 may be formed on one side of the lower support part 262.

Figure 14:
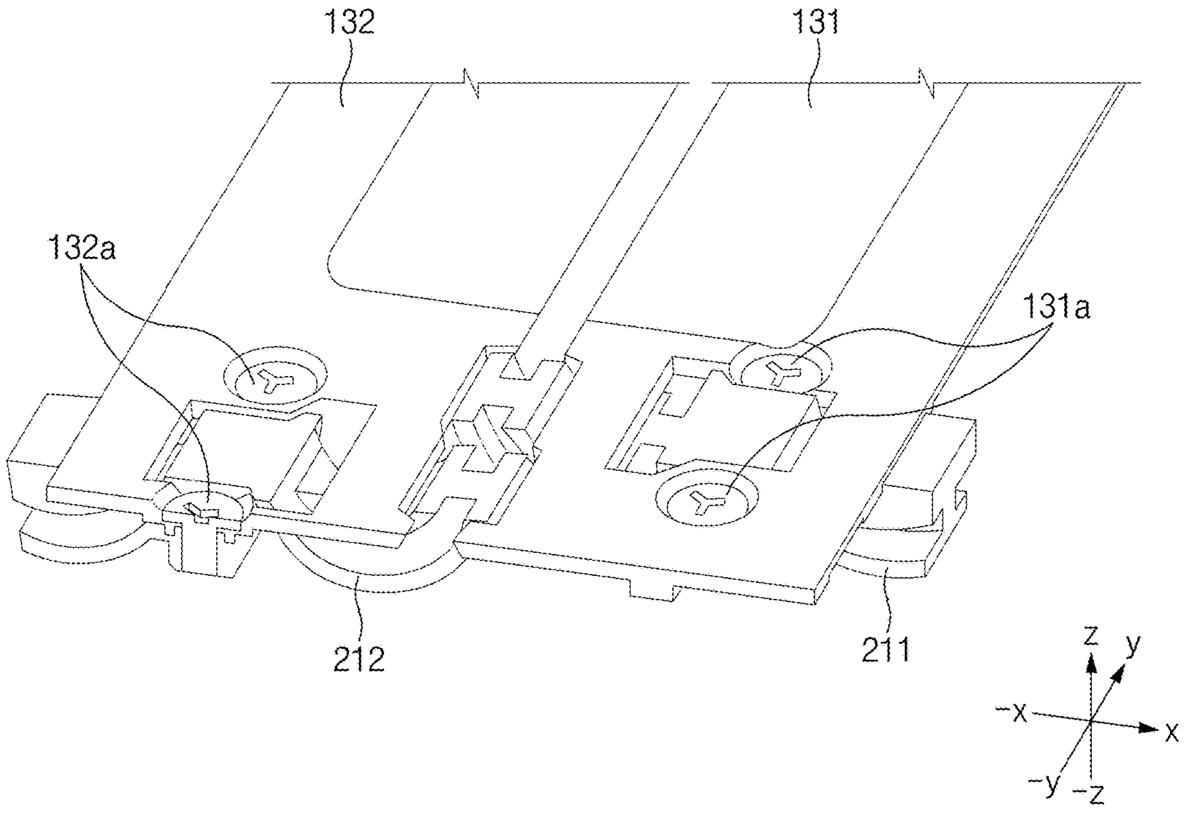
FIG. 14 is a view illustrating one example of a coupled state between wing plates and the rotating members according to an embodiment.

FIG. 14 is a view showing one example of a coupled state between the wing plates and the rotating members according to an embodiment.

Referring to FIGS. 1 to 14, the electronic device 100 according to an embodiment may include at least the first wing plate 131 and the second wing plate 132 disposed under the display 160.

The first wing plate 131 may be aligned with the first rotation fixing part 211*d* formed on one side of the first rotating member 211 and may be fixed to the first rotating member 211 by using a separate first fastening member 131*a*. The first fastening member 131*a* may include, for example, a screw or a bolt. The first fastening member 131*a* may be inserted in the direction from the z-axis to the −z-axis to fix one side of the first wing plate 131 to the first rotating member 211 in a state in which a hole of the first rotation fixing part 211*d* and a hole of the first wing plate 131 are aligned with each other. In this regard, the first wing plate 131 may include at least one hole aligned with at least one hole formed in the first rotation fixing part 211*d*. Since the rear surface of the display 160 is placed on the front surface of the first wing plate 131, the display 160 may be damaged by the first fastening member 131*a* when the first fastening member 131*a* further protrudes beyond the front surface of the first wing plate 131 in the z-axis direction. Correspondingly, in a process in which the first fastening member 131*a* couples the first wing plate 131 to the first rotating member 211, the upper surface (e.g., a surface facing in the z-axis direction) of the first fastening member 131*a* may be disposed in a lower position than a peripheral portion of the first wing plate 131 (e.g., so as to be located on the same plane as a front portion of the first wing plate 131 or located under the front portion).

Identically or similarly to the first wing plate 131, the second wing plate 132 may include at least one hole corresponding to at least one hole formed in the second rotation fixing part 212*d* of the second rotating member 212. In a state in which the at least one hole formed in the second wing plate 132 is aligned with the at least one hole formed in the second rotation fixing part 212*d*, the second wing plate 132 may be fixed to the second rotating member 212 while a second fastening member 132*a* is inserted into the holes. After the second fastening member 132*a* fixes the second wing plate 132 to the second rotating member 212, the upper surface of the second fastening member 132*a* based on the z-axis may be located in a lower position in the −z-axis direction than a front portion of the second wing plate 132 (e.g., the upper surface of the second fastening member 132*a* and the front portion of the second wing plate 132 may be located on the same plane, or the upper surface of the second fastening member 132*a* may be located in a lower position in the −z-axis direction than the front portion of the second wing plate 132).

Meanwhile, although the coupling of one hinge structure (e.g., 200*b*) provided on one side and the wing plates 131 and 132 is illustrated in the illustrated drawing, the above-described coupling of the rotating members 211 and 212 and the wing plates 131 and 132 may be identically applied to hinge structures (e.g., 200*a* and 200*c*) disposed at different positions. Correspondingly, the rotating members disposed in the plurality of hinge structures (e.g., the first rotating members or the second rotating members disposed in each hinge structure) may be coupled to one wing plate (e.g., the first wing plate 131 or the second wing plate 132). Referring to the drawing illustrated in FIG. 1, the rotating members disposed in the first hinge structure 200*a*, the second hinge structure 200*b*, and the third hinge structure 200*c* may be coupled to the y-axis edge, the −y-axis edge, and the center of the first wing plate 131 and the second wing plate 132. Furthermore, although the first wing plate 131 and the second wing plate 132 are illustrated as having a structure extending in the y-axis direction, the disclosure is not limited thereto. For example, each of the wing plates 131 and 132 may be divided into a plurality of pieces, and the pieces supporting the rear surface of the display 160 may be coupled with the rotating members of the hinge structures 200*a*, 200*b*, and 200*c*.

The first wing plate 131 coupled to the first rotating member 211 may rotate in the counterclockwise direction in response to rotation of the first rotating member 211 while the electronic device 100 is changed from an unfolded state to a folded state. The first wing plate 131 coupled to the first rotating member 211 may rotate in the clockwise direction in response to rotation of the first rotating member 211 while the electronic device 100 is changed from the folded state to the unfolded state. In response to rotation of the second rotating member 212 operating opposite to the first rotating member 211, the second wing plate 132 coupled to the second rotating member 212 may rotate in the clockwise direction while the electronic device 100 is changed from the unfolded state to the folded state and may rotate in the counterclockwise direction while the electronic device 100 is changed from the folded state to the unfolded state. In the unfolded state of the electronic device 100, the entire upper surfaces (e.g., surfaces facing in the z-axis direction) of the first wing plate 131 and the second wing plate 132 may support the third region 163 of the display 160, and in the folded state of the electronic device 100, at least portions of the first wing plate 131 and the second wing plate 132 may support at least a portion of the third region 163 of the display 160 (e.g., at least part of the flat regions 163*f*1 and 163*f*2 and the bent regions 163*a* and 163*b* of FIG. 3).

Figure 15:
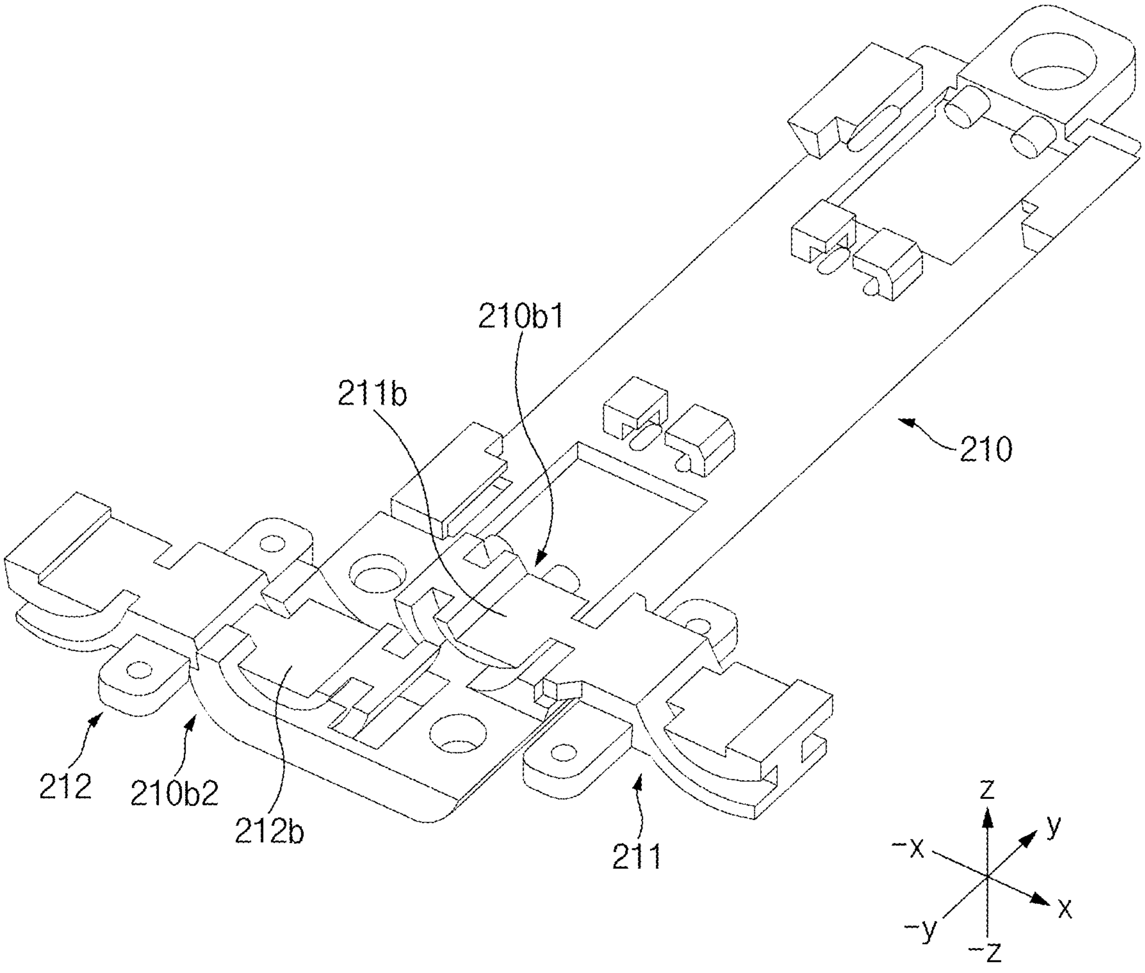
FIG. 15 is a view illustrating one example of an arrangement of the fixed bracket and the rotating members according to an embodiment.

FIG. 15 is a view illustrating one example of an arrangement of the fixed bracket and the rotating members according to an embodiment.

Referring to FIGS. 1 to 15, as described above with reference to FIG. 7, the fixed bracket 210 may include at least the first rail 210*b*1 to which a portion of the first rotating member 211 (e.g., the first rail structure 211*b*) is coupled and the second rail 210*b*2 to which a portion of the second rotating member 212 (e.g., the third rail structure 212*b*) is coupled. In the illustrated drawing, based on the y-axis, the second rail 210*b*2 is biased in the −y-axis direction, compared to the first rail 210*b*1. However, the disclosure is not limited thereto. For example, the second rail 210*b*2 coupled to the rotating member in the −x-axis direction may be disposed in front of the first rail 210*b*1 in the y-axis direction.

The first rail 210*b*1 may have an arc shape or a half-moon shape, and the first rail structure 211*b* of the first rotating member 211 that is coupled thereto may also have an arc shape or a half-moon shape. When the fixed bracket 210 is fixed to the hinge housing 150, the position of the first rail 210*b*1 may be fixed, and the first rail structure 211*b* may rotate in place along the first rail 210*b*1 (e.g., may rotate in the counterclockwise direction while the electronic device is changed from an unfolded state to a folded state and may rotate in the clockwise direction while the electronic device is changed from the folded state to the unfolded state). Identically or similarly, the second rail 210*b*2 may have an arc shape or a half-moon shape, and the third rail structure 212*b* of the second rotating member 212 that is coupled thereto may also have an arc shape or a half-moon shape. When the fixed bracket 210 is fixed to the hinge housing 150, the second rail 210*b*2 may be fixed like the first rail 210*b*1, and the third rail structure 212*b* may rotate in place along the second rail 210*b*2 (e.g., may rotate in the clockwise direction while the electronic device is changed from the unfolded state to the folded state and may rotate in the counterclockwise direction while the electronic device is changed from the folded state to the unfolded state).

Figure 16:
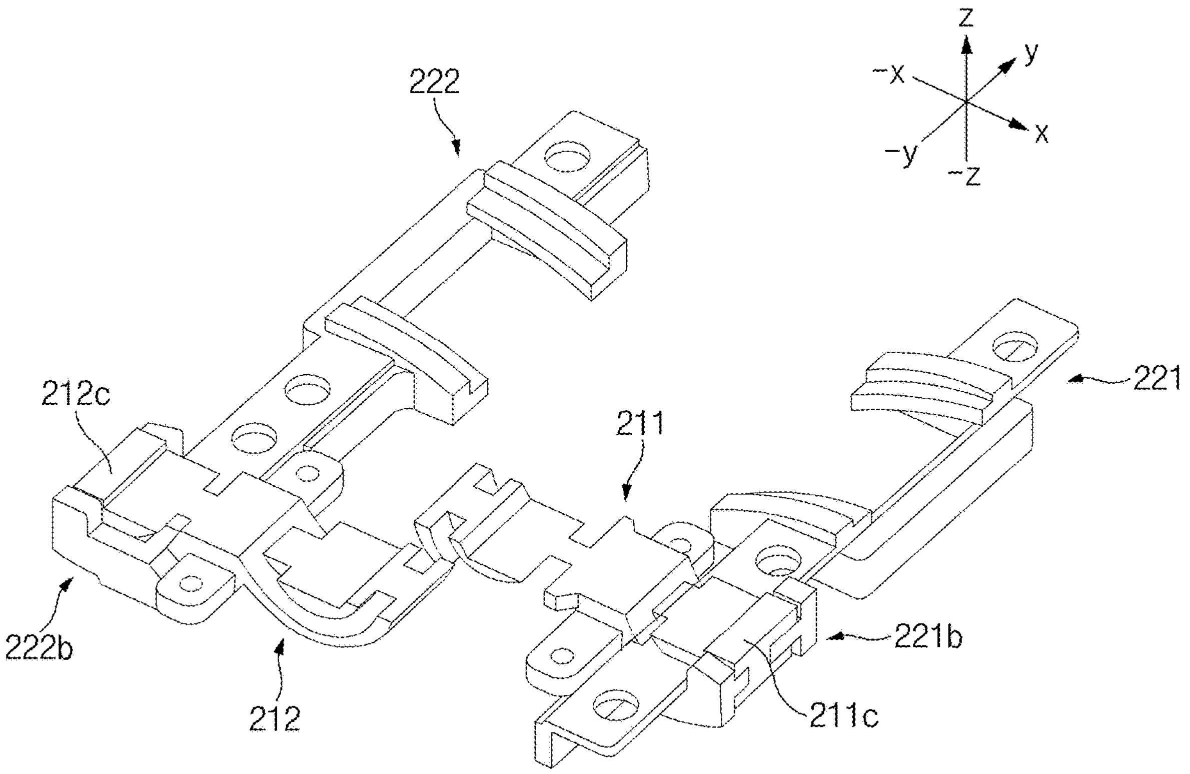
FIG. 16 is a view illustrating one example of an arrangement of the link members and the rotating members according to an embodiment.

FIG. 16 is a view illustrating one example of an arrangement of the link members and the rotating members according to an embodiment.

Referring to FIGS. 1 to 16, the first link member 221 may include at least the third rail 221*b* coupled with the second rail structure 211*c* of the first rotating member 211. As the fixed bracket 210 is fixed to the hinge housing 150 and the first rail structure 211*b* of the first rotating member 211 is fastened to the first rail 210*b*1 of the fixed bracket 210 as described above with reference to FIG. 15, movement of the first rotating member 211 in the x-axis or y-axis direction may be restricted, and the first rotating member 211 may rotate in the z-axis or −z-axis direction. Accordingly, in response to a change of state of the electronic device 100 (e.g., a change from a folded state to an unfolded state or from the unfolded state to the folded state), the first link member 221 coupled to the second rail structure 211*c* may rotate (e.g., may rotate in the counterclockwise direction while the electronic device 100 is changed from the unfolded state to the folded state and may rotate in the clockwise direction while the electronic device 100 is changed from the folded state to the unfolded state) with respect to one point of the first rail structure 211*b* of the first rotating member 211 (e.g., the first axis 11 about which the first rail structure 211*b* rotates).

The second link member 222 disposed at a position spaced apart from the first link member 221 by a predetermined gap may include at least the fourth rail 222*b* coupled with the fourth rail structure 212*c* of the second rotating member 212. As the fixed bracket 210 is fixed to the hinge housing 150 and the second rail structure 211*c* of the second rotating member 212 is fastened to the second rail 210*b*2 of the fixed bracket 210, movement of the second rotating member 212 in the x-axis or y-axis direction may be restricted, and the second rotating member 212 may rotate in the z-axis or −z-axis direction identically to the first rotating member 211. Accordingly, in response to a change of state of the electronic device 100 (e.g., a change from the folded state to the unfolded state or from the unfolded state to the folded state), the second link member 222 coupled to the fourth rail structure 212*c* of the second rotating member 212 may rotate (e.g., may rotate in the clockwise direction while the electronic device 100 is changed from the unfolded state to the folded state and may rotate in the counterclockwise direction while the electronic device 100 is changed from the folded state to the unfolded state) with respect to one point of the third rail structure 212*b* of the second rotating member 212 (e.g., the second axis 12 about which the third rail structure 212*b* rotates).

Figure 17:
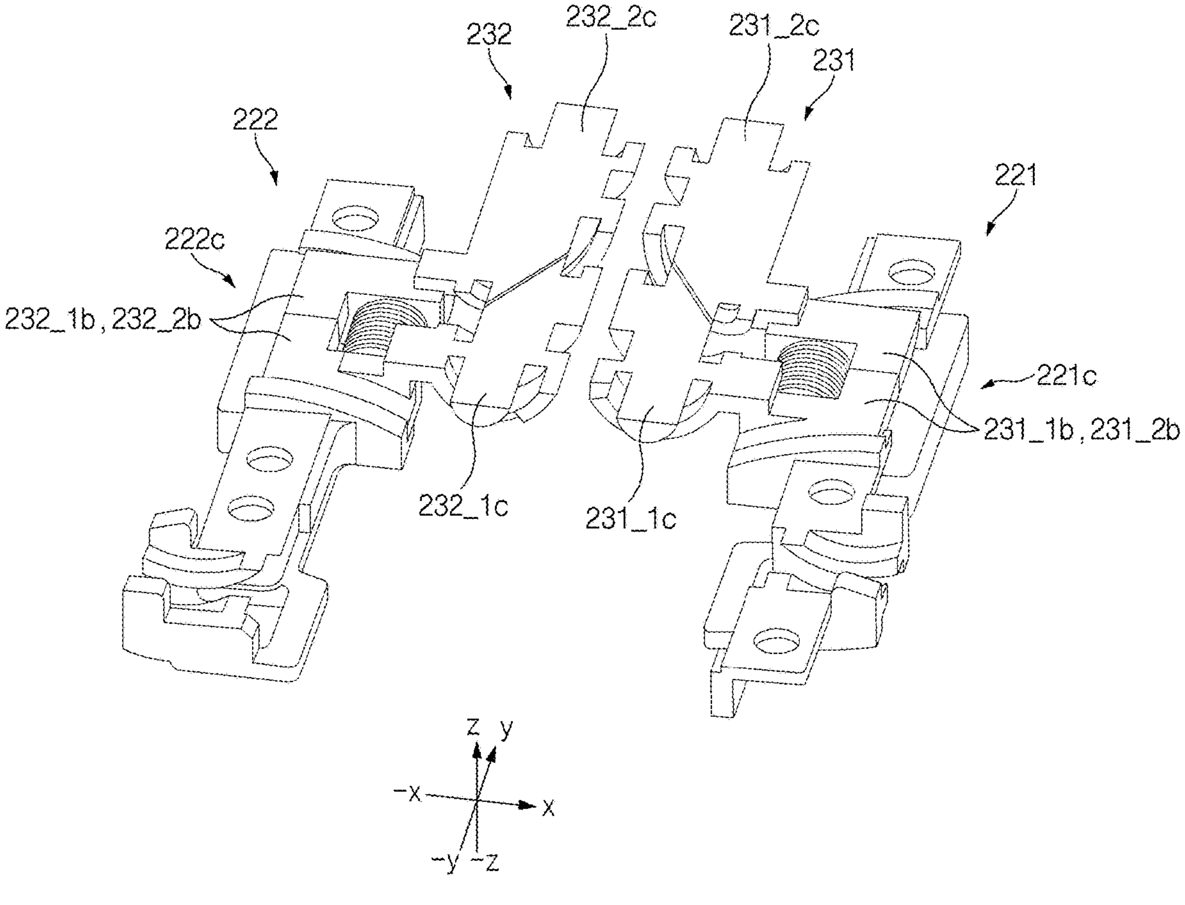
FIG. 17 is a view illustrating one example of an arrangement of the link members and the arm members according to an embodiment.

FIG. 17 is a view illustrating one example of an arrangement of the link members and the arm members according to an embodiment.

Referring to FIGS. 1 to 17, the fifth rail structure 231_1*b* and 231_2*b* of the first arm member 231 may be fastened to the fifth rail 221*c* of the first link member 221. While the first link member 221 coupled to the first housing 110 rotates in the counterclockwise direction in response to rotation of the first housing 110 (e.g., a change of the electronic device 100 from an unfolded state to a folded state), the fifth rail structure 231_1*b* and 231_2*b* fastened to the fifth rail 221*c* may also rotate in the counterclockwise direction. While the first link member 221 coupled to the first housing 110 rotates in the clockwise direction in response to rotation of the first housing 110 (e.g., a change of the electronic device 100 from the folded state to the unfolded state), the fifth rail structure 231_1*b* and 231_2*b* fastened to the fifth rail 221*c* may also rotate in the clockwise direction. While the fifth rail structure 231_1*b* and 231_2*b* rotates along a predetermined path in the counterclockwise or clockwise direction, the seventh rail 231_1*c* and 231_2*c* of the first arm member 231 may rotate in place in the counterclockwise or clockwise direction. While the fifth rail structure 231_1*b* and 231_2*b* of the first arm member 231 moves along a predetermined path with respect to one point of the seventh rail 231_1*c* and 231_2*c* (e.g., the seventh axis 17 about which the seventh rail 231_1*c* and 231_2*c* rotates in place), the fifth rail structure 231_1*b* and 231_2*b* may slide (or, rotate) along the fifth rail 221*c*.

The sixth rail structure 232_1*b* and 232_2*b* of the second arm member 232 disposed to face the first arm member 231 in the folded state of the electronic device 100 may be fastened to the sixth rail 222*c* of the second link member 222. While the second link member 222 coupled to the second housing 120 rotates in the clockwise direction in response to rotation of the second housing 120 (e.g., a change of the electronic device 100 from the unfolded state to the folded state), the sixth rail structure 232_1*b* and 232_2*b* fastened to the sixth rail 222*c* may also rotate in the clockwise direction. While the second link member 222 coupled to the second housing 120 rotates in the counterclockwise direction in response to rotation of the second housing 120 (e.g., a change of the electronic device 100 from the folded state to the unfolded state), the sixth rail structure 232_1*b* and 232_2*b* fastened to the sixth rail 222*c* may also rotate in the clockwise direction. While the sixth rail structure 232_1*b* and 232_2*b* rotates along a predetermined path in the clockwise or counterclockwise direction, the eighth rail 232_1*c* and 232_2*c* of the second arm member 232 may rotate in place in the clockwise or counterclockwise direction. While the sixth rail structure 232_1*b* and 232_2*b* of the second arm member 232 moves along a predetermined path with respect to one point of the eighth rail 232_1*c* and 232_2*c* (e.g., the eighth axis 18 about which the eighth rail 232_1*c* and 232_2*c* rotates in place), the sixth rail structure 232_1*b* and 232_2*b* may slide (or, rotate) along the sixth rail 222*c*.

Figure 18:
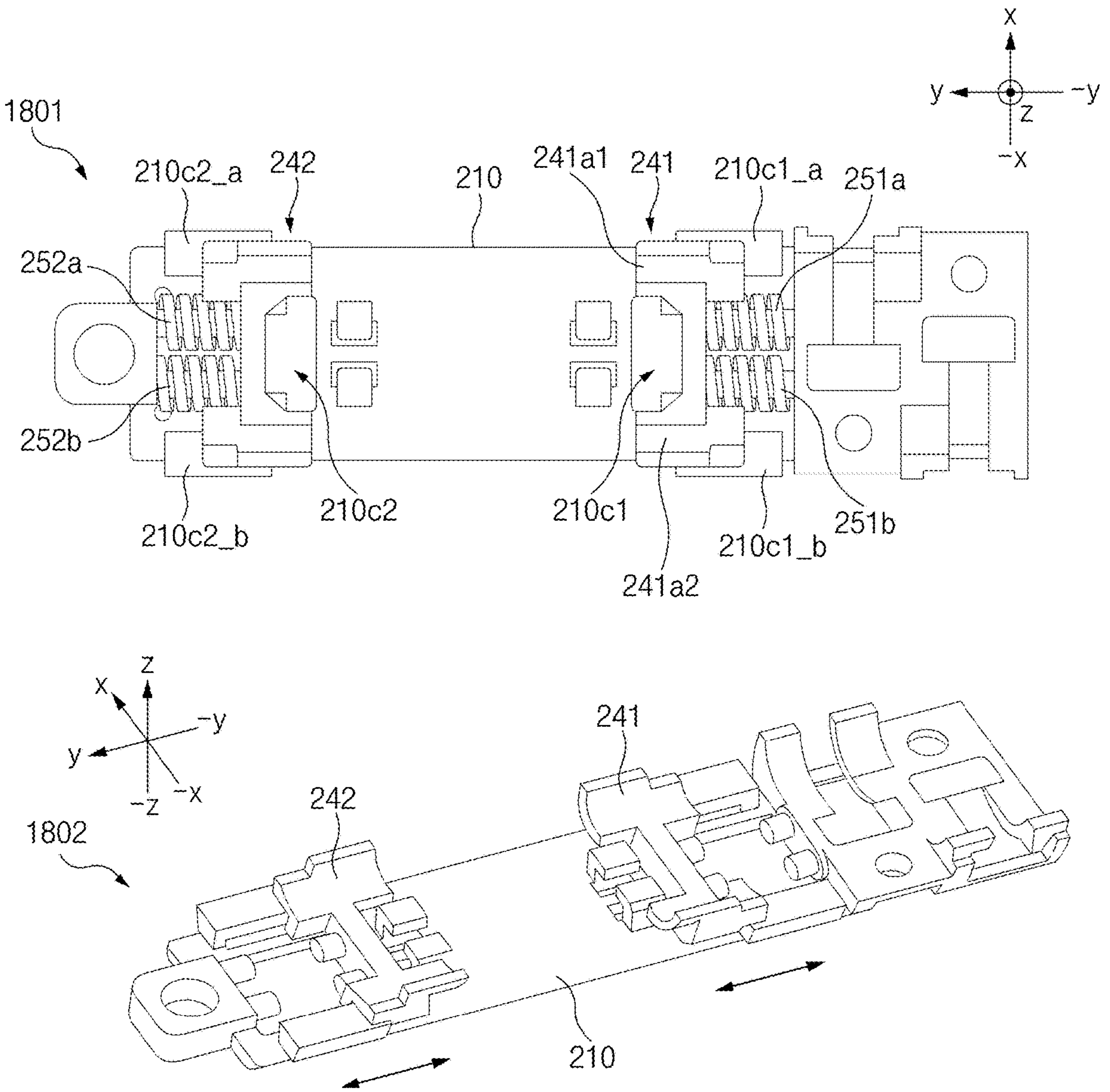
FIG. 18 is a view illustrating one example of an arrangement of the fixed bracket and the cam members according to an embodiment.

FIG. 18 is a view illustrating one example of an arrangement of the fixed bracket and the cam members according to an embodiment. In FIG. 18, FIG. 1801 is a front view illustrating one example of a coupled state of the fixed bracket and the cam members, and FIG. 1802 is a view illustrating one example of a state in which the fixed bracket and the cam members in the coupled state are inclined at a predetermined angle.

Referring to FIGS. 1 to 18, at least a portion of the first cam member 241 may be disposed in the first cam hole 210*c*1 of the fixed bracket 210. In this process, the first cam wing 241*a*1 of the first cam member 241 is disposed to make contact with the first guide part 210*c*1_*a* provided around the first cam hole 210*c*1, and the second cam wing 241*a*2 of the first cam member 241 is disposed to make contact with the second guide part 210*c*1_*b* provided around the first cam hole 210*c*1. The first elastic member 251*a* and the second elastic member 251*b* may be disposed between the first mounting part 210*c*1_*c* formed on the fixed bracket 210 and the first cam member 241. Here, the first mounting part 210*c*1_*c* may include protrusions protruding in the y-axis direction to mount the first elastic member 251*a* and the second elastic member 251*b*, and the first cam member 241 may include cam protrusions (e.g., the cam protrusions 241*b*1 and 241*b*2 of FIG. 12) for mounting the first elastic member 251*a* and the second elastic member 251*b*. The first cam member 241 disposed in the first cam hole 210*c*1 of the fixed bracket 210 may be brought into contact with the cam structures provided on the first arm member 231 and the second arm member 232 and may be moved in the y-axis direction or the −y-axis direction in response to rotation of the first arm member 231 and the second arm member 232. In this process, the first elastic member 251*a* and the second elastic member 251*b* may be compressed, and torque depending on the compression may increase a frictional force of the cam structures of the first arm member 231 and the second arm member 232. The frictional force applied to the first arm member 231 and the second arm member 232 may act to resist a rotary motion of the link members 221 and 222 coupled with the first arm member 231 and the second arm member 232 and a rotary motion of the housings 110 and 120 to which the link members 221 and 222 are fixed, and the electronic device 100 may provide a free-stop function (e.g., a function of maintaining a pause state of a specific angle between a folded state (0 degrees) and an unfolded state (180 degrees)).

At least a portion of the second cam member 242 may be disposed in the second cam hole 210*c*2 of the fixed bracket 210. In the illustrated drawing, the form in which the second cam member 242 is disposed is illustrated in a hole shape, but may be replaced with a recess. Similarly, the above-described first cam hole 210*c*1 may also be replaced with a recess shape. The first cam wing of the second cam member 242 is disposed to make contact with the third guide part 210*c*2_*a* provided around the second cam hole 210*c*2, and the second cam wing of the second cam member 242 is disposed to make contact with the fourth guide part 210*c*2_*b* provided around the second cam hole 210*c*2. The third elastic member 252*a* and the fourth elastic member 252*b* may be disposed between the second mounting part 210*c*2_*c* formed on the fixed bracket 210 and the second cam member 242. Here, the second mounting part 210*c*2_*c* may include protrusions protruding in the −y-axis direction to mount the third elastic member 252*a* and the fourth elastic member 252*b*, and the second cam member 242 may include cam protrusions for mounting the third elastic member 252*a* and the fourth elastic member 252*b*. The second cam member 242 disposed in the second cam hole 210*c*2 of the fixed bracket 210 may be brought into contact with the cam structures provided on the first arm member 231 and the second arm member 232 and may be moved in the y-axis direction or the −y-axis direction in response to rotation of the first arm member 231 and the second arm member 232. In this process, the third elastic member 252*a* and the fourth elastic member 252*b* may be compressed, and torque depending on the compression may increase a frictional force of the cam structures of the first arm member 231 and the second arm member 232. In addition to the frictional force converted from the first elastic member 251*a* and the second elastic member 251*b* described above, the frictional force to which the elastic force of the third elastic member 252*a* and the fourth elastic member 252*b* is changed may increase a force (e.g., frictional force) required for a detent function of the first arm member 231 and the second arm member 232.

Figure 19:
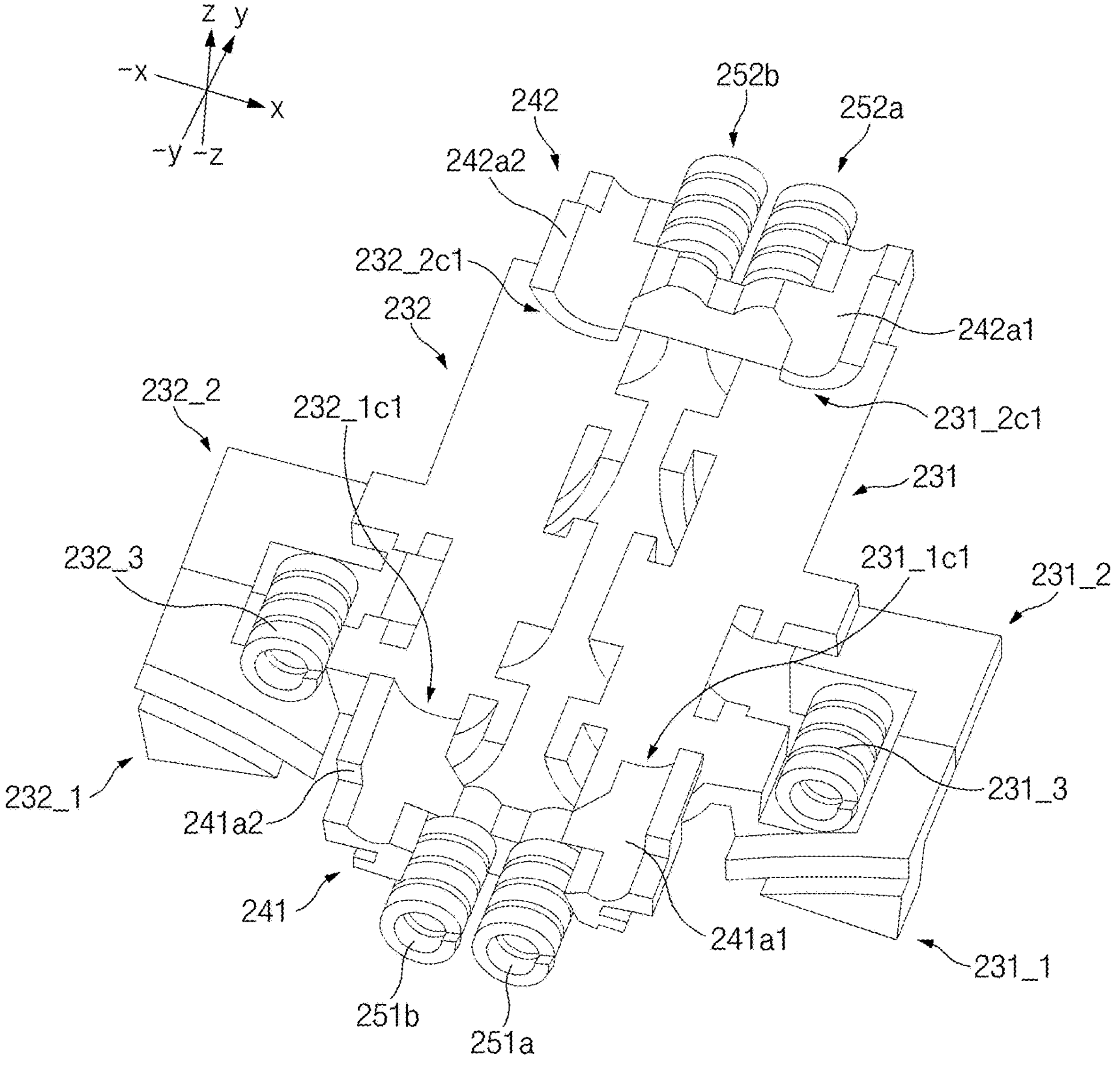
FIG. 19 is a view illustrating one example of an arrangement of the arm members and the cam members according to an embodiment.

FIG. 19 is a view illustrating one example of an arrangement of the arm members and the cam members according to an embodiment.

Referring to FIGS. 1 to 19, the first arm member 231 may include the first lower arm structure 231_1, the first upper arm structure 231_2, and the fifth elastic member 231_3, and the second arm member 232 may include the second lower arm structure 232_1, the second upper arm structure 232_2, and the sixth elastic member 232_3.

One side of the first lower arm structure 231_1 (e.g., the first cam structure 231_1*c*1 of the first lower arm rail 231_1*c*) may be brought into contact with the first cam wing 241*a*1 of the first cam member 241. One side of the first upper arm structure 231_2 (e.g., the second cam structure 231_2*c*1 of the first upper arm rail 231_2*c*) may be brought into contact with the first cam wing (or, the third cam wing 242*a*1) of the second cam member 242. The elastic force generated from the first elastic member 251*a* and the second elastic member 251*b* may press the first cam member 241 in the y-axis direction. The elastic force generated from the fifth elastic member 231_3 and the sixth elastic member 232_3 may press the first lower arm rail 231_1*c* and the second lower arm rail 232_1*c* in the −y-axis direction.

One side of the second lower arm structure 232_1 (e.g., the third cam structure 232_1*c*1 of the second lower arm rail 232_1*c*) may be brought into contact with the second cam wing 241*a*2 of the first cam member 241. One side of the second upper arm structure 232_2 (e.g., the fourth cam structure 232_2*c*1 of the second upper arm rail 232_2*c*) may be brought into contact with the second cam wing (or, the fourth cam wing 242*a*2) of the second cam member 242. The elastic force generated from the third elastic member 252*a* and the fourth elastic member 252*b* may press the second cam member 242 in the −y-axis direction. The elastic force generated from the fifth elastic member 231_3 and the sixth elastic member 232_3 may press the first upper arm rail 231_2*c* and the second upper arm rail 232_2*c* in the y-axis direction.

When the electronic device 100 is changed from an unfolded state to a folded state, the first arm member 231 may rotate in the counterclockwise direction, and the second arm member 232 may rotate in the clockwise direction. Correspondingly, the first cam structure 231_1*c*1 of the first arm member 231 performs a cam operation with the first cam wing 241*a*1 of the first cam member 241, and the third cam structure 232_1*c*1 of the second arm member 232 performs a cam operation with the second cam wing 241*a*2 of the first cam member 241. Furthermore, the second cam structure 231_2*c*1 of the first arm member 231 performs a cam operation with the third cam wing of the second cam member 242 (e.g., a cam wing corresponding to the first cam wing 241*a*1), and the fourth cam structure 232_2*c*1 of the second arm member 232 performs a cam operation with the fourth cam wing of the second cam member 242 (e.g., a cam wing corresponding to the second cam wing 241*a*2).

Figure 20:
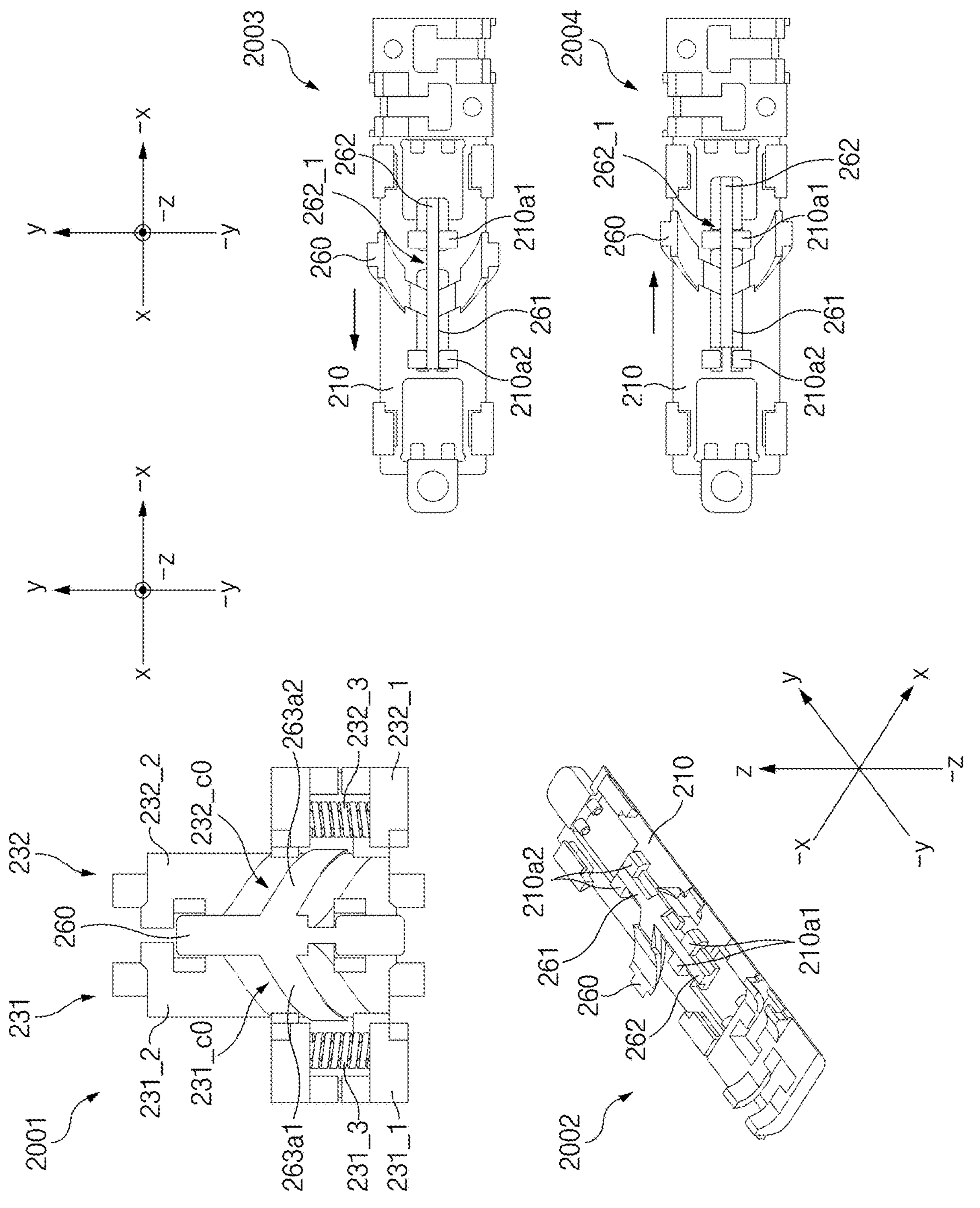
FIG. 20 is a view illustrating one example of an arrangement of the arm members and the interlocking member and an arrangement of the fixed bracket and the interlocking member according to an embodiment.

FIG. 20 is a view illustrating one example of an arrangement of the arm members and the interlocking member and an arrangement of the fixed bracket and the interlocking member according to an embodiment. In FIG. 20, FIG. 2001 is a view illustrating one example of a front surface in the z-axis direction in a state in which the arm members and the interlocking member are coupled, FIG. 2202 is a view illustrating one example of a coupled state of the fixed bracket and the interlocking member, FIG. 2203 is a view illustrating one example of a state in which the interlocking member is moved in the x-axis direction on the fixed bracket, and FIG. 2204 is a view illustrating one example of a state in which the interlocking member is moved in the −x-axis direction on the fixed bracket.

Referring to FIGS. 1 to 20, the arm members 231 and 232 according to an embodiment may include the first arm member 231 and the second arm member 232, the first arm member 231 may include the first lower arm structure 231_1 and the first upper arm structure 231_2 coupled with the fifth elastic member 231_3 therebetween, and the second arm member 232 may include the second lower arm structure 232_1 and the second upper arm structure 232_2 coupled with the sixth elastic member 232_3 therebetween. Here, the first slide groove **231_*c*0 may be formed while the first lower arm structure 231_1 and the first upper arm structure 231_2 are coupled, and the second slide groove 232_*c*0 may be formed while the second lower arm structure 232_1 and the second upper arm structure 232_2** are coupled.

The interlocking member 260 may include at least the first interlocking wing **263*a*1 inserted into the first slide groove 231_*c*0 and the second interlocking wing 263*a*2 inserted into the second slide groove 232_*c*0. Furthermore, the interlocking member 260 may include at least the lower support part 262 seated on the fixed bracket 210 and mounted on the first interlocking guide part 210*a*1 and the upper support part 261 extending from the lower support part 262 in the y-axis direction and mounted on the second interlocking guide part 210*a*2. The interlocking member 260 may include the assembly recess 262_1, and while the upper support part 261 of the interlocking member 260 is inserted into the second interlocking guide part 210*a*2, the assembly recess 262_1 may be used as a recess through which the first interlocking guide part 210*a*1 is coupled with the interlocking member 260**.

The interlocking member 260 performs a linear motion in the y-axis direction or the −y-axis direction in response to rotation of the first arm member 231 and the second arm member 232. For example, while the electronic device 100 is changed from a folded state to an unfolded state, the first arm member 231 may rotate in the clockwise direction, the second arm member 232 may rotate in the counterclockwise direction, and the interlocking member 260 coupled to the first arm member 231 and the second arm member 232 may move from the −y-axis direction to the y-axis direction. Correspondingly, at least a portion of the upper support part 261 of the interlocking member 260 may be hidden by the second interlocking guide part **210*a*2**.

While the electronic device 100 is changed from the unfolded state to the folded state, the first arm member 231 may rotate in the counterclockwise direction, the second arm member 232 may rotate in the clockwise direction, and the interlocking member 260 coupled to the first arm member 231 and the second arm member 232 may move from the y-axis direction to the −y-axis direction. Correspondingly, at least a portion of the upper support part 261 of the interlocking member 260 may be disposed in a position beyond the second interlocking guide part **210*a*1 when viewed in the direction from the z-axis to the −z-axis (or, when viewed from the front to the back of the display 160). Furthermore, when viewed in the direction from the z-axis to the −z-axis, the assembly recess 262_1 of the interlocking member 260 may be disposed in a position aligned with the first interlocking guide part 201*a*1**.

Figure 21:
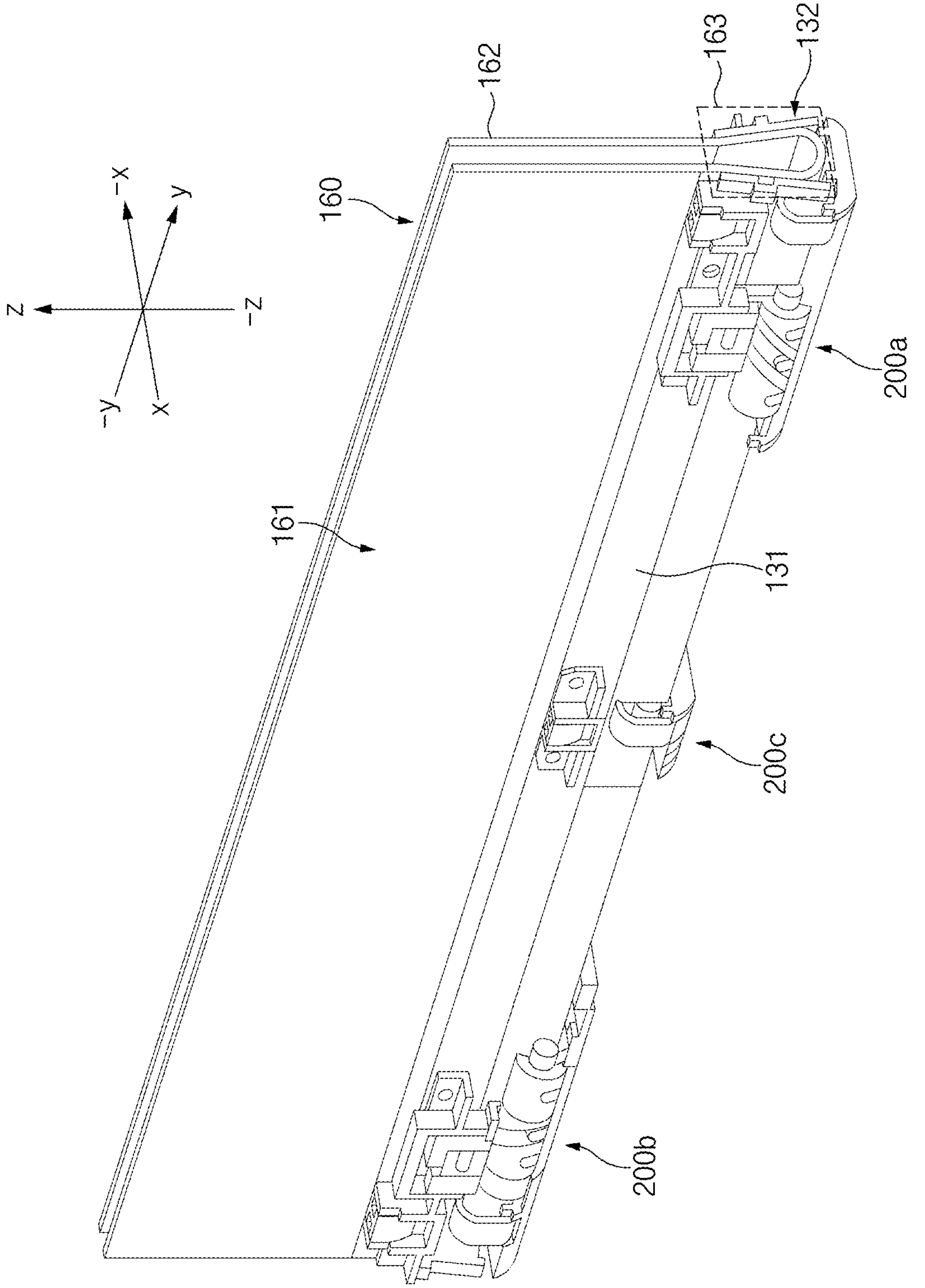
FIG. 21 is a view illustrating a folded state (close) of the display and a plurality of hinge structures according to an embodiment.

FIG. 21 is a view illustrating a folded state (close) of the display and the plurality of hinge structures according to an embodiment.

Referring to FIGS. 1 to 21, in the folded state (close), the display 160 may include the flat first region 161, the flat second region 162, and the third region 163 disposed between the first region 161 and the second region 162. Here, when the electronic device 100 is in the folded state (close), one surface of the first region 161 (e.g., a surface facing in the x-axis direction in the folded state (close) of the electronic device 100) and one surface of the second region 162 (e.g., a surface facing in the −x-axis direction in the folded state (close) of the electronic device 100) may be disposed to face each other. The first wing plate 131 may be disposed on a surface of the third region 163 that faces in the x-axis direction, and the second wing plate 132 may be disposed on a surface of the third region 163 that faces in the −x-axis direction. A convex region of the third region 163 that faces in the −z-axis direction may be disposed in a predetermined region (e.g., a triangular empty space) formed by the hinge structures **200*a*, 200*b*, and 200*c*, the first wing plate 131, and the second wing plate 132**.

The hinge structure 200 (or, the hinge structures **200*a* and 200*b*) may include, for example, the interlocking hinge structures 200*a* and 200*b* that include the arm members (e.g., the first arm member 231 and the second arm member 232 of FIG. 5) and that are disposed at opposite edges of the display 160 (e.g., a y-axis edge and a −y-axis edge of a folded region when the electronic device 100 is in the folded state (close)) and the non-interlocking hinge structure 200*c* disposed between the interlocking hinge structures 200*a* and 200*b*. In the illustrated drawing, the structure in which one non-interlocking hinge structure 200*c* is disposed is illustrated. However, the disclosure is not limited thereto, and the non-interlocking hinge structure 200*c*** may be omitted, or two or more non-interlocking hinge structures may be disposed.

Figure 22:
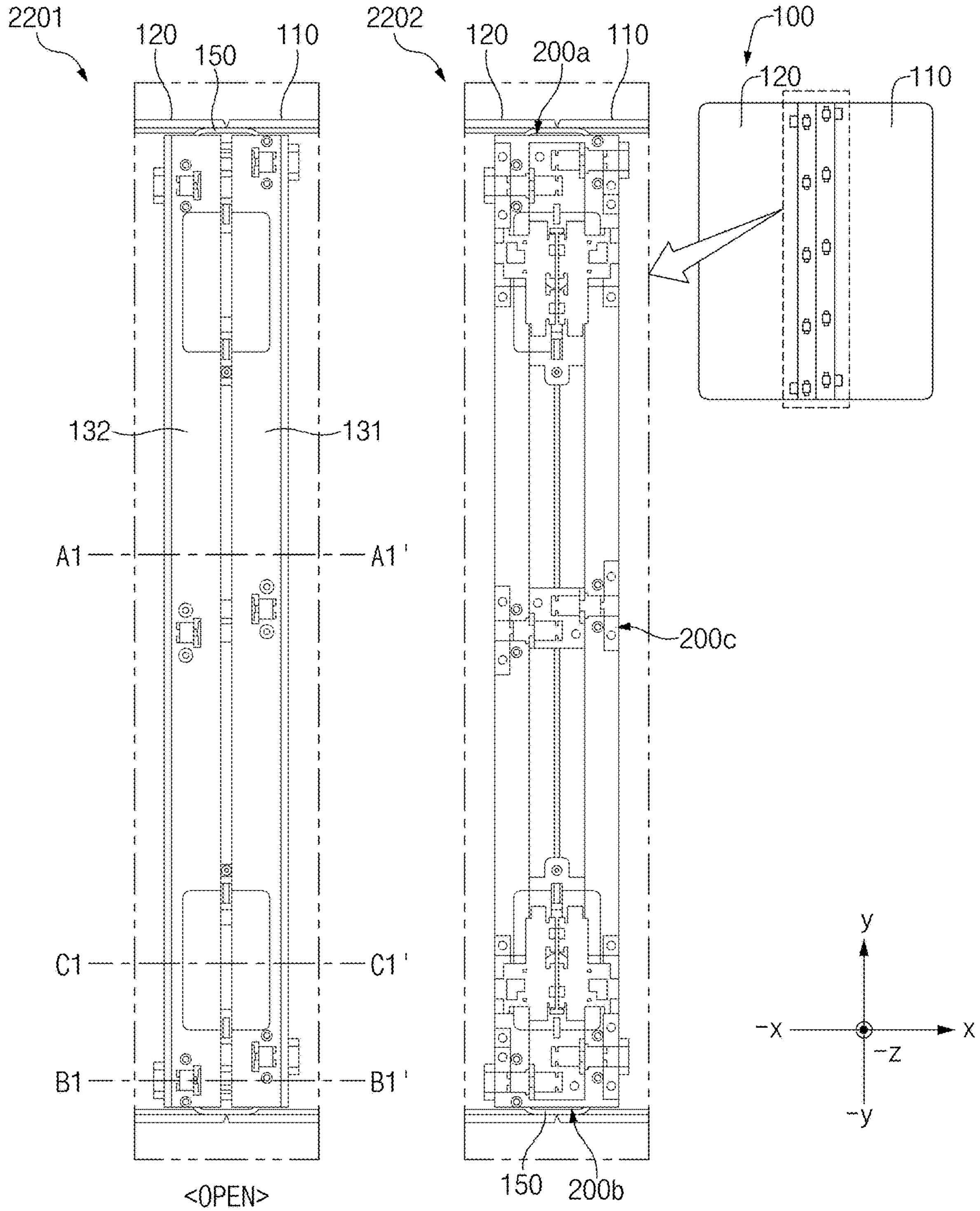
FIG. 22 is a view illustrating a portion where the first type hinge structure of the electronic device is disposed according to an embodiment.
Figure 23:
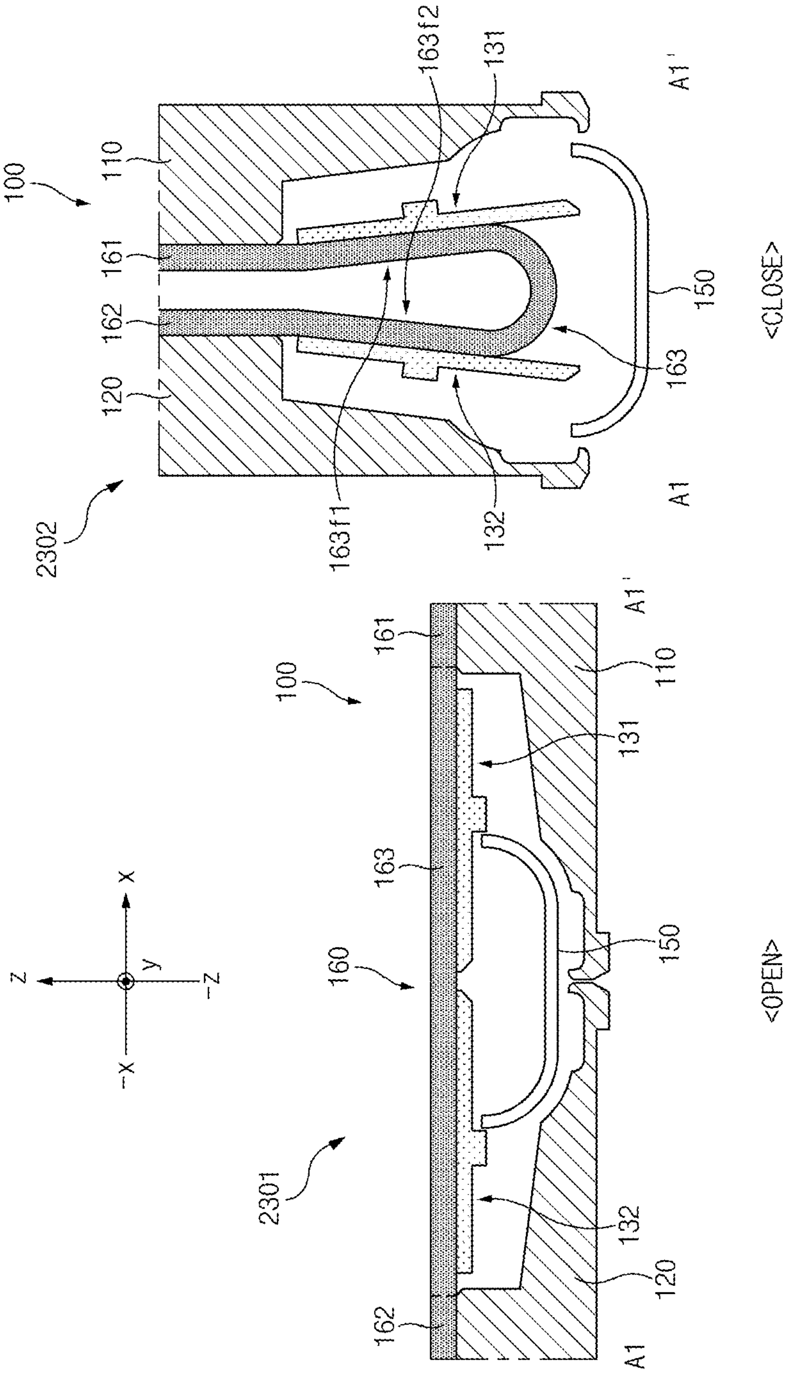
FIG. 23 is a sectional view taken along line A1-A1' of FIG. 22.
Figure 24:
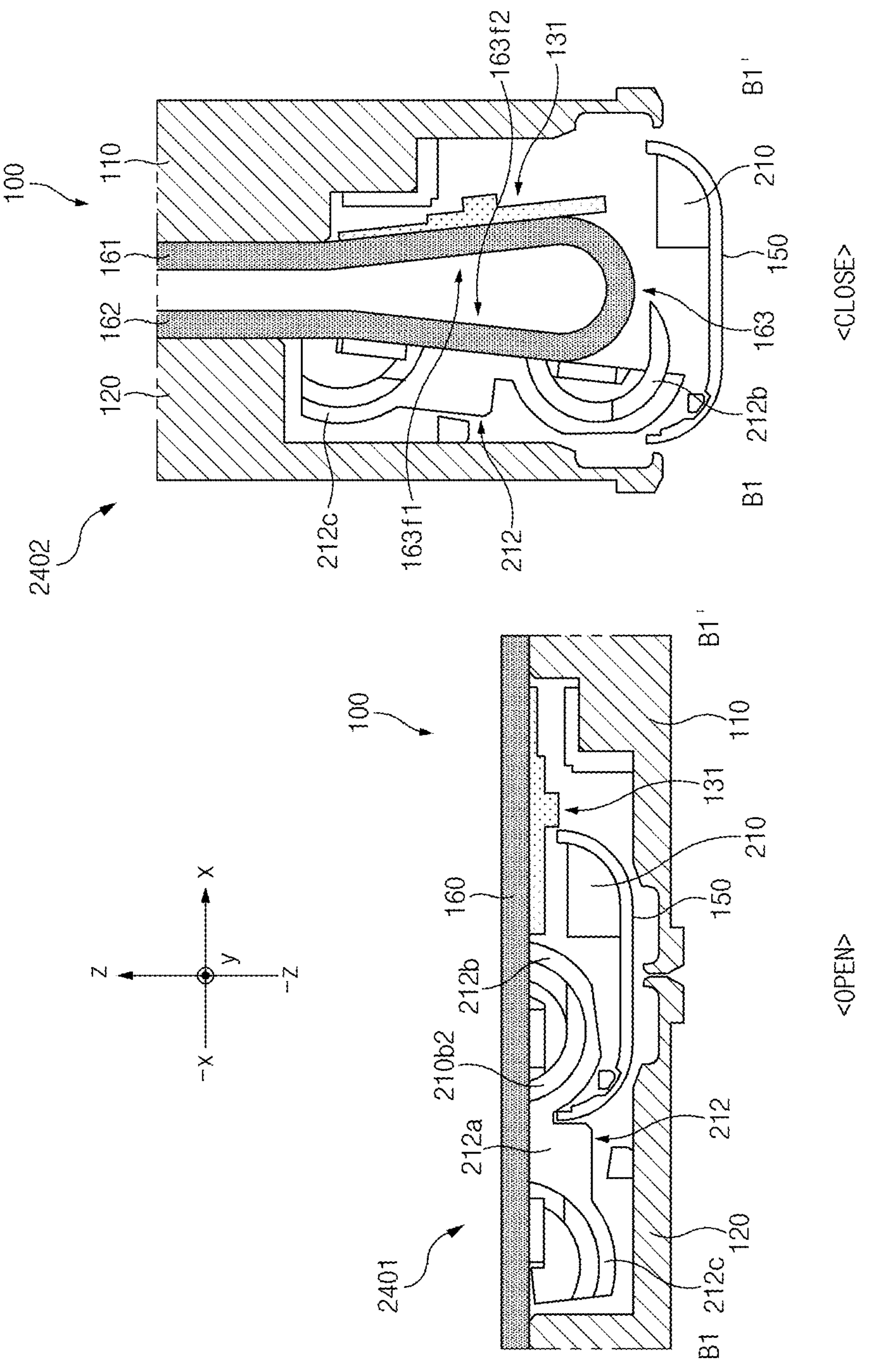
FIG. 24 is a sectional view taken along line B1-B1' of FIG. 22.
Figure 25:
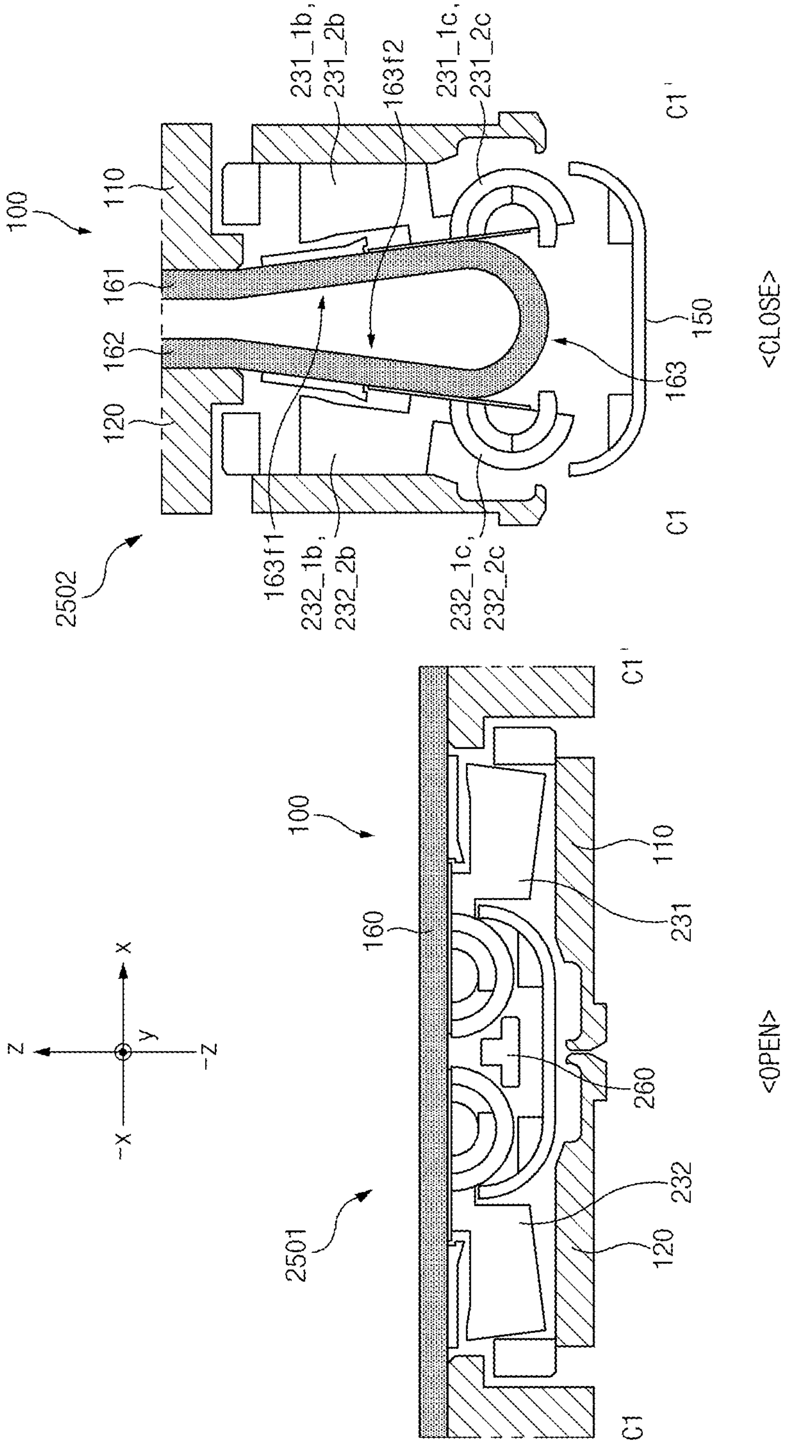
FIG. 25 is a sectional view taken along line C1-C1' of FIG. 22.

FIG. 22 is a view illustrating a portion where the first type hinge structure of the electronic device is disposed according to an embodiment, and FIG. 23 is a sectional view taken along line A1-A1' of FIG. 22. FIG. 24 is a sectional view taken along line B1-B1' of FIG. 22, and FIG. 25 is a sectional view taken along line C1-C1' of FIG. 22. In FIG. 22, FIG. 2201 is a view illustrating one example of a partial region in which the wing plates are disposed when the electronic device including the first type hinge structure is in an unfolded state, and FIG. 2202 is a view illustrating one example of a partial region in which the wing plates are removed when the electronic device including the first type hinge structure is in the unfolded state. In FIG. 23, FIG. 2301 is a view illustrating one example of a section taken along line A1-A1' of FIG. 22 when the electronic device including the first type hinge structure is in the unfolded state, and FIG. 2302 is a view illustrating one example of a section taken along line A1-A1' of FIG. 22 when the electronic device including the first type hinge structure is in a unfolded state. In FIG. 24, FIG. 2401 is a view illustrating one example of a section taken along line B1-B1' of FIG. 22 when the electronic device including the first type hinge structure is in the unfolded state, and FIG. 2402 is a view illustrating one example of a section taken along line B1-B1' of FIG. 22 when the electronic device including the first type hinge structure is in the folded state. In FIG. 25, FIG. 2501 is a view illustrating one example of a section taken along line C1-C1' of FIG. 22 when the electronic device including the first type hinge structure is in the unfolded state, and FIG. 2502 is a view illustrating one example of a section taken along line C1-C1' of FIG. 22 when the electronic device including the first type hinge structure is in the folded state.

Referring to FIGS. 1 to 23, when external pressure is applied to the first housing 110 and the second housing 120 of the electronic device 100, the first housing 110 and the second housing 120 may have a folded state (close) or an unfolded state (open). In the folded state (close), the first housing 110 and the second housing 120 may be disposed side by side in the z-axis direction.

When the electronic device 100 is in the folded state (close), the display 160 may have the first region 161 and the second region 162 facing each other and the third region 163. The third region 163 may have a water-drop shape that is convex in the −z-axis direction as illustrated. The first wing plate 131 supports the first flat region **163*f*1 of the third region 163 while at least a portion thereof is brought into contact with a portion of the third region 163 in the x-axis direction. The second wing plate 132 supports the second flat region 163*f*2 of the third region 163 while at least a portion thereof is brought into contact with a portion of the third region 163 in the −x-axis direction. When the electronic device 100 is in the folded state (close), the first distance between the first wing plate 131 and the second wing plate 132 located at an edge in the z-axis direction may be shorter than the second distance between the first wing plate 131 and the second wing plate 132 located at an edge in the −z-axis direction. For example, when the electronic device 100 is in the folded state, the first wing plate 131 and the second wing plate 132 may be disposed in a shape that is open in the −z-axis direction. The third region 163 of the display 160 may be disposed in a predetermined space formed by the depression of the first housing 110, the depression of the second housing 120, and the hinge housing 150**.

When the electronic device 100 is in the unfolded state, the first housing 110 and the second housing 120 may be disposed in parallel on the xy plane. Alternatively, when the electronic device 100 is in the unfolded state (open), the first housing 110 and the second housing 120 may be disposed side by side. When the electronic device 100 is changed from the folded state (close) to the unfolded state (open) while at least a portion of the hinge housing 150 is exposed to the outside, the hinge housing 150 may be hidden by the first housing 110 and the second housing 120. When the electronic device 100 is in the unfolded state, the display 160 may be disposed in the unfolded state. In this regard, the convex shape of the folded state (close) may be released, and the third region 163 between the first region 161 and the second region 162 may be changed to a flat state.

Referring to FIGS. 1 to 24, FIG. 24 illustrates a section obtained by cutting a region including a state in which the second rotating member 212 is coupled to the fixed bracket 210 and illustrates a folded state (close) and an unfolded state (open) of the corresponding section. In the folded state (close) of the electronic device 100, the first housing 110 and the second housing 120 may be disposed side by side in the z-axis direction, and the first region 161 and the second region 162 of the display 160 may be disposed to face each other. In the folded state (close) of the electronic device 100, the third region 163 may be disposed to be convex in the −z-axis direction. While the central portion of the display 160 forms the third region 163 having a convex shape, the first wing plate 131 (or, the second wing plate) may be disposed to support at least part of the flat regions **163*f*1 and 163*f*2 of the third region 163. Furthermore, in the folded state (close) of the electronic device 100, at least a portion of the upper surface (e.g., a surface facing in the z-axis direction in the unfolded state (open) of the electronic device 100) of the second rotating member 212 (or, the entire upper surface of the fourth rail structure 212*c* of the second rotating member 212 and a portion of the third rail structure 212*b*) may support the flat region 163*f*2 of the third region 163. Similarly, in the folded state (close) of the electronic device 100, at least a portion of the upper surface (e.g., a surface facing in the z-axis direction in the unfolded state (open) of the electronic device 100) of the first rotating member 211 (or, the entire upper surface of the second rail structure 211*c* of the first rotating member 211 and a portion of the first rail structure 211*b*) may support the flat region 163*f*1 of the third region 163. The third rail structure 212*b* of the second rotating member 212 may have a state of being rotated in place in the clockwise direction within the second rail 210*b*2 of the fixed bracket 210 seated on the hinge housing 150, and the fourth rail structure 212*c* may be disposed in a state of being moved in the clockwise direction together with the sixth rail 222*c***.

In the unfolded state (open) of the electronic device 100, the first housing 110 and the second housing 120 may be disposed side by side in the x-axis direction (or, on the xy plane), and the first region 161 and the second region 162 of the display 160 may be disposed to face the same direction. In the folded state (close) of the electronic device 100, the third region 163 having a convex shape may be changed to a flat state. In a state in which the display 160 is disposed flat to face in the z-axis direction, the first wing plate 131 (or, the second wing plate) may be disposed to support the rear surface of the display 160 in the unfolded state (open). The entire upper surface of the third rail structure **212*b* of the second rotating member 212 may be disposed on the second rail 210*b*2 of the fixed bracket 210 fixed to the hinge housing 150 to support a portion of the rear surface of the display 160. Furthermore, at least a portion of the upper surface (e.g., a surface facing in the z-axis direction) of the fourth rail structure 212*c* of the second rotating member 212 and at least a portion of the upper surface of the second rotating body 212*a* may be brought into contact with the rear surface of the display 160 (e.g., a region in which at least the third region 163 of the display 160 is flat) and may support the display 160**.

Referring to FIGS. 1 to 25, FIG. 25 illustrates a section obtained by cutting a region in which the first arm member 231 and the second arm member 232 are disposed and illustrates a folded state (close) and an unfolded state (open) of the corresponding section. In the folded state (close) of the electronic device 100, the first housing 110 and the second housing 120 may be disposed side by side in the z-axis direction. Correspondingly, the first region 161 and the second region 162 of the display 160 may be disposed to face each other, and the third region 163 may be disposed to be convex in the −z-axis direction. While the central portion of the display 160 forms the third region 163 having a convex shape, at least part of the first arm member 231 and the second arm member 232 may be disposed to support at least part of the flat regions **163*f*1 and 163*f*2 of the third region 163. While the electronic device 100 is changed from the unfolded state (open) to the folded state (close), the seventh rail 231_1*c* and 231_2*c* of the first arm member 231 may perform a rotary motion in place, and the fifth rail structure 231_1*b* and 231_2*b* of the first arm member 231 may be moved in the counterclockwise direction. Similarly, while the electronic device 100 is changed from the unfolded state (open) to the folded state (close), the eighth rail 232_1*c* and 232_2*c* of the second arm member 232 may perform a rotary motion in place, and the sixth rail structure 232_1*b* and 232_2*b* of the second arm member 232** may be moved in the clockwise direction.

In the unfolded state (open) of the electronic device 100, the first housing 110 and the second housing 120 may be disposed side by side in the x-axis direction (or, on the xy plane). Correspondingly, the first region 161 and the second region 162 of the display 160 may be disposed to face the same direction, and the third region 163 having a convex shape may be changed to a flat state. The upper surface (e.g., a surface facing in the z-axis direction) of the first arm member 231 and the upper surface of the second arm member 232 may be disposed to support at least a portion of the rear surface of the display 160. While the first arm member 231 and the second arm member 232 rotate, the interlocking member 260 fastened to the first arm member 231 and the second arm member 232 may link motions of the first arm member 231 and the second arm member 232 while changing rotary motions of the first arm member 231 and the second arm member 232 to linear motions.

Figure 26:
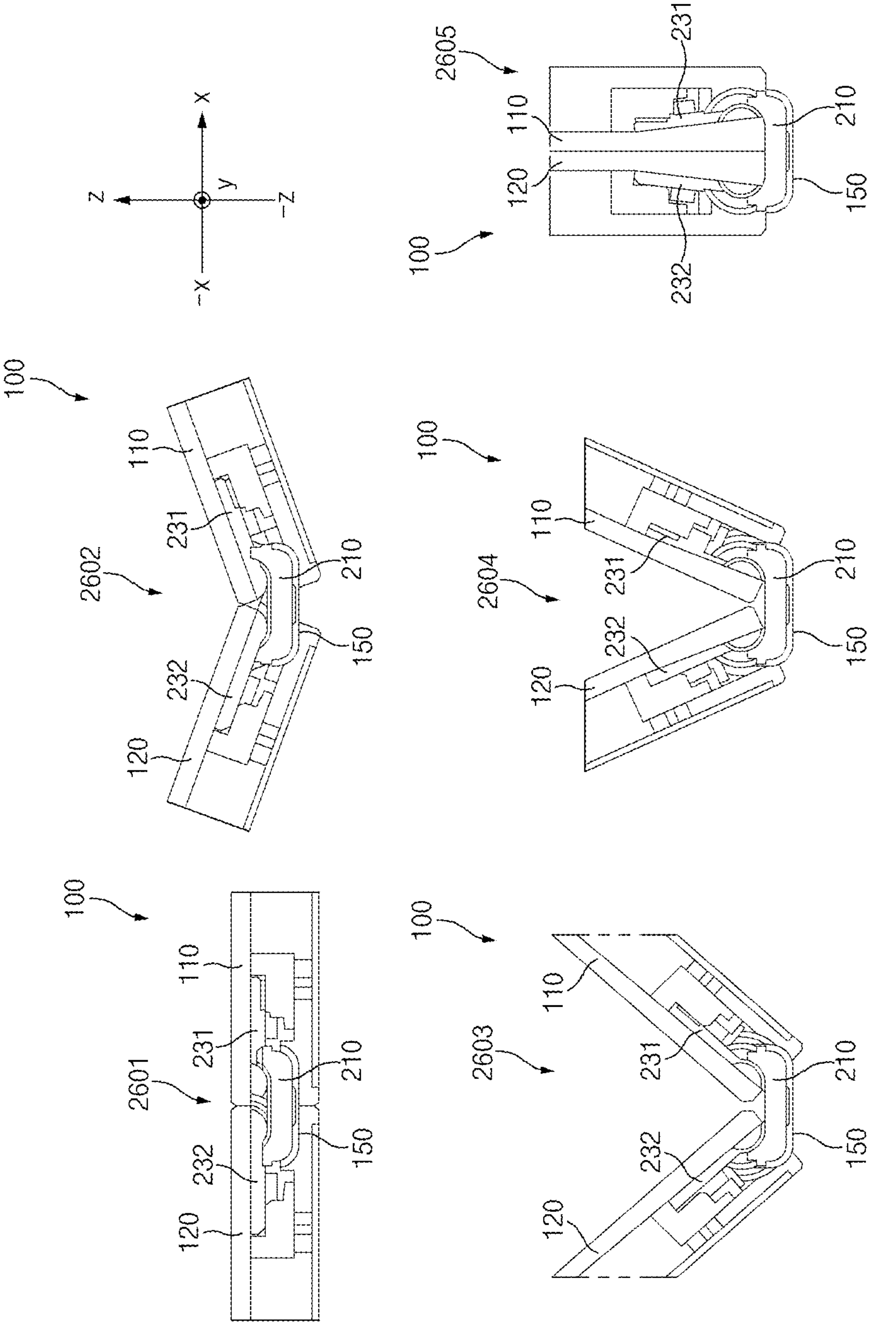
FIG. 26 is a view illustrating one example of a change of state of the electronic device according to an embodiment.

FIG. 26 is a view illustrating one example of a change of state of the electronic device according to an embodiment.

Referring to FIGS. 1 to 26, as in state 2601, the electronic device 100 may have an unfolded state (open). In the unfolded state (open), the first housing 110 and the second housing 120 may be disposed to face the same direction (e.g., the z-axis direction). When the electronic device 100 is in the unfolded state (open), the hinge housing 150 may be disposed in a state of being hidden by the first housing 110 and the second housing 120. When the electronic device 100 is in the unfolded state (open), the upper surface of the first arm member 231 and the upper surface of the second arm member 232 may be disposed to face in the z-axis direction.

When external pressure is applied to at least one of the first housing 110 or the second housing 120, a first angle may be formed between the first housing 110 and the second housing 120 as in state 2602. The first angle may be an angle smaller than 180 degrees and an angle greater than 90 degrees. At least one cam member disposed on the fixed bracket 210 (e.g., the first cam member 241 and the second cam member 242 described with reference to FIG. 5) may provide a detent function of the first angle based on a frictional force by an elastic force applied by the elastic members (e.g., the first to sixth elastic members 251*a*, 251*b*, 252*a*, 252*b*, 231_3, and 232_3) while being engaged with at least one cam structure formed on the first arm member 231 and the second arm member 232 (e.g., the cam structures 231_1*c*1, 232_1*c*1, 231_2*c*1, and 232_2*c*1 described with reference to FIG. 10 or 11).

When additional external pressure is applied to at least one of the first housing 110 or the second housing 120 in state 2602, a second angle may be formed between the first housing 110 and the second housing 120 as in state 2603. The second angle may be 90 degrees. As described above, the first housing 110 and the second housing 120 may have a state of being temporarily fixed at the second angle, based on contact of at least one cam member and at least one cam structure and at least one elastic member.

When additional external pressure is applied to at least one of the first housing 110 or the second housing 120 in state 2603, a third angle may be formed between the first housing 110 and the second housing 120 as in state 2604. The third angle may be an angle smaller than 90 degrees and greater than 0 degrees. The third angle may be temporarily maintained based on a frictional force generated based on contact of at least one cam member and at least one cam structure of the electronic device 100 and at least one elastic member.

When additional external pressure is applied to at least one of the first housing 110 or the second housing 120 in state 2604 or the pressure applied from the outside is released, the first housing 110 and the second housing 120 may be disposed side by side in the z-axis direction as in state 2605. At this time, the separation distance between the first arm member 231 and the second arm member 232 may be formed such that the distance from an edge in the −z-axis direction is greater than the distance from an edge in the z-axis direction, and a space formed by the fixed bracket 210, the first arm member 231, and the second arm member 232 may have a triangular shape. The folding region of the display 160 having a water-drop shape convex in the −z-axis direction may be disposed in the triangular empty space.

Figure 27:
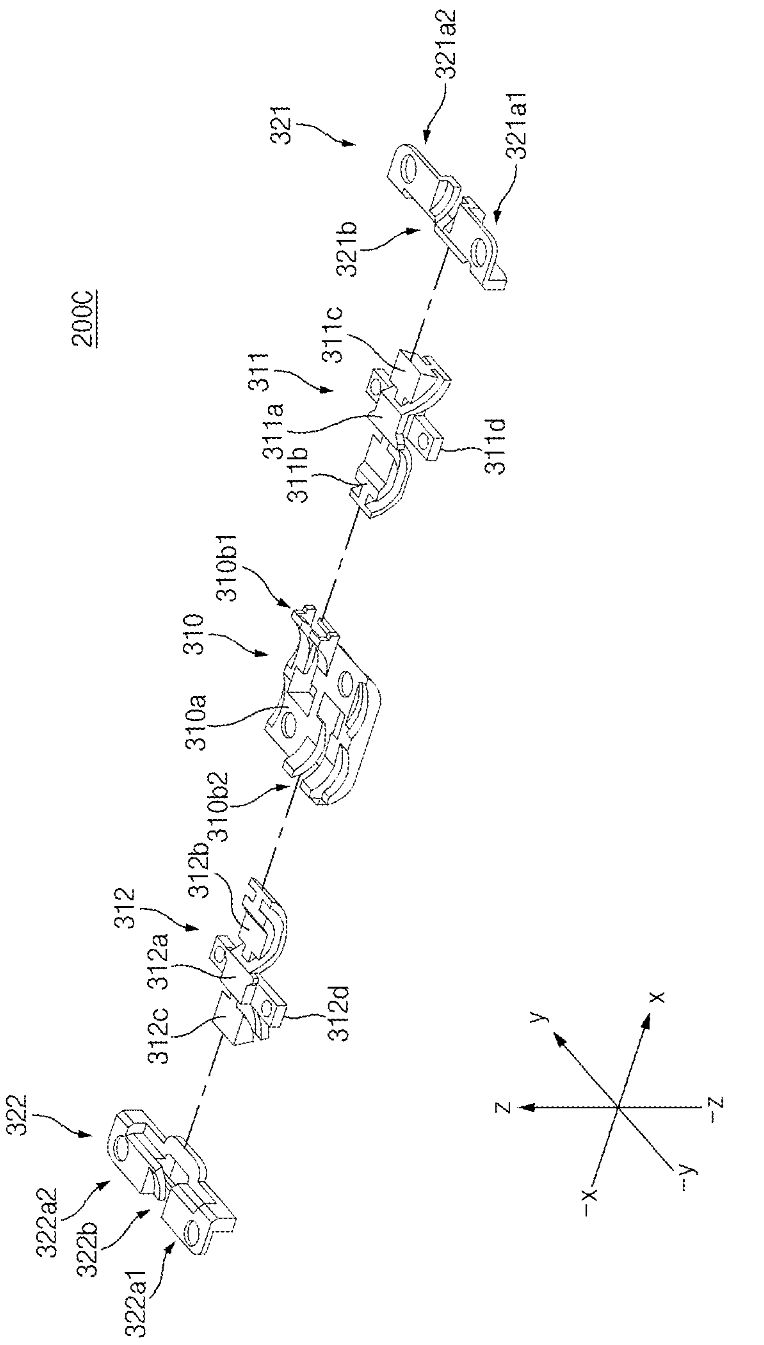
FIG. 27 is an exploded perspective view of a hinge structure 200*c* according to an embodiment as viewed in one direction.
Figure 28:
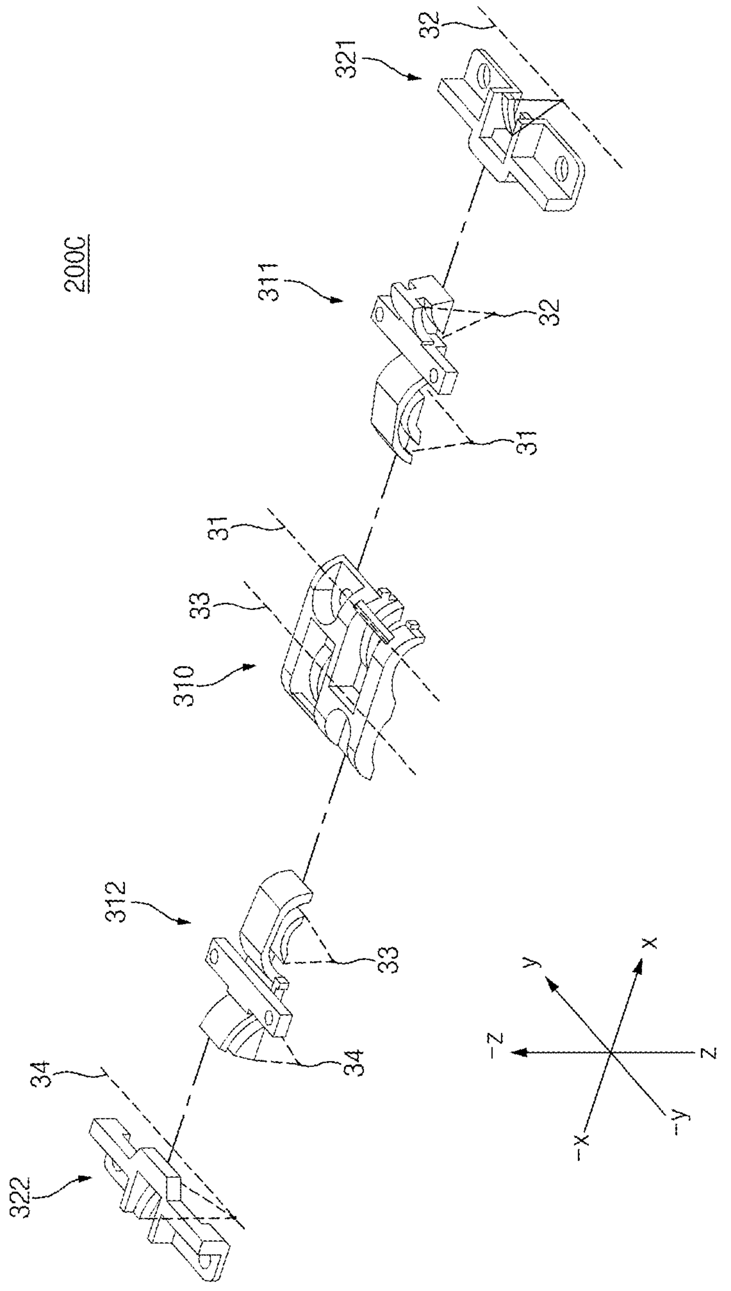
FIG. 28 is an exploded perspective view of the hinge structure 200*c* according to an embodiment as viewed in another direction.

FIG. 27 is an exploded perspective view of the hinge structure 200*c* according to an embodiment as viewed in one direction, and FIG. 28 is an exploded perspective view of the hinge structure 200*c* according to an embodiment as viewed in another direction.

Referring to FIGS. 27 and 28, the hinge structure 200*c* may include a center fixed bracket 310, a first center rotating member 311, a second center rotating member 312, a first center link member 321, and a second center link member 322.

The first center rotating member 311 may have a structure that is the same as or similar to that of the first rotating member 211 described above with reference to FIG. 5. For example, the first center rotating member 311 may include a first center rotating body 311*a*, a first center rail structure 311*b*, a second center rail structure 311*c*, and a first center fixing part 311*d*. Here, the first center rail structure 311*b* may extend in the −x-axis direction with respect to the first center rotating body 311*a*, and the second center rail structure 311*c* may extend in the x-axis direction with respect to the first center rotating body 311*a*. The first center fixing part 311*d* may be disposed in a wing shape in the y-axis and −y-axis directions with respect to the first center rotating body 311*a*. The first center rail structure 311*b* may be coupled to a first center rail 310*b*1 formed on the center fixed bracket 310.

The second center rotating member 312 may have a structure that is the same as or similar to that of the second rotating member 212 described above with reference to FIG. 5. For example, the second center rotating member 312 may include a second center rotating body 312*a*, a third center rail structure 312*b*, a fourth center rail structure 312*c*, and a second center fixing part 312*d*. Here, the third center rail structure 312*b* may extend in the x-axis direction with respect to the second center rotating body 312*a*, and the fourth center rail structure 312*c* may extend in the −x-axis direction with respect to the second center rotating body 312*a*. The second center fixing part 312*d* may be disposed in a wing shape in the y-axis and −y-axis directions with respect to the second center rotating body 312*a*. The third center rail structure 312*b* may be coupled to a second center rail 310*b*2 formed on the center fixed bracket 310.

The center fixed bracket 310 may include a center body 310*a*, the first center rail 310*b*1 that is formed on one side of the center body 310*a* and to which the first center rail structure 311*b* of the first center rotating member 311 is coupled and a second center rail 310*b*2 that is formed on an opposite side of the center body 310*a* and to which the third center rail structure 312*b* of the second center rotating member 312 is coupled. In this regard, the first center rail 310*b*1 may be open in the x-axis direction and may include an arc-shaped rail groove corresponding to the first center rail structure 311*b* having an arc shape. Furthermore, the second center rail 310*b*2 may be open in the −x-axis direction and may include an arc-shaped rail groove corresponding to the third center rail structure 312*b* having an arc shape. At least one fastening hole used to fix the center fixed bracket 310 to the hinge housing 150 may be disposed on one side of the center body 310*a*. The first center rail structure 311*b* may rotate in place about a first virtual axis 31 (or, a first axis) formed in the first center rail 310*b*1. The second center rail structure 311*c* may rotate about a second virtual axis 32 (or, a second axis). The third center rail structure 312*b* may rotate in place about a third virtual axis 33 (or, the first axis) formed in the second center rail **310*b*2. The fourth center rail structure 312*c* may rotate about a fourth virtual axis 34** (or, a fourth axis).

The first center link member 321 may include a third center rail **321*b* coupled with the second center rail structure 311*c* of the first center rotating member 311, and a first center link fixing part 321*a*1 and a second center link fixing part 321*a*2 disposed on opposite sides of the third center rail 321*b*. The first center link fixing part 321*a*1 and the second center link fixing part 321*a*2 may be used to fix the first center link member 321 to the first housing 110. The third center rail 321*b* may move in the clockwise or counterclockwise direction together with the second center rail structure 311*c* in response to a change of state of the electronic device 100 (e.g., a change from a folded state (close) to an unfolded state (open) or from the unfolded state (open) to the folded state (close)). In this process, the second center rail structure 311*c* may slide within the third center rail 321*b***.

The second center link member 322 may include a fourth center rail **322*b* coupled with the fourth center rail structure 312*c* of the second center rotating member 312, and a third center link fixing part 322*a*1 and a fourth center link fixing part 322*a*2 disposed on opposite sides of the fourth center rail 322*b*. The third center link fixing part 322*a*1 and the fourth center link fixing part 322*a*2 may be used to fix the second center link member 322 to the second housing 120. The fourth center rail 322*b* may move in the clockwise or counterclockwise direction together with the fourth center rail structure 312*c* in response to a change of state of the electronic device 100 (e.g., a change from the folded state (close) to the unfolded state (open) or from the unfolded state (open) to the folded state (close)). In this process, the fourth center rail structure 312*c* may slide within the fourth center rail 322*b***.

When compared to the other hinge structures **200*a* and 200*b* described above, the above-described hinge structure 200*c* may provide a simple structure in which the arm members, the interlocking members, and the cam members are not applied and thus may enable the wing plates 131 and 132 to easily support the central portion of the display 160 while the central portion of the display 160 is being folded. The hinge structure 200*c* described with reference to FIGS. 27 and 28 may have a structure that is the same as or similar to that of a hinge structure (e.g., a hinge structure 4000*c* of FIG. 38**) disposed between interlocking hinge structures to be described below.

Figure 29:
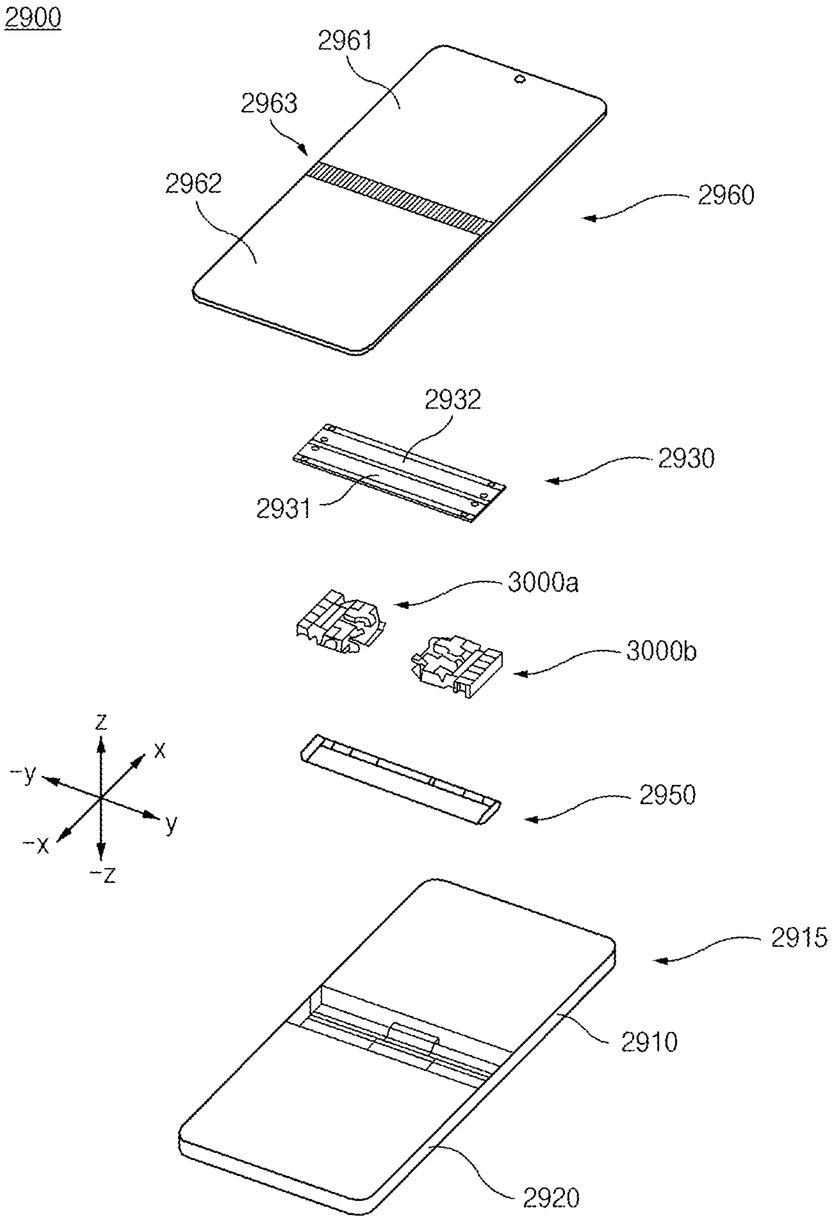
FIG. 29 is a view illustrating one example of another type electronic device according to an embodiment.
Figure 30:
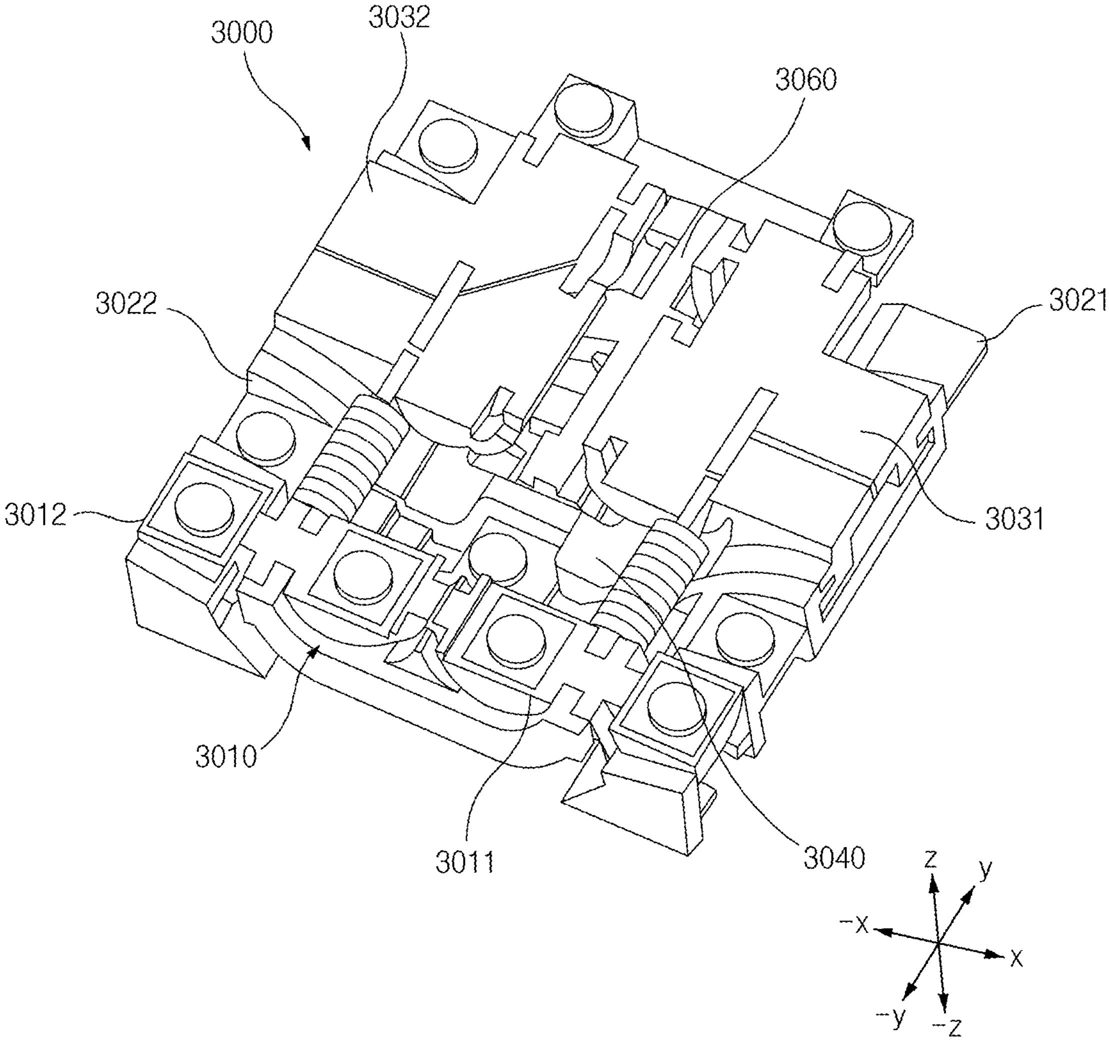
FIG. 30 is a view illustrating one example of a second type hinge structure applied to the other type electronic device.
Figure 31:
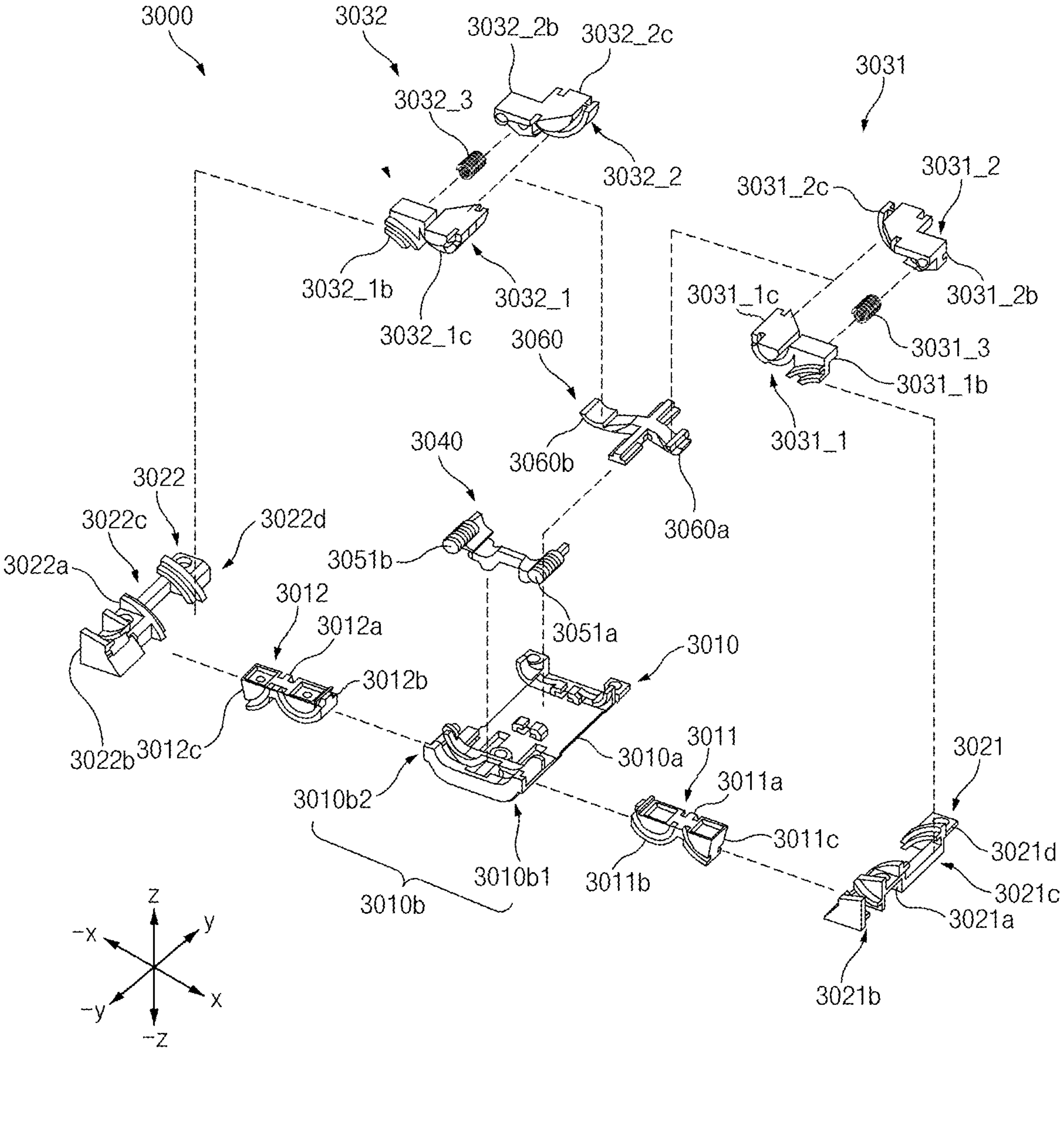
FIG. 31 is an exploded perspective view of the second type hinge structure according to an embodiment as viewed in the first direction.
Figure 32:
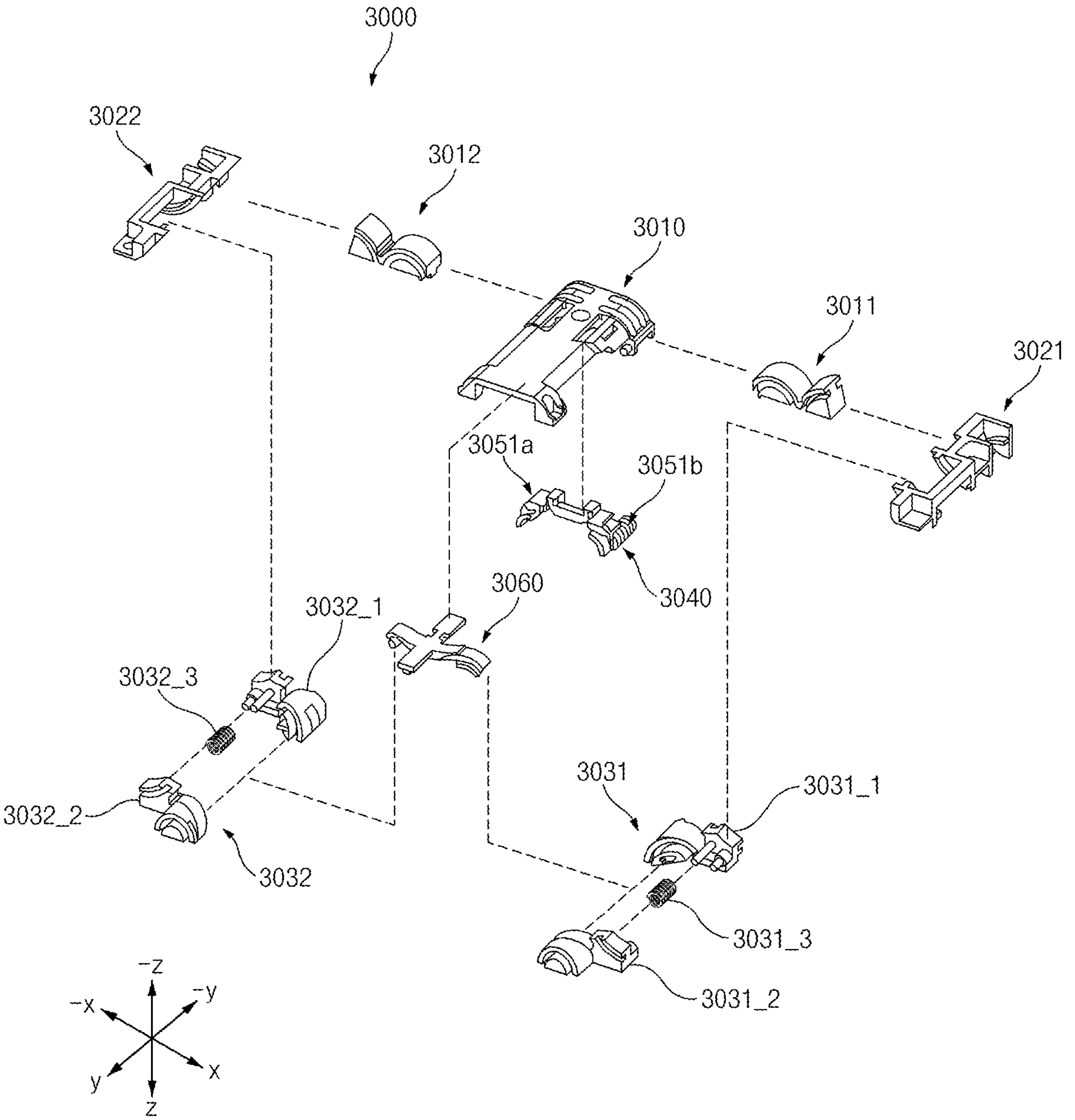
FIG. 32 is an exploded perspective view of the second type hinge structure according to an embodiment as viewed in the second direction.

FIG. 29 is a view illustrating one example of another type electronic device according to an embodiment, and FIG. 30 is a view illustrating one example of a second type hinge structure applied to the other type electronic device. FIG. 31 is an exploded perspective view of the second type hinge structure according to an embodiment as viewed in the first direction, and FIG. 32 is an exploded perspective view of the second type hinge structure according to an embodiment as viewed in the second direction.

Referring to FIGS. 29 to 32, the electronic device 2900 according to an embodiment includes a housing 2915 (e.g., a first housing 2910 and a second housing 2920), a hinge housing 2950, hinge structures **3000*a* and 3000*b*, and a display 2960. For example, the electronic device 2900 may be formed such that the length in the x-axis direction is longer than the length in the y-axis direction. Accordingly, the electronic device 2900 may include a smaller number of hinge structures or a smaller hinge structure than the foldable electronic device 100 described above with reference to FIG. 1**.

The display 2960 may be formed such that the length in the x-axis direction is longer than the length in the y-axis direction and may have a folded state (close) or an unfolded state (open) with respect to one point in the x-axis direction. The display 2960 may include a first region 2961 supported by the first housing 2910, a second region 2962 supported by the second housing 2920, and a third region 2963 (or, a third region) disposed between the first region 2961 and the second region 2962. A lattice pattern may be formed on at least a portion of the rear surface of the third region 2963 of the display 2960. The display 2960 may be formed of any one of the various display types described above with reference to FIGS. 2 and 3.

The electronic device 2900 may include wing plates 2931 and 2932. The wing plates 2931 and 2932 may include the first wing plate 2931 and the second wing plate 2932 that are disposed between the rear surface of the display 2960 and the hinge structures **3000*a* and 3000*b* and that extend in the y-axis direction. Each of the first wing plate and the second wing plate 2932 may have one side fixed to the first hinge structure 3000*a* and an opposite side fixed to the second hinge structure 3000*b* and may support a folding region of the rear surface of the display 2960 when a state of the electronic device 2900** is changed.

An arrangement of the first housing 2910 and the second housing 2920 may vary depending on a folded state (close) or an unfolded state (open) of the electronic device 2900. For example, when the electronic device 2900 is in the folded state, the first housing 2910 and the second housing 2920 may be disposed to face each other, and when the electronic device 2900 is in the unfolded state, the first housing 2910 and the second housing 2920 may be disposed to face the same direction. Depressions may be formed in regions in which the first housing 2910 and the second housing 2920 are disposed adjacent to each other in the unfolded state (open) of the electronic device 2900, and the hinge housing 2950 may be seated in the depressions.

The hinge structures **3000*a* and 3000*b* include, for example, the first hinge structure 3000*a*, at least a portion of which is seated on the −y-axis edge of the hinge housing 2950 and the second hinge structure 3000*b*, at least a portion of which is seated on the y-axis edge of the hinge housing 2950. The first hinge structure 3000*a* and the second hinge structure 3000*b* may have substantially the same shape and size and may be disposed in different directions. The second type hinge structure 3000 illustrated in FIGS. 30 to 32 may be one of the first hinge structure 3000*a* and the second hinge structure 3000*b* described with reference to FIG. 29**.

The second type hinge structure 3000 includes a fixed bracket 3010, a first rotating member 3011, a second rotating member 3012, a first link member 3021, a second link member 3022, a first arm member 3031, a second arm member 3032. The foldable electronic device 3800 may include an interlocking member 3060.

The fixed bracket 3020 may have a form similar to that of the fixed bracket 210 of the first type hinge structure 200 described above with reference to FIG. 5. When compared to the fixed bracket 210 of the first type hinge structure 200 described with reference to FIG. 5, the fixed bracket 3030 may have the same structure except for the region in which the second cam member 242 of the first type hinge structure 200 is disposed. For example, the fixed bracket 3030 may include a bracket rail **3010*b* to which the first rotating member 3011 and the second rotating member 3012 are coupled, a structure on which a first cam member 3040 and elastic members 3051*a* and 3051*b* are seated, and a structure on which the interlocking member 3060 is seated. The first rotating member 3011 and the second rotating member 3012 may be coupled to the bracket rail 3010***b* in parallel on the x-axis. In this regard, a first rail 3010*b*1 to which the first rotating member 3011 is coupled may be disposed at the x-axis edge of the bracket rail 3010*b*, and a second rail 3010*b*2 to which the second rotating member 3012 is coupled may be disposed at the −x-axis edge of the bracket rail 3010*b*. Similarly to the fixed bracket 210 described above with reference to FIG. 7, the structure on which the first cam member 3040 and the elastic members 3051*a* and 3051*b* are seated may include a hole or recess in which at least a portion of the first cam member 3040 is seated and guide parts that guide opposite wings of the first cam member 3040. Similarly to the fixed bracket 210 described above with reference to FIG. 7, the structure on which the interlocking member 3060 is seated may include interlocking guide parts spaced apart from each other by a predetermined gap in the y-axis direction such that at least portion of support parts of the interlocking member 3060 are mounted thereon.

The first rotating member 3011 may include a first rotating body 3011*a*, a first rail structure 3011*b* that extends from the first rotating body 3011*a* in the −x-axis direction and that is inserted into the first rail 3010*b*1 of the fixed bracket 3010, and a second rail structure 3011*c* extending from the first rotating body 3011*a* in the x-axis direction. The upper surface (a surface facing in the z-axis direction) of the first rail structure 3011*b*, the upper surface of the first rotating body 3011*a*, and the upper surface of the second rail structure 3011*c* may have a flat shape. Through-holes may be vertically formed through the first rail structure 3011*b* and the second rail structure 3011*c*. The through-holes formed in the first rail structure 3011*b* and the second rail structure 3011*c* may be used to couple a wing plate (e.g., the first wing plate 2931) to the first rotating member 3011. The first rail structure 3011*b* and the second rail structure 3011*c* may include a rail groove having an arc shape convex in the −z-axis direction (or, rail protrusions that form a rail groove). For example, the second rail structure 3011*c* may be formed to be smaller than the first rail structure 3011*b* (or, may be formed to be smaller than the second rail structure 211*c* of the first type hinge structure 200) such that the second type hinge structure 3000 is formed to be smaller than the above-described first type hinge structure 200. The second rail structure 3011*c* may be fastened to a third rail 3021*b* of the first link member 3021.

The second rotating member 3012 may include a second rotating body 3012*a*, a third rail structure 3012*b* that extends from the second rotating body 3012*a* in the x-axis direction and that is inserted into the second rail 3010*b*2 of the fixed bracket 3010, and a fourth rail structure 3012*c* extending from the second rotating body 3012*a* in the −x-axis direction. The second rotating body 3012*a*, the third rail structure 3012*b*, and the fourth rail structure 3012*c* may have a shape and a size that are the same as or similar to those of the first rotating body 3011*a*, the first rail structure 3011*b*, and the second rail structure 3011*c* of the above-described first rotating member 3011. For example, the upper surfaces of the second rotating body 3012*a*, the third rail structure 3012*b*, and the fourth rail structure 3012*c* may be formed to be flat, and through-holes used to couple a wing plate (e.g., the second wing plate 2932) may be formed on one side of the third rail structure 3012*b* and the fourth rail structure 3012*c*. The third rail structure 3012*b* and the fourth rail structure 3012*c* may include a rail groove having an arc shape convex in the same direction as the first rail structure 3011*b* and the second rail structure 3011*c* (or, rail protrusions that form a rail groove). The fourth rail structure 3012*c* may be fastened to a fourth rail 3022*b* of the second link member 3022*b*.

The first link member 3021 may have a structure similar to that of the second link member 222 of the first type hinge structure 200 described above with reference to FIG. 9. For example, the first link member 3021 may include a first link body 3021*a*, the third rail 3021*b*, a fifth rail 3021*c*, and a first link fixing part 3021*d*. The first link body 3021*a* and the first link fixing part 3021*d* may include at least one through-hole used to fix the first link member 3021 to the first housing 2910. The third rail 3021*b* may be coupled with the second rail structure 3011*c* of the first rotating member 3011. The fifth rail 3021*c* may be fastened with a fifth rail structure 3031_1*b* and 3031_2*b* of the first arm member 3031.

The second link member 3022 may have a structure similar to that of the second link member 222 of the first type hinge structure 200 described above with reference to FIG. 9. For example, the second link member 3022 may include a second link body 3022*a*, the fourth rail 3022*b*, a sixth rail 3022*c*, and a second link fixing part 3022*d*. The second link body 3022*a* and the second link fixing part 3022*d* may include at least one through-hole used to fix the second link member 3022 to the second housing 2920. The fourth rail 3022*b* may be coupled with the fourth rail structure 3012*c* of the second rotating member 3012. The sixth rail 3022*c* may be fastened with a sixth rail structure 3032_1*b* and 3032_2*b* of the second arm member 3032. The second link member 3022 may have a structure symmetrical to the first link member 3021 with respect to the y-axis. Alternatively, the positions of the components (e.g., the second link body 3022*a*, the fourth rail 3022*b*, the sixth rail 3022*c*, and the second link fixing part 3022*d*) of the second link member 3022 may have positions that correspond to the positions of the components (e.g., the first link body 3021*a*, the third rail 3021*b*, the fifth rail 3021*c*, and the first link fixing part 3021*d*) of the first link member 3021 with respect to the y-axis.

The first arm member 3031 may include a first lower arm structure 3031_1, a first upper arm structure 3031_2, and a first arm elastic member 3031_3. The first lower arm structure 3031_1 and the first upper arm structure 3031_2 may be coupled with the first arm elastic member 3031_3 therebetween. The coupled first arm member 3031 includes the fifth rail structure 3031_1*b* and 3031_2*b* fastened to the fifth rail 3021*c* and a seventh rail 3031_1*c* and 3031_2*c* that forms a slide groove to which a first interlocking wing 3060*a* of the interlocking member 3060 is fastened. A cam structure coupled with the first cam member 3040 may be formed at the −y-axis edge of the seventh rail 3031_1*c* and 3031_2*c*. A surface of the first arm member 3031 in the z-axis direction may be formed to be flat to evenly support the rear surfaces of the wing plates 2931 and 2932.

The second arm member 3032 may include a second lower arm structure 3032_1, a second upper arm structure 3032_2, and a second arm elastic member 3032_3. The second lower arm structure 3032_1 and the second upper arm structure 3032_2 may be coupled with the second arm elastic member 3032_3 therebetween. The coupled second arm member 3032 includes the sixth rail structure 3032_1*b* and 3032_2*b* fastened to the sixth rail 3022*c* and an eighth rail 3032_1*c* and 3032_2*c* that forms a slide groove to which a second interlocking wing 3060*b* of the interlocking member 3060 is fastened. A cam structure coupled with the first cam member 3040 may be formed at the −y-axis edge of the eighth rail 3032_1*c* and 3032_2*c*. A surface of the second arm member 3032 in the z-axis direction may be formed to be flat to evenly support the rear surfaces of the wing plates 2931 and 2932.

The interlocking member 3060 may include the support parts formed longer in the y-axis direction than in the x-axis direction and mounted on the interlocking guide parts formed on the fixed bracket 310, and the first interlocking wing 3060*a* and the second interlocking wing 3060*b* that extend in one direction between the x-axis and the y-axis or one direction between the −x-axis and the −y-axis from points of the support parts and that are disposed while forming a curved surface in the z-axis direction.

The above-described second type hinge structure 3000 may have a form in which some structures of the first type hinge structure 200 described above with reference to FIGS. 1 to 26 are omitted, or may have a form in which some structures are modified. Accordingly, description of a structure of the second type hinge structure 3000 that is the same as or similar to the first type hinge structure 200 may be replaced with description of the form and function of the structure corresponding to the above-described first type hinge structure 200. Alternatively, at least some of the descriptions of the components of the first type hinge structure 200 described with reference to FIGS. 1 to 26 may be identically or similarly applied to the above-described components of the second type hinge structure 3000, or components of the first type hinge structure 200 that are not included in the second type hinge structure 3000 may be added.

Figure 33:
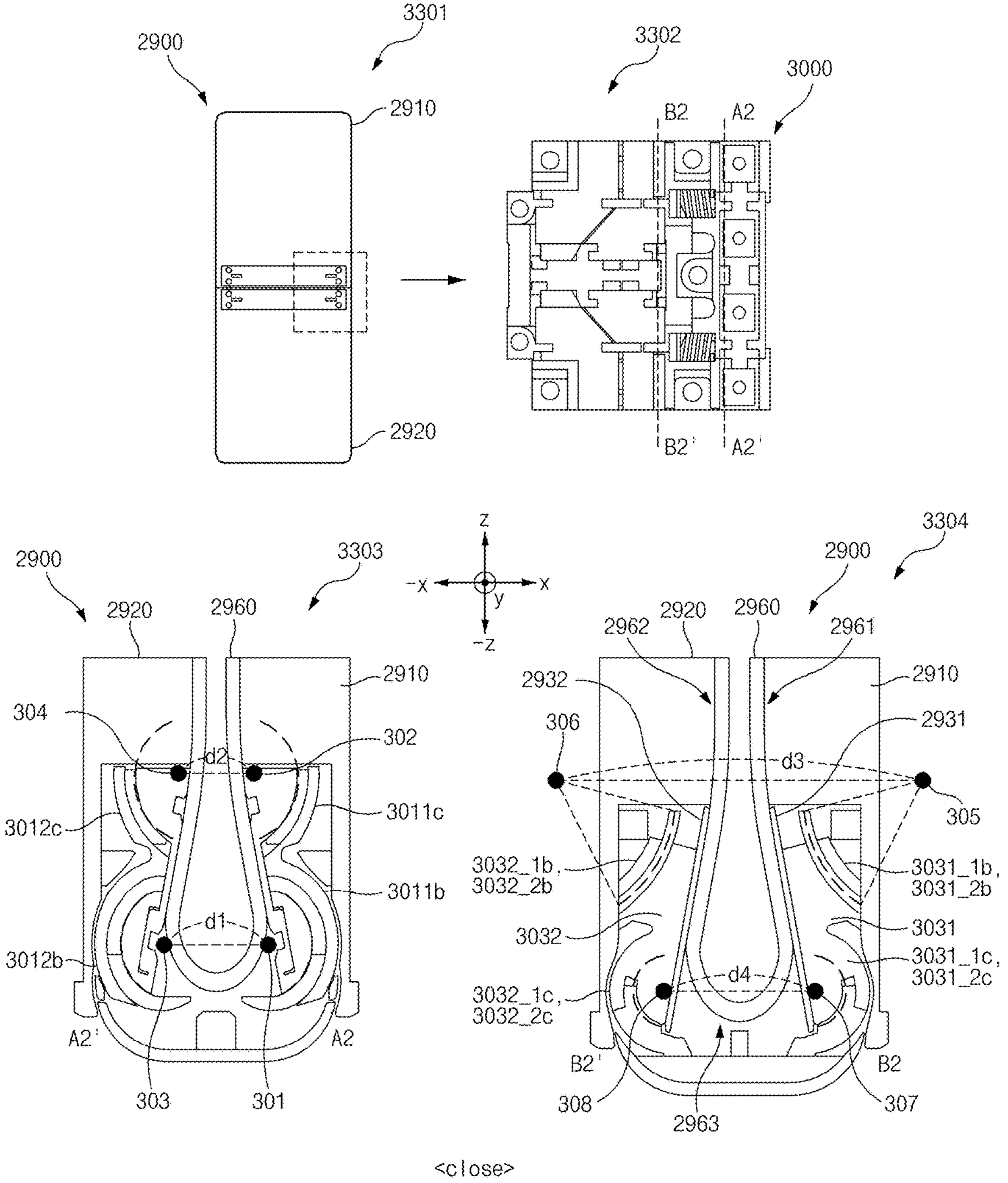
FIG. 33 is a view illustrating one example of forming an axis of the electronic device including the second type hinge structure according to an embodiment.

FIG. 33 is a view illustrating one example of forming an axis of the electronic device including the second type hinge structure according to an embodiment. In FIG. 33, FIG. 3301 is a view illustrating one example of the front surface of the housing on which the display is placed when the electronic device including the second type hinge structure is in an unfolded state, FIG. 3302 is a view illustrating one example of the second type hinge structure, FIG. 3303 is a view illustrating one example of a section of the second type hinge structure taken along line A2-A2' when the electronic device including the second type hinge structure is in a folded state, and FIG. 3304 is a view illustrating one example of a section of the second type hinge structure taken along line B2-B2' when the electronic device including the second type hinge structure is in the folded state.

Prior to description, the electronic device 2900 and the second type hinge structure 3000 are illustrated in the unfolded state in the illustrated drawing. However, for description of axes, the sections taken along lines A2-A2' and B2-B2' illustrate the folded state of the electronic device 2900 or the folded state of the second type hinge structure 3000. The positions and relationship of axes about which the components of the hinge structure 3000 rotate may be identically or similarly applied to the first type hinge structure 200 described above with reference to FIGS. 1 to 28.

Referring to FIGS. 29 to 33, depressions may be formed at lower edges (e.g., edges in the −z-axis direction) of the first housing 2910 and the second housing 2920 of the electronic device 2900 such that the second type hinge structure 3000 or the hinge housing 2950 is seated therein. When pressure is applied to the first housing 2910 and the second housing 2920 in an unfolded state (open) of the electronic device 2900, the first housing 2910 and the second housing 2920 may be changed to a folded state (close). Correspondingly, the first housing 2910 and the second housing 2920 may be disposed side by side in the z-axis direction (or, disposed in the shape of "11"). In the folded state (close) of the electronic device 2900, one surface of the first region 2961 of the display 2960 disposed on the first housing 2910 (e.g., a surface on which a screen is displayed, or a surface facing in the z-axis direction in the unfolded state (open) of the electronic device 2900) and one surface of the second region 2962 disposed on the second housing 2920 may be disposed to face each other. In the folded state (close) of the electronic device 2900, the third region 2963 of the display 2960 may be disposed to be convex in the −z-axis direction.

At least part of opposite sides of the third region 2963 may be supported by at least part of one surface of the first rotating member 3011 (e.g., a surface facing in the z-axis direction in the unfolded state (open) of the electronic device 2900) and one surface of the second rotating member 3012 (e.g., a surface facing in the z-axis direction in the unfolded state (open) of the electronic device 2900). For example, the entire upper surface of the second rail structure 3011*c* of the first rotating member 3011, the entire upper surface of the fourth rail structure 3012*c* of the second rotating member 3012, a portion of the upper surface of the first rail structure 3011*b* of the first rotating member 3011, and a portion of the upper surface of the third rail structure of the second rotating member 3012 may support a side surface of the third region 2963. The first arm member 3031 and the second arm member 3032 may support a lateral portion of the third region 2963 through the first wing plate 2931 and the second wing plate 2932.

While the electronic device 2900 is changed from the unfolded state to the folded state, the first rail structure 3011*b* of the first rotating member 3011 may rotate in place about a first axis 301 (or, a first virtual axis), and the second rail structure 3011*c* of the first rotating member 3011 may be moved in the counterclockwise direction. In this process, the second rail structure 3011*c* may rotate or slide with respect to a second axis 302 (or, a second virtual axis) formed in the third rail 3021*b* of the first link member 3021. While the electronic device 2900 is changed from the unfolded state (open) to the folded state (close), the third rail structure 3012*b* of the second rotating member 3012 may rotate in place about a third axis 303 (or, a third virtual axis), and the fourth rail structure 3012*c* of the second rotating member 3012 may be moved in the clockwise direction. In this process, the fourth rail structure 3012*c* may rotate or slide with respect to a fourth axis 304 (or, a fourth virtual axis) formed in the fourth rail 3022*b* of the second link member 3022.

While the electronic device 2900 is changed from the unfolded state (open) to the folded state (close), the fifth rail structure 3031_1*b* and 3031_2*b* of the first arm member 3031 may rotate in place about a fifth axis 305 (or, a fifth virtual axis) formed in the fifth rail 3021*c* formed on the first link member 3021 while moving in the counterclockwise direction. While the electronic device 2900 is changed from the unfolded state (open) to the folded state (close), the sixth rail structure 3032_1*b* and 3032_2*b* of the second arm member 3032 may rotate in place about a sixth axis 306 (or, a sixth virtual axis) formed in the sixth rail 3022*c* formed on the second link member 3022 while moving in the clockwise direction. While the electronic device 2900 is changed from the unfolded state (open) to the folded state (close), the seventh rail 3031_1*c* and 3031_2*c* of the first arm member 3031 may rotate in place about a seventh axis 307 (or, a seventh virtual axis). While the electronic device 2900 is changed from the unfolded state (open) to the folded state (close), the eighth rail 3032_1*c* and 3032_2*c* of the second arm member 3032 may rotate in place about an eighth axis 308 (or, an eighth virtual axis).

According to an embodiment, the first axis 301 and the third axis 303 may be located on the same first x-axis, the second axis 302 and the fourth axis 304 may be located on the same second x-axis, the fifth axis 305 and the sixth axis 306 may be located on the same third x-axis, and the seventh axis 307 and the eighth axis 308 may be located on the same fourth x-axis. The above-described first to fourth x-axes may have different positions on the z-axis side surface. According to an embodiment, the first distance d1 (or, the shortest distance or the minimum straight distance) between the first axis 301 and the third axis 303 and the second distance d2 (or, the shortest distance or the minimum straight distance) between the second axis 302 and the fourth axis 304 may differ from each other. For example, the first distance d1 between the first axis 301 and the third axis 303 may be greater than the second distance d2 between the second axis 302 and the fourth axis 304. According to an embodiment, the third distance d3 (or, the shortest distance or the minimum straight distance) between the fifth axis 305 and the sixth axis 306 and the fourth distance d4 (or, the shortest distance or the minimum straight distance) between the seventh axis 307 and the eighth axis 308 may differ from each other. For example, the third distance d3 between the fifth axis 305 and the sixth axis 306 may be greater than the fourth distance d4 between the seventh axis 307 and the eighth axis 308. According to an embodiment, the first distance d1 and the fourth distance d4 may differ from each other. For example, the first distance d1 may be greater than the fourth distance d4.

Figure 34:
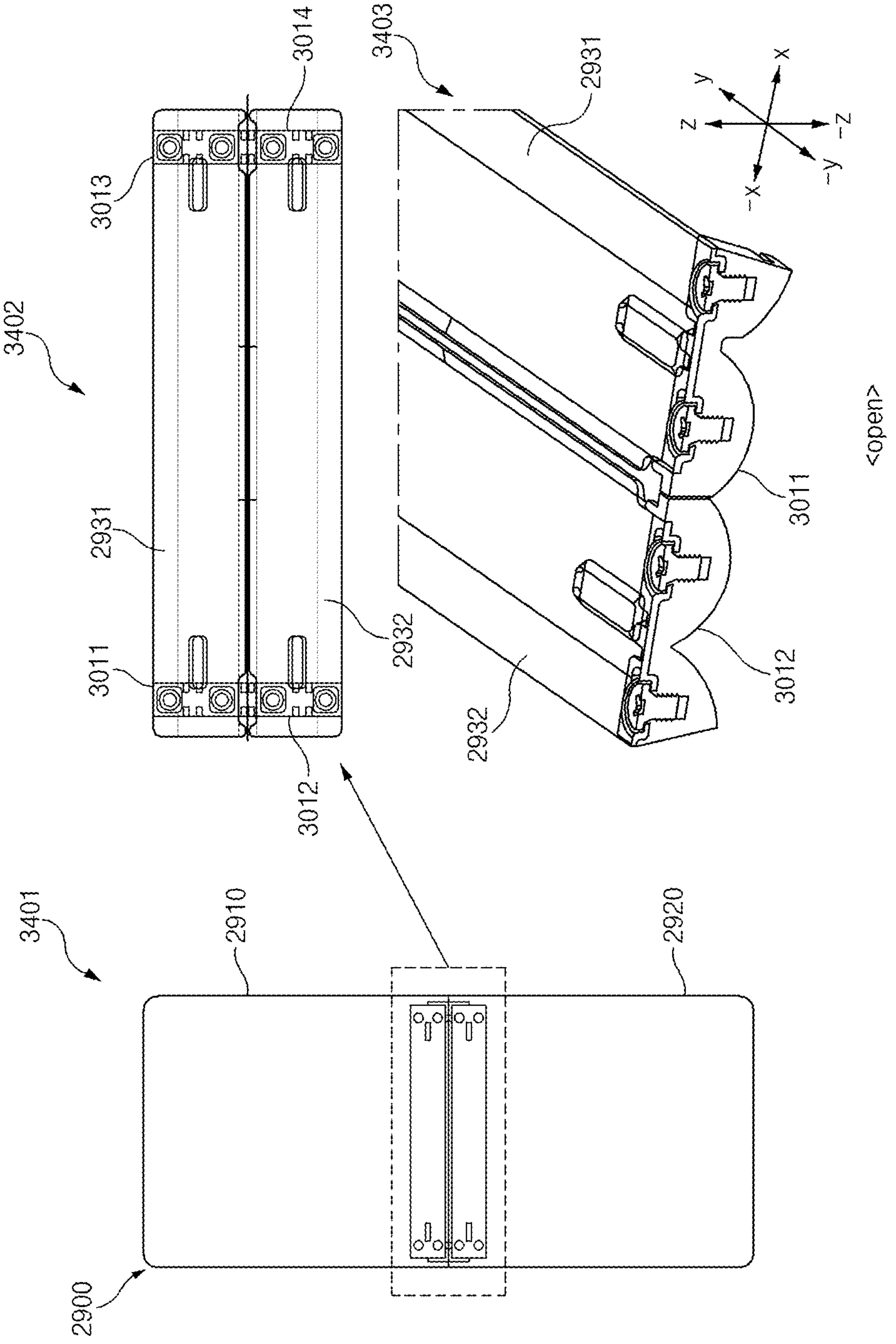
FIG. 34 is a view illustrating one example of a coupled state of rotating members and wing plates of the second type hinge structure according to an embodiment.
Figure 35:
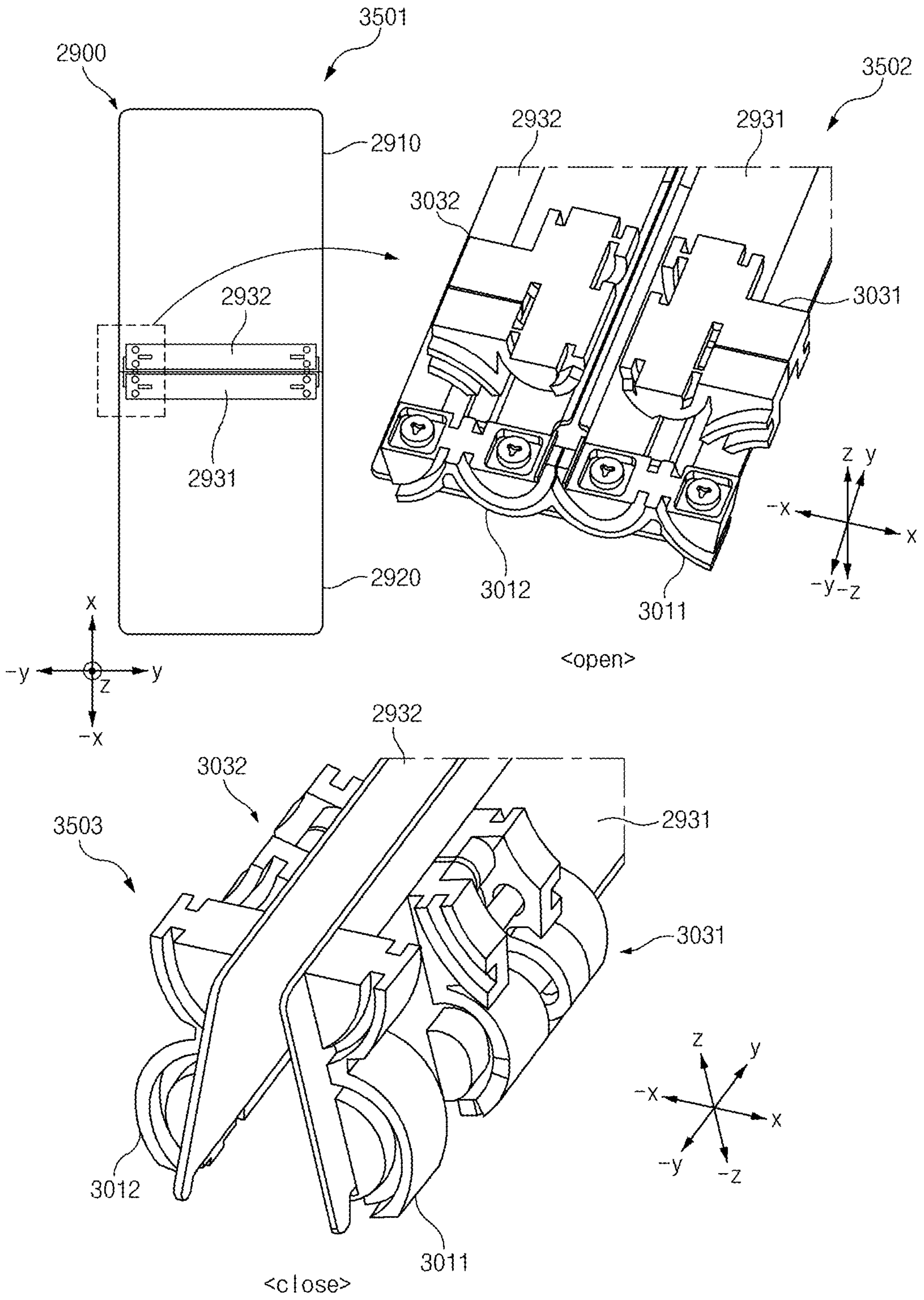
FIG. 35 is a view illustrating one example of an arrangement of the rotating members and arm members of the second type hinge structure according to an embodiment.

FIG. 34 is a view illustrating one example of a coupled state of the rotating members and the wing plates of the second type hinge structure according to an embodiment, and FIG. 35 is a view illustrating one example of an arrangement of the rotating members and the arm members of the second type hinge structure according to an embodiment. In FIG. 34, FIG. 3401 is a view illustrating one example of a front surface of the housing on which the display is placed in the unfolded state of the electronic device including the second type hinge structure, FIG. 3402 is a view illustrating a partial region in which the second type hinge structure is disposed in FIG. 3401, and FIG. 3403 is a view illustrating one example of a section of a region in which the rotating members are placed in FIG. 3402. In FIG. 35, FIG. 3501 is a view illustrating one example of the front surface of the housing on which the display is placed in the unfolded state of the electronic device including the second type hinge structure, FIG. 3502 is a view illustrating a partial region in which the second type hinge structure is disposed in FIG. 3501, and FIG. 3503 is a view illustrating one example of an arrangement of the second type hinge structure in the folded state of the electronic device including the second type hinge structure.

Referring to FIGS. 29 to 34, the electronic device 2900 may include the first housing 2910, the second housing 2920, the first wing plate 2931 disposed on the first housing 2910, and the second wing plate 2932 disposed on the second housing 2920. Furthermore, the electronic device 2900 may include the first rotating member 3011 and the second rotating member 3012 disposed in the first hinge structure 3000*a* of the hinge structures 3000*a* and 3000*b* of the electronic device 2900, and a third rotating member 3013 and a fourth rotating member 3014 disposed in the second hinge structure 3000*b*. The first wing plate 2931 may be coupled with the first rotating member 3011 and the third rotating member 3013, and the second wing plate 2932 may include the second rotating member 3012 and the fourth rotating member 3014. In this regard, the first wing plate 2931 and the second wing plate 2932 may include holes that can be coupled and may be coupled by fastening members (e.g., bolts or screws) after aligned with coupling holes (or, through-holes) provided in the first to fourth rotating members 3011, 3012, 3013, and 3014.

Referring to FIGS. 29 to 35, the electronic device 2900 may include the first housing 2910, the second housing 2920, the first wing plate 2931 disposed on the first housing 2910, and the second wing plate 2932 disposed on the second housing 2920. Furthermore, the second type hinge structure 3000 may be disposed in the electronic device 2900. Part of the illustrated drawing illustrates the form in which the first rotating member 3011, the second rotating member 3012, the first arm member 3031, and the second arm member 3032 of the second type hinge structure 3000 are disposed under the wing plates 2931 and 2932. However, the disclosure is not limited thereto. For example, the second type hinge structure 3000 of the electronic device 2900 may further include the first link member 3021 connecting the first rotating member 3011 and the first arm member 3031 described with reference to FIG. 31, the second link member 3022 connecting the second rotating member 3012 and the second arm member 3032, and the interlocking member 3060 linking the first arm member 3031 and the second arm member 3032.

In the unfolded state (open) of the electronic device 2900, the front surface of the first wing plate 2931 and the front surface of the second wing plate 2932 may be disposed to face in the z-axis direction. Correspondingly, the first rotating member 3011 coupled with the first wing plate 2931 and the second rotating member 3012 coupled with the second wing plate 2932 may be disposed side by side on the xy plane. In the unfolded state (open) of the electronic device 2900, based on the z-axis, the first arm member 3031 and the second arm member 3032 may be disposed under the first wing plate 2931 and the second wing plate 2932, respectively. Correspondingly, the upper surfaces (e.g., surfaces facing in the z-axis direction) of the first arm member 3031 and the second arm member 3032 may be disposed to support the rear surfaces of the first wing plate 2931 and the second wing plate 2932.

In the folded state (close) of the electronic device 2900, the first wing plate 2931 and the second wing plate 2932 may form an angle smaller than 90 degrees and greater than 0 degrees. According to an embodiment, the first wing plate 2931 and the second wing plate 2932 may be disposed such that the distance therebetween is decreased in the z-axis direction (increased in the −z-axis direction). Correspondingly, the first rotating member 3011 coupled to the first wing plate 2931 and the second rotating member 3012 coupled to the second wing plate 2932 (or, the first arm member 3031 and the second arm member 3032) may be disposed to have an included angle smaller than 90 degrees and greater than 0 degrees when viewed in the z-axis direction or the −z-axis direction.

Figure 36:
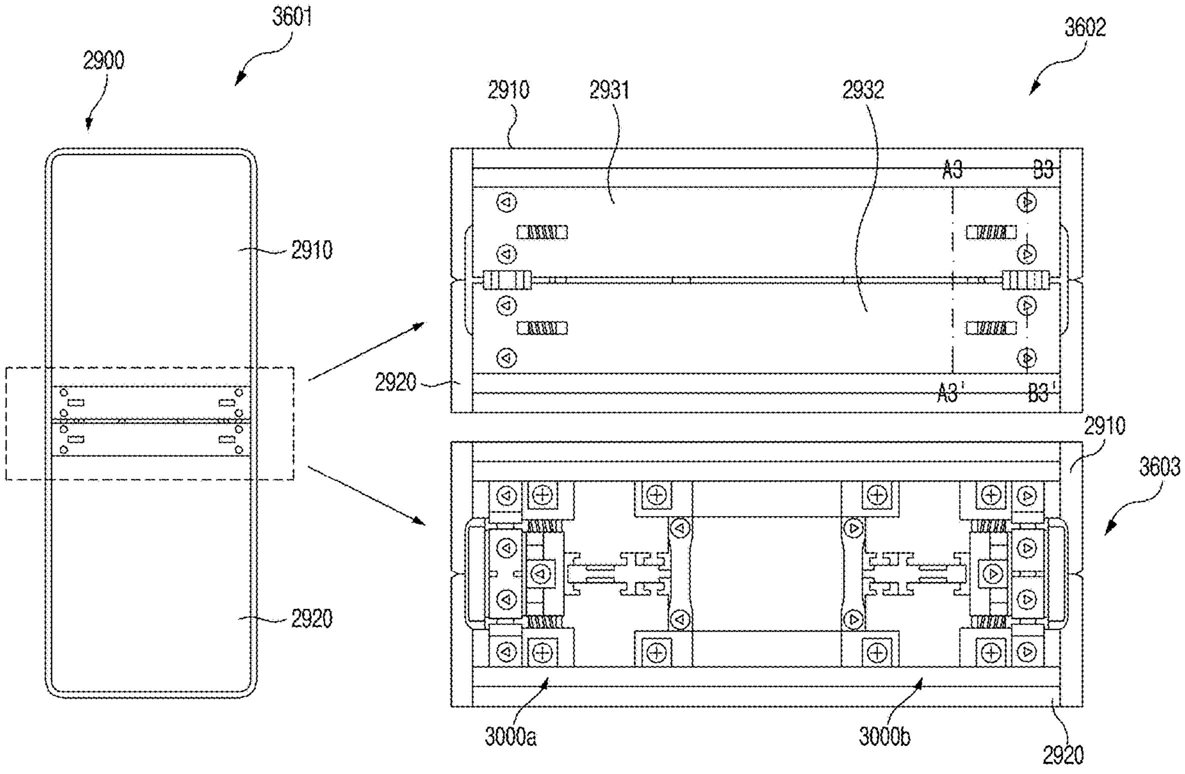
FIG. 36 is a view illustrating one example of a central region of the electronic device including the second type hinge structure.
Figure 37:
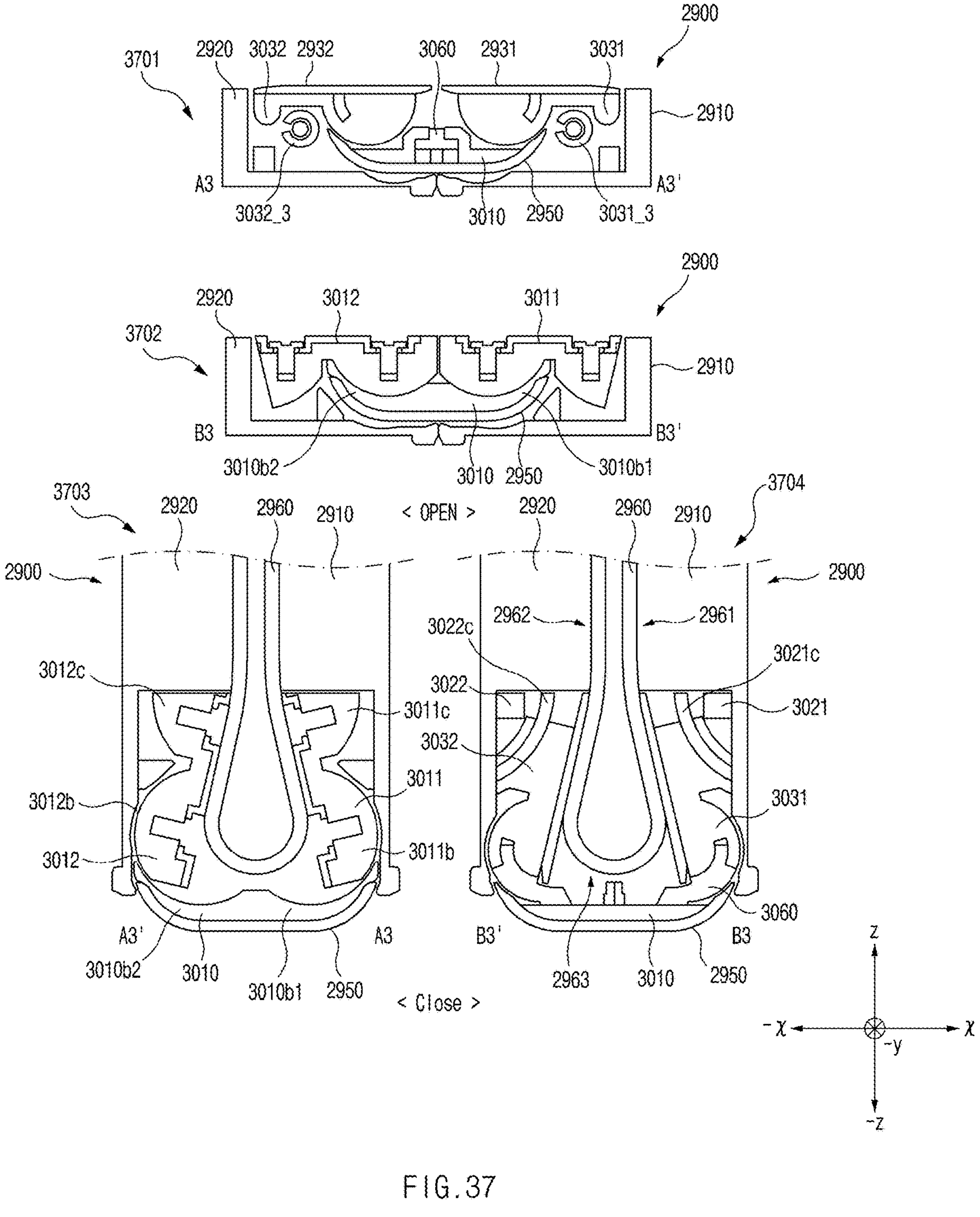
FIG. 37 is a view illustrating one example of a section taken along a cutting line illustrated in FIG. 36.

FIG. 36 is a view illustrating one example of a central region of the electronic device including the second type hinge structure, and FIG. 37 is a view illustrating one example of a section taken along a cutting line illustrated in FIG. 36. In FIG. 36, FIG. 3601 is a view illustrating one example of the front surface of the housing on which the display is placed in the unfolded state of the electronic device including the second type hinge structure, FIG. 3602 is a view illustrating a region in which the second type hinge structure and the wing plates are disposed, and FIG. 3603 is a view illustrating a region in which the second type hinge structure is disposed and the wing plates are removed. In FIG. 37, FIG. 3701 is a view illustrating one example of a section taken along line A3-A3' of FIG. 3602 in the unfolded state of the electronic device including the second type hinge structure, FIG. 3702 is a view illustrating one example of a section taken along line B3-B3' of FIG. 3602 in the unfolded state of the electronic device including the second type hinge structure, FIG. 3703 is a view illustrating one example of a section taken along line A3-A3' of FIG. 3602 in the folded state of the electronic device including the second type hinge structure, and FIG. 3704 is a view illustrating one example of a section taken along line B3-B3' of FIG. 3602 in the folded state of the electronic device including the second type hinge structure.

Prior to description, some figures of FIG. 36 illustrate a figure in which the wing plates 2931 and 2932 are included and a figure in which the wing plates 2931 and 2932 are removed, in a structure disposed in a central portion of the electronic device 2900 (e.g., a region disposed adjacent to the first housing 2910 and the second housing 2920 in the unfolded state (open) of the electronic device 2900). FIG. 37 is a view illustrating one example of sections of the unfolded state and the folded state of the electronic device among the sections taken along the cutting lines illustrated in FIG. 36, for example, A3-A3' and B3-B3'. Furthermore, the figure of the folded state of the electronic device 2900 among the figures of FIG. 37 illustrates a section of the form in which the display 2960 is added.

Referring to FIGS. 29 to 36, the electronic device 2900 may include the first housing 2910 and the second housing 2920, and the hinge housing 2950 and the hinge structures 3000*a* and 3000*b* at least partially seated in the hinge housing 2950 may be disposed in a region to which the first housing 2910 and the second housing 2920 are adjacent in the unfolded state of the electronic device 2900. For example, the hinge structures 3000*a* and 3000*b* may include the first hinge structure 3000*a* disposed at one edge of the hinge housing 2950 and the second hinge structure 3000*b* disposed at an opposite sedge of the hinge housing 2950. Although not illustrated, at least a portion of a flexible substrate electrically connecting electrical components (e.g., at least one of a CPU, a camera, at least one sensor, or a battery) disposed in the first housing 2910 and the second housing 2920 may be disposed between the first hinge structure 3000*a* and the second hinge structure 3000*b*.

Referring to FIGS. 29 to 37, the electronic device 2900 may be disposed in the unfolded state (open). When the electronic device 2900 is in the unfolded state (open), the first housing 2910 and the second housing 2920 may be disposed to face in the z-axis direction. The rear surface (e.g., a surface viewed in the −z-axis direction) of the hinge housing 2950 may be hidden by the first housing 2910 and the second housing 2920. At least part of the seventh rail 3031_1*c* and 3031_2*c* of the first arm member 3031 and the eighth rail 3032_1*c* and 3032_2*c* of the second arm member 3032 may be seated on one side of the fixed bracket 3010. The interlocking member 3060 may be coupled to the seventh rail 3031_1*c* and 3031_2*c* and the eighth rail 3032_1*c* and 3032_2*c*. The first arm elastic member 3031_3 and the second arm elastic member 3032_3 may be disposed on one side of the first arm member 3031 and one side of the second arm member 3032, respectively. The first wing plate 2931 may be horizontally disposed on the upper surface of the first arm member 3031, and the second wing plate 2932 may be horizontally disposed on the upper surface of the second arm member 3032.

When the electronic device 2900 is in the unfolded state (open), the first rotating member 3011 may be fastened to the first rail 3010*b*1 of the fixed bracket 3010 disposed in the hinge housing 2950, and the second rotating member 3012 may be fastened to the second rail 3010*b*2. The first rotating member 3011 and the second rotating member 3012 may be disposed at the same position with respect to the y-axis, and when viewed from the cutting line B2-B2', the first rotating member 3011 and the second rotating member 3012 may be disposed side by side in the x-axis direction. As the first rotating member 3011 and the second rotating member 3012 are disposed side by side in the x-axis direction, the length of the fixed bracket 3010 in the y-axis direction may be formed to be shorter, and thus a hinge structure slimmer or more compact than the first type hinge structure 200 described with reference to FIG. 5 may be formed. Each of the first rotating member 3011 and the second rotating member 3012 may include at least one hole or recess into which a fastening member is inserted, and the first rotating member 3011 and the second rotating member 3012 may be coupled with the wing plates 2931 and 2932 through fastening members.

When the electronic device 2900 is in the folded state (close), the display 2960 may be disposed such that the first region 2961 and the second region 2962 face each other, and the third region 2963 between the first region 2961 and the second region 2962 may be disposed in a water-drop shape (or, a dumbbell shape). When the electronic device 2900 is in the folded state (close), at least a portion of the hinge housing 2950 may be disposed to be exposed to the outside through between the first housing 2910 and the second housing 2920.

When the electronic device 2900 is in the folded state (close), the first housing 2910 and the second housing 2920 may be disposed side by side with respect to the z-axis direction. Alternatively, the first housing 2910 and the second housing 2920 may be disposed to face each other. The seventh rail 3031_1*c* and 3031_2*c* of the first arm member 3031 seated on one side of the fixed bracket 3010 may rotate in place in the counterclockwise direction about the seventh axis 307, and the fifth rail structure 3031_1*b* and 3031_2*b* of the first arm member 3031 may have a state of being rotated in the counterclockwise direction. At this time, the fifth rail structure 3031_1*b* and 3031_2*b* may slide within the fifth rail 3021*c* of the first link member 3021. The eighth rail 3032_1*c* and 3032_2*c* of the second arm member 3032 seated on an opposite side of the fixed bracket 3032 may rotate in place in the clockwise direction about the eighth axis 308, and the sixth rail structure 3032_1*b* and 3032_2*b* of the second arm member 3032 may have a state of being rotated in the clockwise direction. At this time, the sixth rail structure 3032_1*b* and 3032_2*b* may slide within the sixth rail 3022*c* of the second link member 3022. While the first arm member 3031 and the second arm member 3032 rotate in the clockwise and counterclockwise directions, the interlocking member 3060 coupled to one side of the fixed bracket 3010 fixed to the hinge housing 2950 may be linearly moved by the first arm member 3031 and the second arm member 3032. For example, the interlocking members 3060, the wings of which are seated in the slide grooves of the first arm member 3031 and the second arm member 3032, may linearly move from the y-axis direction to the −y-axis direction.

When the electronic device 2900 is in the folded state (close), one side of the first rotating member 3011 and one side of the second rotating member 3012 are disposed in the first rail 3010*b*1 and the second rail 3010*b*2 of the fixed bracket 3010 disposed in the hinge housing 2950. For example, the first rail structure 3011*b* of the first rotating member 3011 may be disposed in the first rail **3010*b*1 in a state of being rotated in place in the counterclockwise direction, and the third rail structure 3012*b* of the second rotating member 3012 may be disposed in the second rail 3010*b*2 in a state of being rotated in place in the clockwise direction. Correspondingly, the second rail structure 3011*c* of the first rotating member 3011 may be moved in the counterclockwise direction, and the fourth rail structure 3012*c* of the second rotating member 3012 may be moved in the clockwise direction. While the second rail structure 3011*c* and the fourth rail structure 3012*c* are moved in the counterclockwise and clockwise directions, the second rail structure 3011*c* may slide within the third rail 3021*b*, and the fourth rail structure 3012*c* may slide within the fourth rail 3022*b***.

Figure 38:
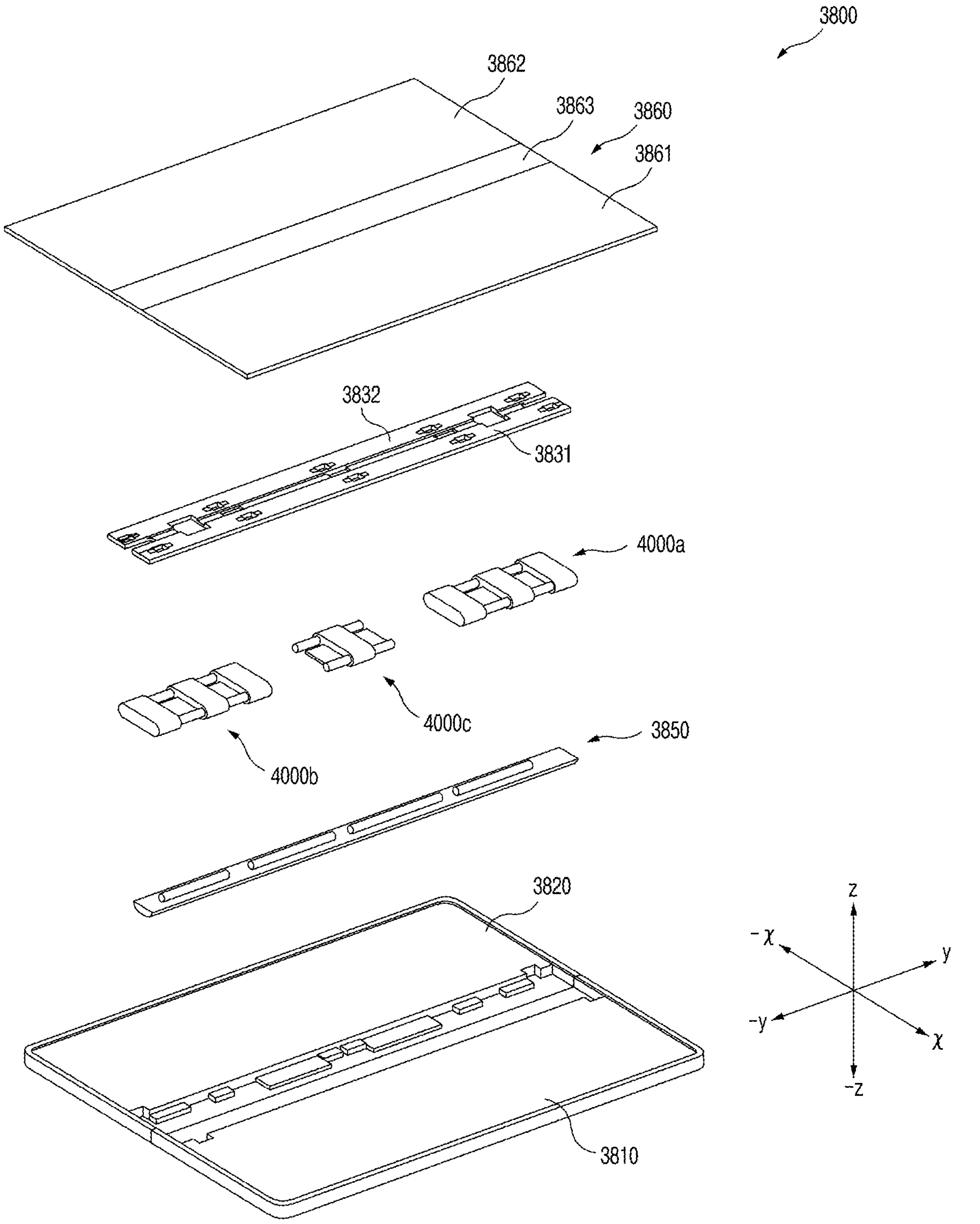
FIG. 38 is a view illustrating one example of another type electronic device according to an embodiment.
Figure 39:
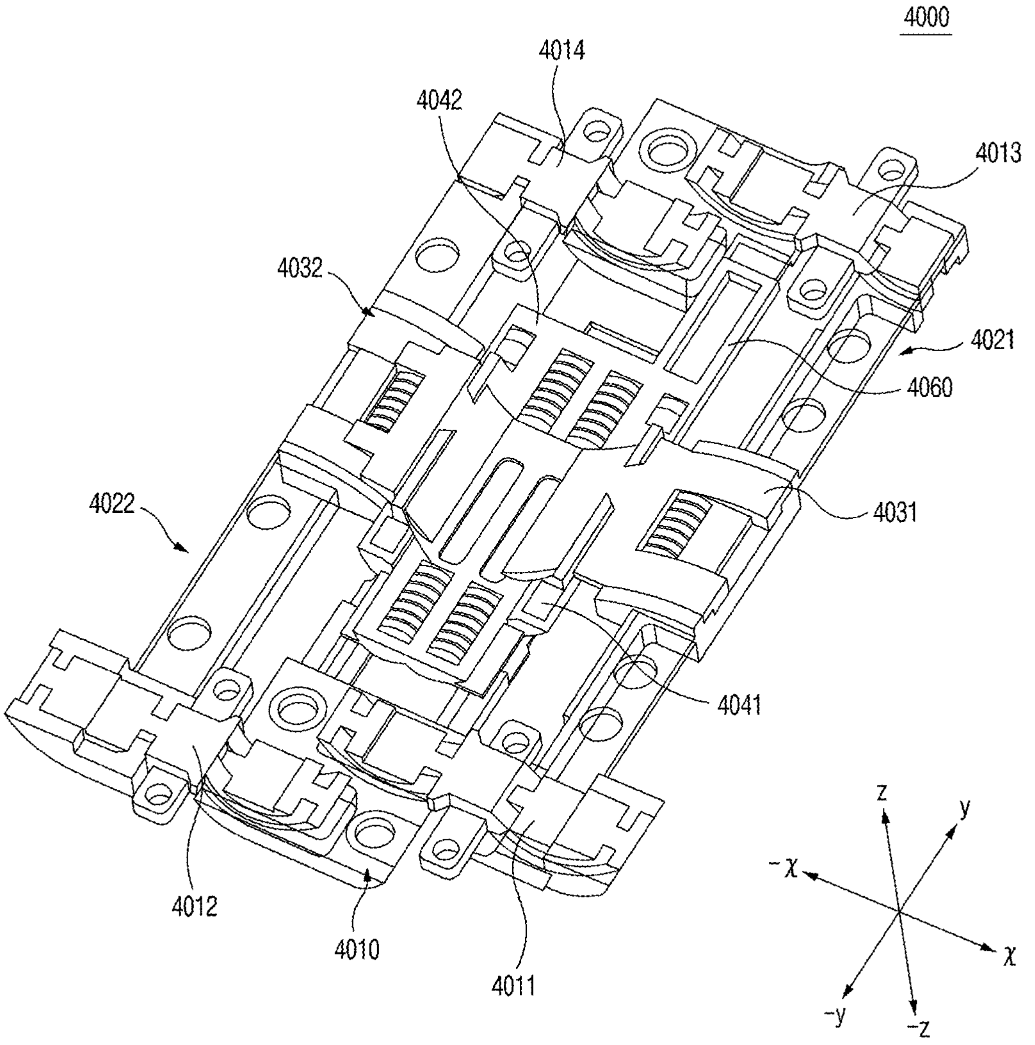
FIG. 39 is a view illustrating one example of a third type hinge structure applied to the other type electronic device of FIG. 38.
Figure 40:
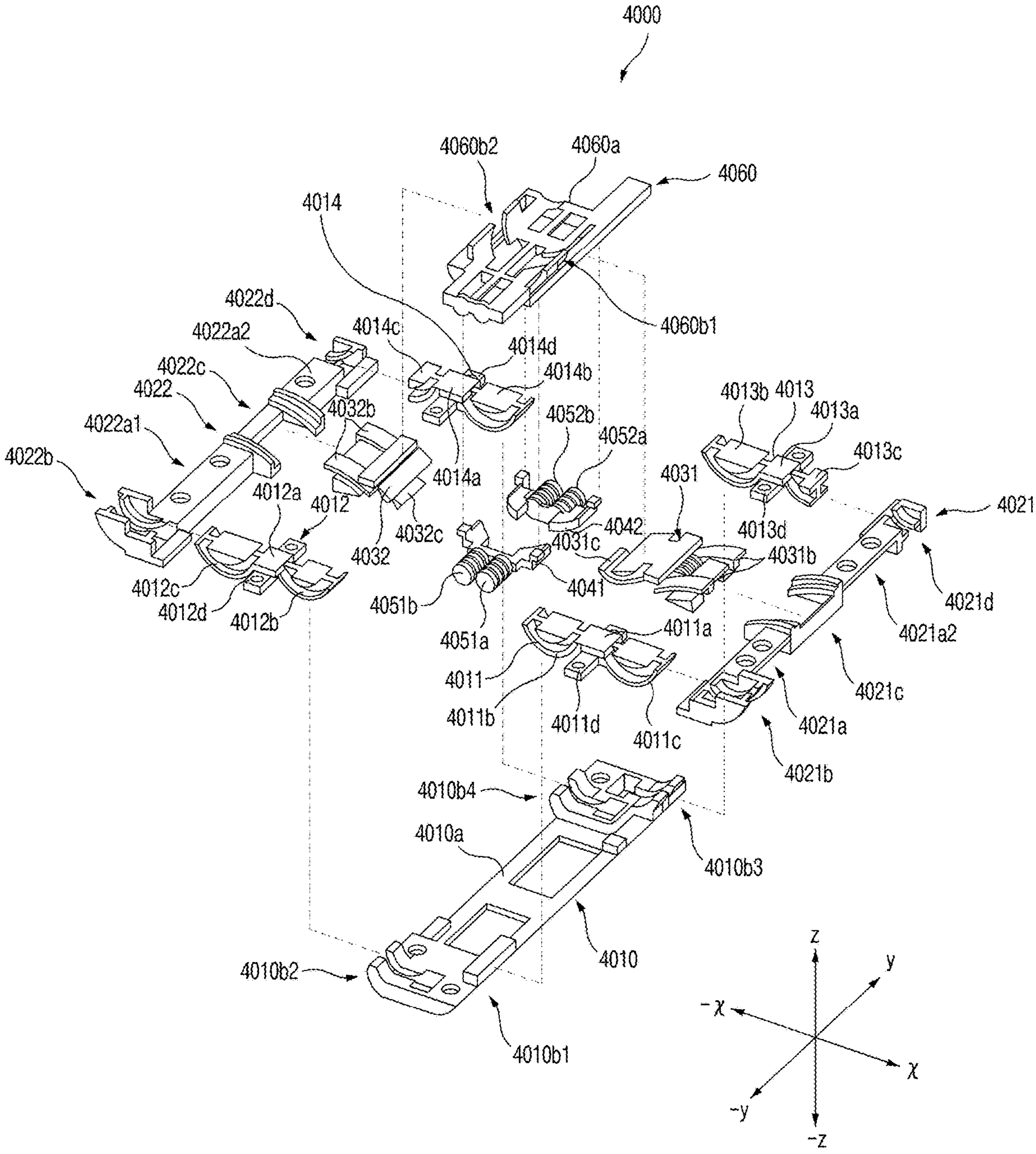
FIG. 40 is an exploded perspective view of the third type hinge structure according to an embodiment as viewed in the first direction.
Figure 41:
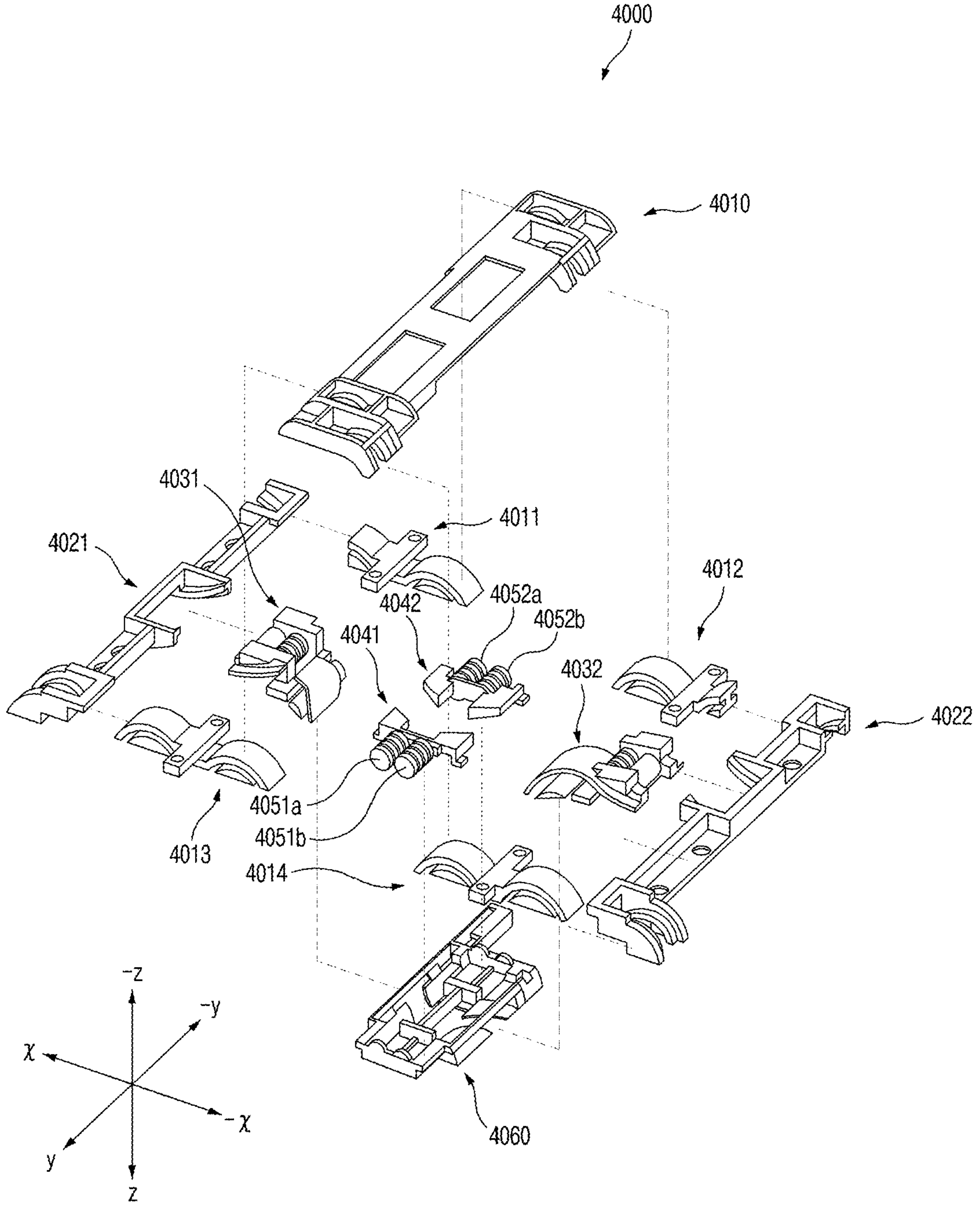
FIG. 41 is an exploded perspective view of the third type hinge structure according to an embodiment as viewed in the second direction.

FIG. 38 is a view illustrating one example of another type electronic device according to an embodiment, and FIG. 39 is a view illustrating one example of a third type hinge structure applied to the other type electronic device of FIG. 38. FIG. 40 is an exploded perspective view of the third type hinge structure according to an embodiment as viewed in the first direction, and FIG. 41 is an exploded perspective view of the third type hinge structure according to an embodiment as viewed in the second direction.

Referring to FIGS. 38 to 41, the electronic device 3800 according to an embodiment includes a first housing 3810, a second housing 3820, a hinge housing 3850, hinge structures **4000*a*, 4000*b*, and 4000*c*, and a display 3860**.

Similarly to the display 3860 described above with reference to FIG. 1, the display 3860 may be formed such that the length in the y-axis direction is longer than the length in the x-axis direction and may have a folded state (close) or an unfolded state (open) in the x-axis or −x-axis direction with respect to one point in the y-axis direction. The display 3860 may include a first region 3861 supported by the first housing 3810, a second region 3862 supported by the second housing 3820, and a third region 3863 (or, a third region) disposed between the first region 3861 and the second region 3862. A lattice pattern may be formed on at least a portion of the rear surface of the third region 3863 of the display 3860. The third region 3863 may have a flat state or a water-drop shape in response to the folded state (close) or the unfolded state (open) of the electronic device 3800. The display 3860 may be formed of any one of the various display types described above with reference to FIGS. 2 and 3.

The electronic device 3800 may include wing plates 3831 and 3832. The wing plates 3831 and 3832 may be disposed between the rear surface of the display 3860 (e.g., the third region 3863) and the hinge structures **4000*a*, 4000*b*, and 4000*c* and may include the first wing plate 3831 disposed long in the y-axis direction and the second wing plate 3832 disposed in parallel with the first wing plate 3831. One edge (e.g., the y-axis edge) of each of the wing plates 3831 and 3832 may be fixed to the first hinge structure 4000*a*, an opposite edge (e.g., the −y-axis edge) of each of the wing plates 3831 and 3832 may be fixed to the second hinge structure 4000*b*, and a central region of each of the wing plates 3831 and 3832 may be fixed to the third hinge structure 4000*c*. Edges of the wing plates 3831 and 3832 (e.g., the −x-axis edge of the first wing plate 3831 and the x-axis edge of the second wing plate 3832) may be adjacent to each other when the electronic device 3800 is in the unfolded state (open) and may be spaced apart from each other when the electronic device 3800 is in the folded state (close). The wing plates 3831 and 3832 may support the rear surface of the third region 3863 of the display 3860 while a state of the electronic device 3800** is changed.

An arrangement of the first housing 3810 and the second housing 3820 may vary depending on the folded state (close) or the unfolded state (open) of the electronic device 3800. For example, when the electronic device 3800 is in the folded state (close), the first housing 3810 and the second housing 3820 may be disposed to face each other, and when the electronic device 3800 is in the unfolded state (open), the first housing 3810 and the second housing 3820 may be disposed to face the same direction. When the electronic device 3800 is in the unfolded state (open), the −x-axis edge of the first housing 3810 and the x-axis edge of the second housing 3820 may be disposed adjacent to each other. Depressions may be formed in at least partial regions of the housing 3810 and 3820 adjacent to each other, and at least the hinge housing 3850 and at least portions of the hinge structures **4000*a*, 4000*b*, and 4000*c* may be seated in the depressions The hinge structures 4000*a*, 4000*b*, and 4000*c* may include, for example, the first hinge structure 4000*a* at least partially seated at the −y-axis edge of the hinge housing 3850, the second hinge structure 4000*b* at least partially seated at the y-axis edge of the hinge housing 3850, and at least one third hinge structure 4000*c* disposed between the first hinge structure 4000*a* and the second hinge structure 4000*b*. The first hinge structure 4000*a* and the second hinge structure 4000*b* may have substantially the same shape and size and may be disposed in different directions. The third type hinge structure 4000 illustrated in FIGS. 39 to 41 may be one of the first hinge structure 4000*a* and the second hinge structure 4000*b* described with reference to FIG. 38**.

The third type hinge structure 4000 may include a fixed bracket 4010, a first rotating member 4011, a second rotating member 4012, a third rotating member 4013, a fourth rotating member 4014, a first link member 4021, a second link member 4022, a first arm member 4031, a second arm member 4032, and an interlocking member 4060.

The fixed bracket 4010 may have a form similar to that of the fixed bracket 210 of the first type hinge structure 200 described above with reference to FIG. 5. When compared to the fixed bracket 210 of the first type hinge structure 200 described with reference to FIG. 5, the fixed bracket 4010 may further include an eleventh rail **4010*b*3 and a twelfth rail 4010*b*4 (or, a third rail of the fixed bracket 4010 and a fourth rail of the fixed bracket 4010), in addition to the fixed bracket 210 of the first type hinge structure 200. According to an embodiment, the fixed bracket 4010 may include a bracket body 4010*a*, a first rail 4010*b*1 that is located in the −y-axis direction from the bracket body 4010*a* and to which the first rotating member 4011 is coupled, a second rail 4010*b*2 that is located in the −y-axis direction from the first rail 4010*b*1 and to which the second rotating member 4012 is coupled, the eleventh rail 4010*b*3 that is located at the y-axis edge symmetrical to the −y-axis edge with respect to the center of the bracket body 4010*a* and to which the third rotating member 4013 (e.g., a seventh rail structure 4013*d* of the third rotating member 4013) is coupled, and the twelfth rail 4010*b*4 that is located in the −y-axis direction from the eleventh rail 4010*b*3 and to which the fourth rotating member 4014 (e.g., a ninth rail structure 4014*b* of the fourth rotating member 4014) is coupled. The first rail 4010*b*1 and the second rail 4010*b*2 may be alternately disposed in the y-axis direction or the −y-axis direction, and the eleventh rail 4010*b*3 and the twelfth rail 4010*b*4 may also be alternately disposed in the y-axis direction or the −y-axis direction. In addition, the fixed bracket 4010 may further include a structure for seating and guiding a first cam member 4041, a second cam member 4042, and elastic members, a structure for seating the first arm member 4031 and the second arm member 4032, and a structure for seating the interlocking member 4060. Description of at least a part of the above-described added structures is replaced with the contents described above with reference to FIG. 5**.

The first rotating member 4011 may include a first rotating body 4011*a*, a first rail structure 4011*b* extending from the first rotating body 4011*a* in the −x-axis direction and fastened to the first rail 4010*b*1 of the fixed bracket 4010, and a second rail structure 4011*c* extending from the first rotating body 4011*a* in the x-axis direction and may further include a first rotation fixing part 4011*d* used to fasten the first rotating member 4011 and the first wing plate 3831. The structure of the first rotating member 4011 may be the same as or similar to the structure of the first rotating member 211 described above with reference to FIG. 5. Similarly, the second rotating member 4012 may include a second rotating body 4012*a*, a third rail structure 4012*b*, and a fourth rail structure 4012*c* and may further include a second rotation fixing part 4012*d* used to couple the second rotating member 4012 and the second wing plate 3832. Furthermore, the third rotating member 4013 may include a third rotating body 4013*a*, the seventh rail structure 4013*d* extending from the third rotating body 4013*a* in the −x-axis direction and fastened to the eleventh rail 4010*b*3 of the fixed bracket 4010, and an eighth rail structure 4013*c* extending from the third rotating body 4013*a* in the x-axis direction and may further include a third rotation fixing part 4013*d* used to fasten the third rotating member 4013 and the first wing plate 3831. In addition, the fourth rotating member 4014 may include a fourth rotating body 4014*a*, the ninth rail structure 4014*b* extending from the fourth rotating body 4014*a* in the x-axis direction and fastened to the twelfth rail 4010*b*4 of the fixed bracket 4010, and a tenth rail structure 4014*c* extending from the fourth rotating body 4014*a* in the −x-axis direction and may further include a fourth rotation fixing part 4014*d* used to fasten the fourth rotating member 4014 and the second wing plate 3832.

All of the first to fourth rotating members 4011, 4012, 4013, and 4014 may have the same shape and size. Alternatively, according to various embodiments, the first and second rotating members 4011 and 4012 may have the same shape and size, and the third and fourth rotating members 4013 and 4014 may have the same shape and size, but may have a form different from that of the first and second rotating members 4011 and 4012. For example, the first rail structure 4011*b* of the first rotating member 4011, the third rail structure 4012*b* of the second rotating member 4012, the seventh rail structure 4013*d* of the third rotating member 4013, and the ninth rail structure 4014*b* of the fourth rotating member 4014 may have the same or similar shape and size. The second rail structure 4011*c* of the first rotating member 4011 and the fourth rail structure 4012*c* of the second rotating member 4012 may have the same or similar shape and size. The eighth rail structure 4013*c* of the third rotating member 4013 and the tenth rail structure 4014*c* of the fourth rotating member 4014 may have the same or similar shape and size, but may have a different shape and size from the second rail structure 4011*c* or the fourth rail structure 4012*c*. For example, the eighth rail structure 4013*c* and the tenth rail structure 4014*c* may have a size corresponding to half of the second rail structure 4011*c* or the fourth rail structure 4012*c*. Correspondingly, the third rail 4021*b* and the fourth rail 4022*b* may have a different size and shape from the eleventh rail 4010*b*3 and the twelfth rail 4010*b*4 (e.g., may have a larger size than the eleventh rail 4010*b*3 and the twelfth rail 4010*b*4).

The first link member 4021 may have a form including an additional structure to the second link member 222 of the first type hinge structure 200 described above with reference to FIG. 9. For example, the first link member 4021 may include a third rail 4021*b*, a first link body 4021*a*1, a fifth rail 4021*c*, a second link body 4021*a*2, and a ninth rail 4021*d*. The first link body 4021*a*1 and the second link body 4021*a*2 may include at least one through-hole used to fix the first link member 4021 to the first housing 3810. The third rail 4021*b* may be coupled with the second rail structure 4011*c* of the first rotating member 4011. The fifth rail 4021*c* may be fastened with a fifth rail structure 4031*b* of the first arm member 4031. The ninth rail 4021*d* may be fastened with the eighth rail structure 4013*c* of the third rotating member 4013.

The second link member 4022 may have a structure similar to that of the first link member 4021. For example, the second link member 4022 may include a fourth rail 4022*b*, a third link body 4022*a*1, a sixth rail 4022*c*, a fourth link body 4022*a*2, and a tenth rail 4022*d*. The third link body 4022*a*1 and the fourth link body 4022*a*2 may include at least one through-hole used to fix the second link member 4022 to the second housing 3820. The fourth rail 4022*b* may be coupled with the fourth rail structure 4012*c* of the second rotating member 4012. The sixth rail 4022*c* may be fastened with a sixth rail structure 4032*b* of the second arm member 4032. The tenth rail 4022*d* may be fastened with the tenth rail structure 4014*c* of the fourth rotating member 4014.

Similarly to the arm members described above with reference to FIGS. 10 and 11, the first arm member 4031 may include a first lower arm structure, a first upper arm structure, and a first arm elastic member. Furthermore, similarly to the first arm member 4031, the second arm member 4032 may include a second lower arm structure, a second upper arm structure, and a second arm elastic member. The first arm member 4031 includes, for example, the fifth rail structure 4031*b* fastened with the fifth rail 4031*b* of the first link member 4021 and a seventh rail 4031*c* fastened with a slide groove of the interlocking member 4060. The second arm member 4032 includes, for example, the sixth rail structure 4032*b* fastened with the sixth rail 4022*c* of the second link member 4022 and an eighth rail 4032*c* fastened with a slide groove of the interlocking member 4060. The seventh rail 4031*c* and the eighth rail 4032*c* may include a curved surface that is bent in the z-axis direction while being formed in a helical shape in an oblique direction.

The interlocking member 4060 may include an interlocking body 4060*a*, a first slide groove 4060*b*1 to which the seventh rail 4031*c* of the first arm member 4031 is fastened, a second slide groove 4060*b*2 to which the eighth rail 4032*c* of the second arm member 4032 is fastened, and holes or recesses in which the first cam member 4041, the second cam member 4042, and elastic members 4051*a*, 4051*b*, 4052*a*, and 4052*b* are seated. The interlocking member 4060 serves to link the first arm member 4031 and the second arm member 4032 while performing a linear motion in the y-axis direction or the −y-axis direction during rotation of the first arm member 4031 and the second arm member 4032 in the counterclockwise and clockwise directions (or, the clockwise and counterclockwise directions). Furthermore, the interlocking member 4060 may move the cam members 4041 and 4042 while moving in the y-axis or −y-axis direction. The cam members 4041 and 4042 moved in the y-axis or −y-axis direction may perform a cam operation with a cam structure formed at the y-axis or −y-axis edge of the seventh rail 4031*c* of the first arm member 4031 and a cam structure formed at the y-axis or −y-axis edge of the eighth rail 4032*c* of the second arm member 4032.

The above-described second type hinge structure 3000 may have a form in which the first type hinge structure 200 described above with reference to FIGS. 1 to 26 includes an additional structure, or may include a form in which a partial structure is modified such that the third rotating member 4013 and the fourth rotating member 4014 are added to the first type hinge structure 200. Accordingly, description of a structure of the third type hinge structure 4000 that is the same as or similar to the first type hinge structure 200 may be replaced with description of the form and function of the structure corresponding to the above-described first type hinge structure 200. Alternatively, at least some of the descriptions of the components of the first type hinge structure 200 described with reference to FIGS. 1 to 26 may be identically or similarly applied to the components of the above-described third type hinge structure 4000.

Figure 42:
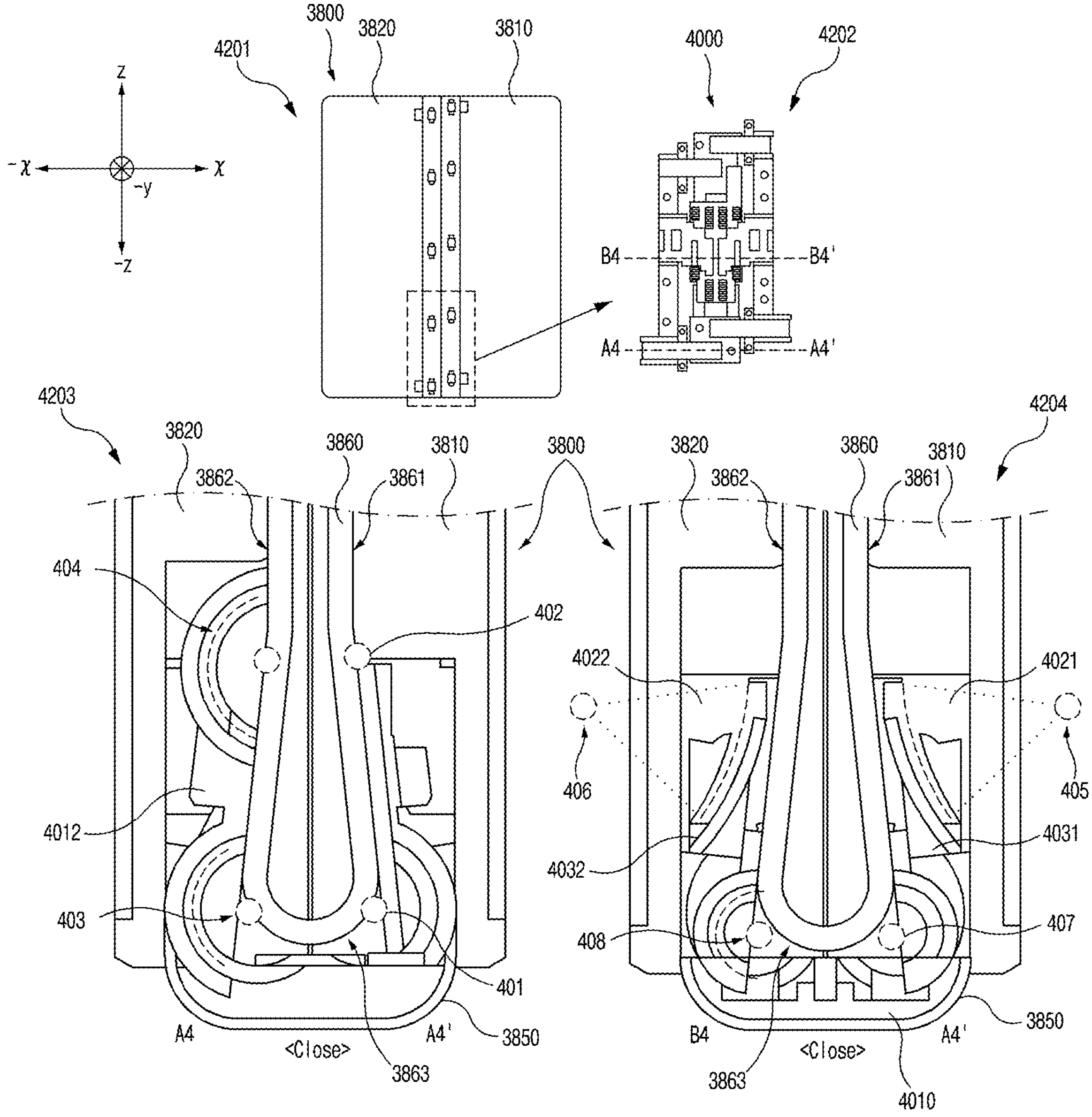
FIG. 42 is a view illustrating one example of forming an axis in a folded state (close) of the electronic device including the third type hinge structure according to an embodiment.
Figure 43:
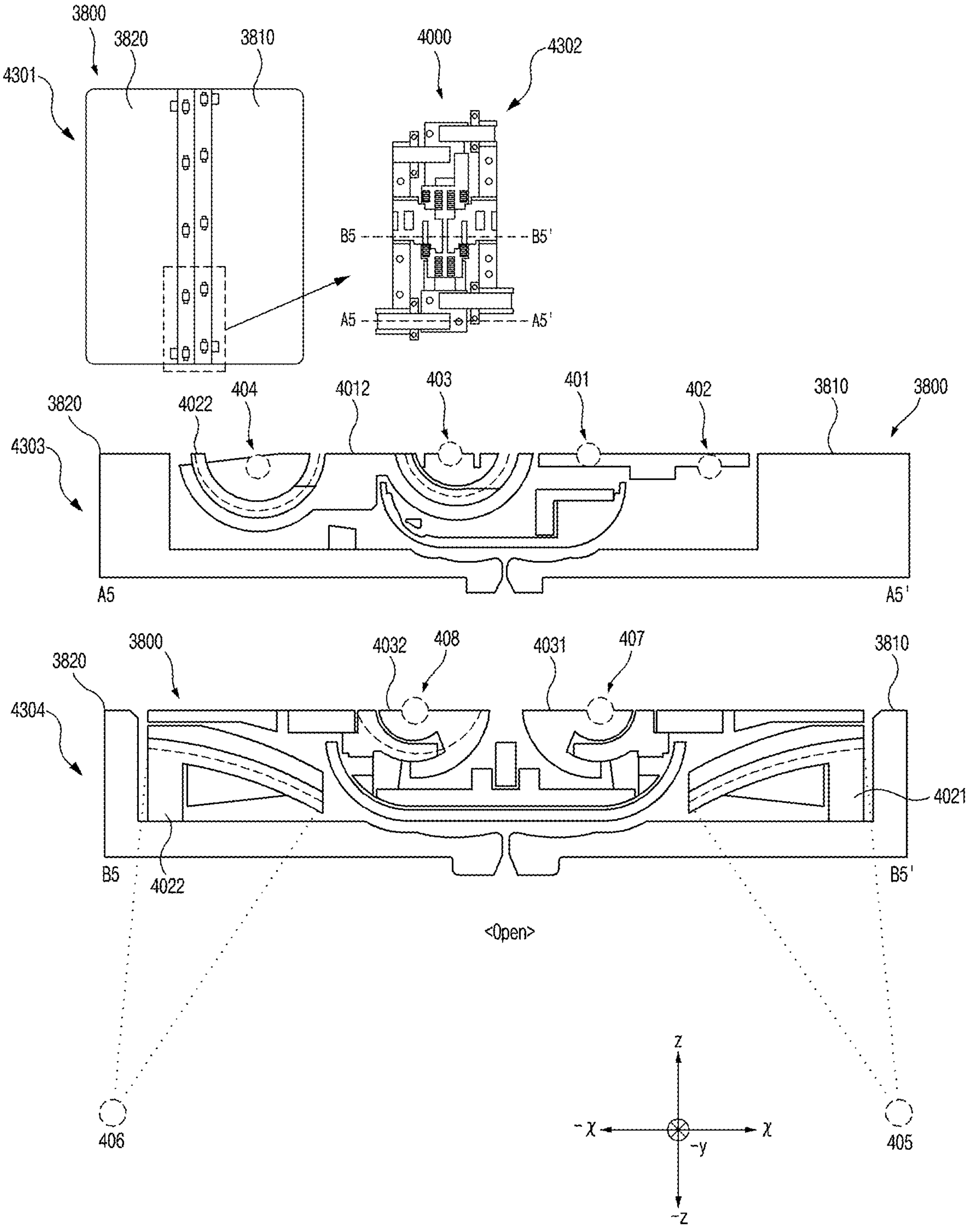
FIG. 43 is a view illustrating one example of forming an axis in an unfolded state (open) of the electronic device including the third type hinge structure according to an embodiment.

FIG. 42 is a view illustrating one example of forming an axis in a folded state (close) of the electronic device including the third type hinge structure according to an embodiment, and FIG. 43 is a view illustrating one example of forming an axis in an unfolded state (open) of the electronic device including the third type hinge structure according to an embodiment. In FIG. 42, FIG. 4201 is a view illustrating one example of a front surface of the housing on which the display is placed when the electronic device including the third type hinge structure is in the unfolded state, FIG. 4202 is a view illustrating one example of the third type hinge structure, FIG. 4203 is a view illustrating one example of a section of the third type hinge structure taken along line A4-A4' when the electronic device is in the folded state, and FIG. 4204 is a view illustrating one example of a section of the third type hinge structure taken along line B4-B4' when the electronic device is in the folded state. In FIG. 43, FIG. 4301 is a view illustrating one example of the front surface of the housing on which the display is placed when the electronic device including the third type hinge structure is in the unfolded state, FIG. 4302 is a view illustrating one example of the third type hinge structure, FIG. 4303 is a view illustrating one example of a section of the third type hinge structure taken along line A5-A5' when the electronic device including the third type hinge structure is in the unfolded state, and FIG. 4304 is a view illustrating one example of a section of the third type hinge structure taken along line B5-B5' when the electronic device including the third type hinge structure is in the unfolded state.

Prior to description, the electronic device 3800 and the third type hinge structure 4000 are illustrated in the unfolded state in FIG. 42. However, for description of axes, the sections taken along lines A4-A4' and B4-B4' illustrate the folded state of the electronic device 2900 or the folded state of the third type hinge structure 4000. FIG. 43 illustrates the sections taken along lines A5-A5' and B5-B5' in a state in which the electronic device 3800 and the third type hinge structure 4000 are unfolded. The positions and relationship of axes about which the components of the hinge structure 4000 illustrated in FIGS. 42 and 43 rotate may be identically or similarly applied to the first type hinge structure 200 described above with reference to FIGS. 1 to 28 or the above-described second type hinge structure 3000. Furthermore, although a form in which the display is removed from the structure of the electronic device to represent the hinge structure is illustrated, a form in which the display 3860 is added is illustrated in the section of the folded state (close).

Referring to FIGS. 38 to 43, depressions may be formed at lower edges (e.g., edges in the −z-axis direction) of the first housing 3810 and the second housing 3820 such that the third type hinge structure 4000 or the hinge housing 3850 is seated therein in the folded state (close) of the electronic device 3800. When pressure is applied to the first housing 3810 and the second housing 3820 in the unfolded state (open) of the electronic device 3800, the first housing 3810 and the second housing 3820 may be changed to the folded state (close). Correspondingly, the first housing 3810 and the second housing 3820 may be disposed side by side in the z-axis direction (or, disposed in the shape of "11"). In the folded state (close) of the electronic device 3800, one surface of the first region 3861 of the display 3860 disposed on the first housing 3810 (e.g., a surface on which a screen is displayed, or a surface facing in the z-axis direction in the unfolded state (open) of the electronic device 3800) and one surface of the second region 3862 disposed on the second housing 3820 (e.g., a surface on which a screen is displayed, or a surface facing in the z-axis direction in the unfolded state (open) of the electronic device 3800) may be disposed to face each other. In the folded state (close) of the electronic device 3800, the third region 3863 of the display 3860 may be disposed to be convex in the −z-axis direction.

At least part of opposite sides of the third region 3863 may be supported by at least part of one surface of the first rotating member 4011 (e.g., a surface facing in the z-axis direction in the unfolded state (open) of the electronic device 3800) and one surface of the second rotating member 4012 (e.g., a surface facing in the z-axis direction in the unfolded state (open) of the electronic device 3800). In addition, at least part of the opposite sides of the third region 3863 may be supported by at least part of surfaces of the third rotating member 4013 and the fourth rotating member 4014. For example, the entire upper surface of the second rail structure 4011*c* of the first rotating member 4011, the entire upper surface of the fourth rail structure 4012*c* of the second rotating member 4012, the entire upper surface of the eighth rail structure 4013*c* of the third rotating member 4013, the entire upper surface of the tenth rail structure 4014*c* of the fourth rotating member 4014, a portion of the upper surface of the first rail structure 4011*b* of the first rotating member 4011, a portion of the upper surface of the third rail structure 4012*b* of the second rotating member 4012, a portion of the upper surface of the seventh rail structure 4013*d* of the third rotating member 4013, and a portion of the upper surface of the ninth rail structure 4014*b* of the fourth rotating member 4014 may support side surfaces of the third region 3863. At least part of the first arm member 4031 and the second arm member 4032 may support a lateral portion (e.g., a flat region) of the third region 3863 through the first wing plate 3831 and the second wing plate 3832.

While the electronic device 3800 is changed from the unfolded state (open) to the folded state (close), the first rail structure 4011*b* of the first rotating member 4011 and the seventh rail structure 4013*d* of the third rotating member 4013 may rotate in place about a first axis 401 (or, a first virtual axis), and the second rail structure 4011*c* of the first rotating member 4011 and the eighth rail structure 4013*c* of the third rotating member 4013 may be moved in the counterclockwise direction. In this process, the second rail structure 4011*c* may rotate or slide with respect to a second axis 402 (or, a second virtual axis) formed in the third rail 4021*b* of the first link member 4021, and the eighth rail structure 4013*c* of the third rotating member 4013 may rotate or slide with respect to the second axis 402 (or, the second virtual axis) formed in the ninth rail 4021*d* of the first link member 4021. While the electronic device 3800 is changed from the unfolded state (open) to the folded state (close), the third rail structure 4012*b* of the second rotating member 4012 and the ninth rail structure 4014*d* of the fourth rotating member 4014 may rotate in place about a third axis 403 (or, a third virtual axis), and the fourth rail structure 4012*c* of the second rotating member 4012 and the tenth rail structure 4014*c* of the fourth rotating member 4014 may be moved in the clockwise direction. In this process, the fourth rail structure 4012*c* may rotate or slide with respect to a fourth axis 404 (or, a fourth virtual axis) formed in the fourth rail 4022*b* of the second link member 4022, and the tenth rail structure 4014*c* may rotate or slide with respect to the fourth axis 404 (or, the fourth virtual axis) formed in the tenth rail 4022*d* of the second link member 4022.

While the electronic device 3800 is changed from the unfolded state (open) to the folded state (close), the fifth rail structure 4031*b* of the first arm member 4031 may rotate (or, slide) in place in the counterclockwise direction with respect to a fifth axis 405 (or, a fifth virtual axis) formed in the fifth rail 4021*c* formed on the first link member 4021 while moving in the counterclockwise direction. While the electronic device 3800 is changed from the unfolded state (open) to the folded state (close), the sixth rail structure 4032*c* of the second arm member 4032 may rotate (or, slide) in place in the clockwise direction with respect to a sixth axis 406 (or, a sixth virtual axis) formed in the sixth rail 4022*c* formed on the second link member 4022 while moving in the clockwise direction. While the electronic device 3800 is changed from the unfolded state (open) to the folded state (close), the seventh rail 4031*c* of the first arm member 4031 may rotate in place in the counterclockwise direction with respect to a seventh axis 407 (or, a seventh virtual axis). While the electronic device 3800 is changed from the unfolded state (open) to the folded state (close), the eighth rail 4032*c* of the second arm member 4032 may rotate in place in the clockwise direction with respect to an eighth axis 408 (or, an eighth virtual axis).

In the folded state (close) of the electronic device 3800, the relationship between the first to eighth axes 401, 402, 403, 404, 405, 406, 407, and 408 may be the same as or similar to the relationship described above with reference to FIG. 33. Similarly, in the unfolded state (open), the first axis 401 and the third axis 403 may be located on the same first xy plane on the xy plane, and the second axis 402 and the fourth axis 404 may be identically located on the second xy plane different from the first xy plane. The fifth axis 405 and the sixth axis 406 may be formed outside the electronic device 3800, and the seventh axis 407 and the eighth axis 408 may be formed inside the electronic device 3800. The fifth axis 405 and the sixth axis 406 may be located on the xy plane that is the same as or different from that of the first axis 401 and the third axis 403, and the distance between the fifth axis 405 and the sixth axis 406 may differ from the distance between the first axis 401 and the third axis 403. For example, the first distance between the first axis 401 and the third axis 403, the second distance between the seventh axis 407 and the eighth axis 408, the third distance between the second axis 402 and the fourth axis 404, and the fourth distance between the fifth axis 405 and the sixth axis 406 may increase in sequence.

Figure 44:
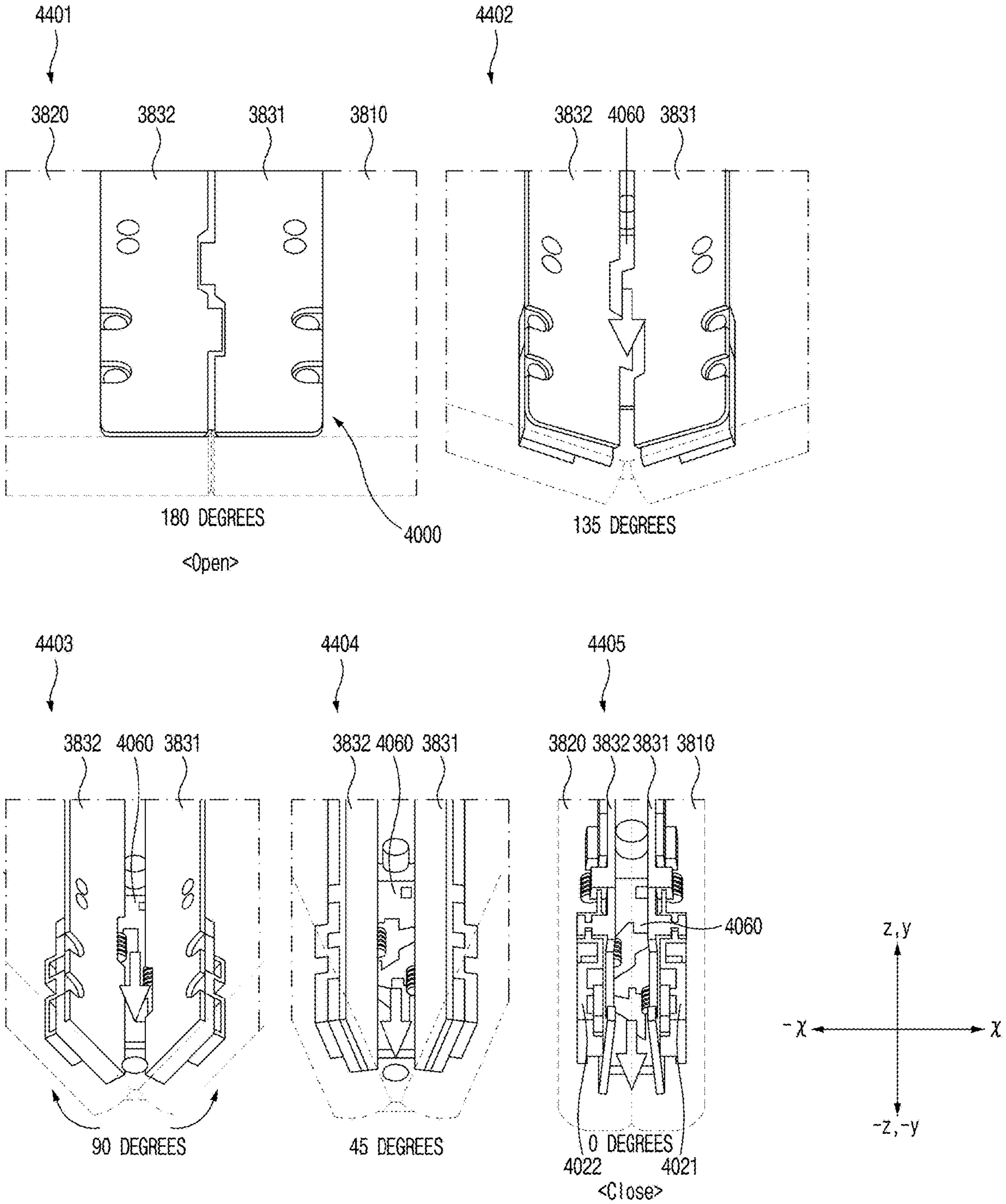
FIG. 44 is a view illustrating one example of movement of an interlocking member of the electronic device according to an embodiment.

FIG. 44 is a view illustrating one example of movement of the interlocking member of the electronic device according to an embodiment.

Referring to FIGS. 38 to 44, the electronic device 3800 includes at least the first housing 3810, the second housing 3820, and at least one hinge structure 4000 connecting the first housing 3810 and the second housing 3820, and the hinge structure 4000 include at least the first arm member 4031, the second arm member 4032. The electronic device 3800 may include the interlocking member 4060. Depending on pressure applied in an unfolded state (open) of state 4401, the first housing 3810 and the second housing 3820 may have various angle states, for example, a 135-degree mounted state in state 4402, a 90-degree mounted state in state 4403, a 45-degree mounted state in state 4404, and a folded state (close) in state 4405.

While the first housing 3810 and the second housing 3820 are changed from the unfolded state (open) to the folded state (close), the first arm member 4031 may rotate in the counterclockwise direction, and the second arm member 4032 may rotate in the clockwise direction. Correspondingly, the interlocking member 4060 coupled to the seventh rail 4031*c* of the first arm member 4031 and the eighth rail 4032*c* of the second arm member 4032 may be gradually moved in the direction from the y-axis to the −y-axis. In contrast, while the first housing 3810 and the second housing 3820 are changed from the folded state (close) to the unfolded state (open), the first arm member 4031 may rotate in the clockwise direction, and the second arm member 4032 may rotate in the counterclockwise direction. Correspondingly, the interlocking member 4060 coupled to the seventh rail 4031*c* of the first arm member 4031 and the eighth rail 4032*c* of the second arm member 4032 may be gradually moved by a specified distance in the direction from the −y-axis to the y-axis. In this regard, the seventh rail 4031*c* and the eighth rail 4032*c* may be provided in an embossed spiral shape, and the slide grooves 4060*b*1 and 4060*b*2 formed in the interlocking member 4060 may be provided in an engraved spiral shape.

Figure 45:
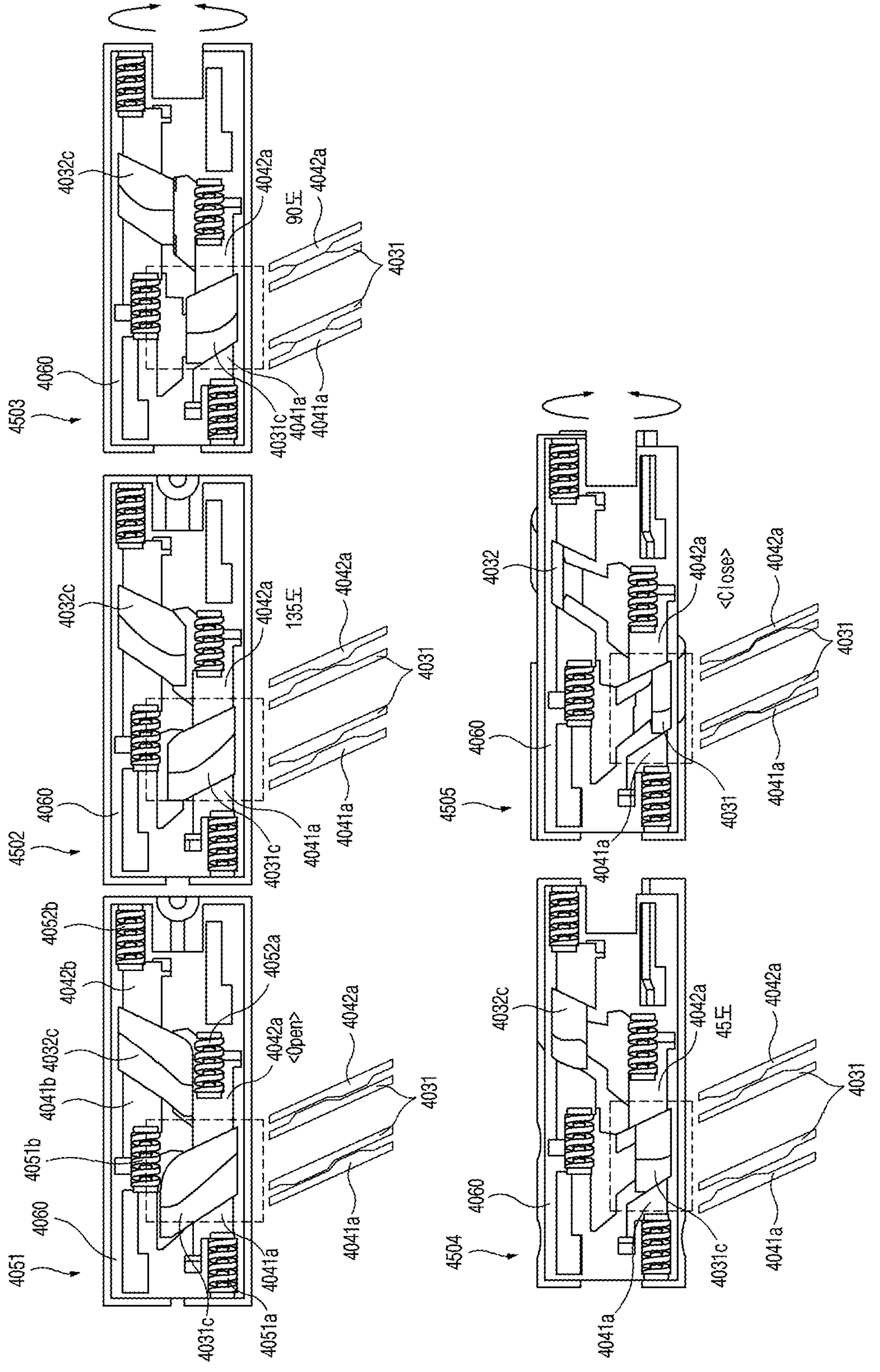
FIG. 45 is a view illustrating one example of a structure related to a cam operation of the electronic device according to an embodiment.

FIG. 45 is a view illustrating one example of a structure related to a cam operation of the electronic device according to an embodiment.

Referring to FIGS. 38 to 45, the structure related to the cam operation of the electronic device 3800 may include at least first to fourth cam members 4041*a*, 4042*a*, 4041*b*, and 4042*b*, the interlocking member 4060, the seventh rail 4031*c* (e.g., the seventh rail 4031*c* of the first arm member 4031 of FIG. 40), and the eighth rail 4032*c* (e.g., the eighth rail 4032*c* of the second arm member 4032 of FIG. 40).

The interlocking member 4060 may include, for example, the interlocking body (e.g., the interlocking body 4060*a* of FIG. 40), the first slide groove (e.g., the first slide groove 4060*b*1 of FIG. 40) to which the first arm member 4031 is fastened, and the second slide groove (e.g., the second slide groove 4060*b*2 of FIG. 40) to which the second arm member 4032 is fastened, and may include a plurality of mounting spaces in which the first to fourth cam members 4041*a*, 4042*a*, 4041*b*, and 4042*b* and the elastic members 4051*a*, 4052*a*, 4051*b*, and 4052*b* are mounted. In the illustrated drawing, in the electronic device 3800, the cam members 4041*a*, 4042*a*, 4041*b*, and 4042*b* may make direct contact with the cam structures formed in the seventh rail 4031*c* of the first arm member 4031 and the eighth rail 4032*c* of the second arm member 4032 (e.g., a structure for a direct cam operation).

A structure of ridges and valleys formed on the seventh rail 4031*c* changes the compression distance of the first elastic member 4051*a* and the second elastic member 4052*a* while being brought into contact with ridges and valleys of the first cam member 4041 and the second cam member 4042 in response to rotation of the first arm member 4031. Correspondingly, torque depending on the compression of the first elastic member 4051*a* and the second elastic member 4052*a* may be increased, and the increased torque may increase the frictional force between the seventh rail 4031*c* and the first cam member 4041 and the second cam member 4042. Similarly, a structure of ridges and valleys formed on the eighth rail 4032*c* changes the compression distance of the third elastic member 4051*b* and the fourth elastic member 4052*b* while being brought into contact with ridges and valleys of the third cam member 4041*b* and the fourth cam member 4042*b* in response to rotation of the second arm member 4032. Correspondingly, torque depending on the compression of the third elastic member 4051*b* and the fourth elastic member 4052*b* may be increased, and the increased torque may increase the frictional force between the eighth rail 4032*c* and the third cam member 4041*b* and the fourth cam member 4042*b*.

Referring to the illustrated drawing, when the contact state between the seventh rail 4031*c* and the first cam member 4041 and the second cam member 4042 is viewed, in state 4501, the ridges of the seventh rail 4031*c* may be disposed to be engaged with the valleys of the first cam member 4041 and the second cam member 4042. When the housings are rotated by external pressure, the first arm member 4031 may rotate, and the seventh rail 4031*c* of the first arm member 4031 may rotate along a spiral path. Correspondingly, as in state 4502, the front portions of the ridges of the seventh rail 4031*c* may be brought into contact with the front portions of the ridges of the first cam member 4041 and the second cam member 4042. When additional pressure is applied, as in state 4503, the central portions of the ridges of the seventh rail 4031*c* may be brought into contact with the central portions of the ridges of the first cam member 4041 and the second cam member 4042. When additional pressure is applied, as in state 4504, the rear portions of the ridges of the seventh rail 4031*c* may be brought into contact with the rear portions of the ridges of the first cam member 4041 and the second cam member 4042. When additional pressure is applied or the applied pressure is released, as in state 4505, the ridges of the seventh rail 4031*c* may be brought into contact with the valleys of the first cam member 4041 and the second cam member 4042.

In state 4501, the electronic device 3800 may have an unfolded state (open). In state 4502, the electronic device 3800 may have a state in which the housings 3810 and 3820 are mounted at 135 degrees. In state 4503, the electronic device 3800 may have a state in which the housings 3810 and 3820 are mounted at 90 degrees. Furthermore, in state 4504, the electronic device 3800 may have a state in which the housings 3810 and 3820 are mounted at 45 degrees, and in state 4505, the electronic device 3800 may have a state in which the housings 3810 and 3820 are folded (close).

In the structure of FIG. 45 described above, the seventh rail 4031*c* and the eighth rail 4032*c* are alternately disposed. However, the disclosure is not limited thereto. For example, the seventh rail 4031*c* and the eighth rail 4032*c* may be co-phased on the y-axis as illustrated in FIG. 41 or 42. In this case, the cam members may be disposed to be symmetrical to each other with respect to the y-axis. However, in the case in which the seventh rail 4031*c* and the eighth rail 4032*c* are alternately disposed and co-phased as in FIG. 45, when the seventh rail 4031*c* and the eighth rail 4032*c* rotate, collision or contact may not be considered, and thus the rails may be made more compact than the form in which the rails are arranged in the same phase. Or, torque may be increased by making the seventh rail 4031*c* and the eighth rail 4032*c* larger and the cam structure larger.

Meanwhile, in the above description, the structure including all of the various components has been exemplified to describe the folding operation and the unfolding operation of the foldable electronic device, but the disclosure is not limited thereto. For example, some configurations of at least some of the electronic devices described with reference to FIGS. 1 to 45 may be omitted. For example, the remaining components (e.g., a structure for a cam operation and a structure for interlocking) of the foldable electronic device other than the form in which one side of the hinge structure operates using four axes (or, virtual axes) and the other side of the hinge structure operates using four other axes (or, virtual axes) may be selectively added or may be replaced with other components. For example, the structure for the cam operation may be omitted, or a larger number of cam members and cam structures than mentioned in the above description may be applied. Furthermore, the slide groove formed on the arm member and the interlocking member having the wing moving along the slide groove are mentioned in relation to the interlocking structure of the foldable electronic device. However, the corresponding structure may be omitted or may be replaced with another structure, for example, a gear interlocking structure. Alternatively, depending on a point of view, at least one slide groove formed on an arm member and at least one interlocking member having at least one wing moving along the at least one slide groove may be understood as main components, and the remaining components, for example, a structure for eight axes for a water-drop structure (or, a dumbbell structure) of a folding region of a display and a structure for supporting a cam operation may be understood as optional components. In this case, a structure for folding the center of the display may adopt a U-shaped structure or a wedge-shaped structure, and a rotation structure using a real axis (e.g., a shaft) may be applied using less than eight virtual axes, for example, two virtual axes. As described above, in view of a specific structure of the disclosure, at least some of the other structures for the foldable electronic device may be omitted or modified.

In the above description, the electronic devices including the first to third type hinge structures, respectively, have been exemplified. However, the disclosure is not limited thereto. For example, different types of hinge structures may be disposed in one electronic device. For example, in one electronic device, the first type hinge structure and the second type hinge structure may be disposed, the second type hinge structure and the third type hinge structure may be disposed, the first type hinge structure and the third type hinge structure may be disposed, or the first type hinge structure, the second type hinge structure, and the third type hinge structure may be disposed. In addition, at least one hinge structure (e.g., 200*c*) including only rotating members may be additionally disposed in an electronic device including at least one of the first to third type hinge structures.

According to at least one embodiment among the above-described various embodiments, a foldable electronic device includes a display, a first housing and a second housing in which at least a portion of the display is accommodated, a hinge structure that connects the first housing and the second housing, and a hinge housing in which the hinge structure is seated. The hinge structure according to an embodiment includes a fixed bracket that is fixed to the hinge housing and that includes a first rail and a second rail, a first rotating member including a first rail structure inserted into the first rail and a second rail structure that extends from the first rail structure, a second rotating member including a third rail structure inserted into the second rail and a fourth rail structure that extends from the third rail structure, a first link member including a portion coupled with the first housing and a third rail coupled with the second rail structure, a second link member that is coupled with the second housing and that includes a fourth rail coupled with the fourth rail structure, a first arm member including a fifth rail structure fastened with a fifth rail disposed adjacent to the third rail of the first link member, and a second arm member including a sixth rail structure fastened with a sixth rail disposed adjacent to the fourth rail of the second link member. The first arm member according to an embodiment includes a seventh rail disposed at a position extending from the fifth rail structure, and the second arm member includes an eighth rail disposed at a position extending from the sixth rail structure.

According to an embodiment, the foldable electronic device may further include a first wing plate that is coupled to the first rotating member and that supports a first portion of a folded region of the display and a second wing plate that is coupled to the second rotating member and that supports a second portion of the folded region of the display.

According to an embodiment, when the foldable electronic device is in a folded state, the display may include a folding region convex in a direction of the gravity and a first region and a second region that are connected with the folding region and that face each other. The first wing plate may support a flat first region of the folding region, and the second wing plate may be disposed to support a flat second region of the folding region.

According to an embodiment, the first rotating member and the second rotating member may be disposed to form a specified included angle with respect to a direction viewed from the front of the display when the foldable electronic device is in a folded state.

According to an embodiment, the first arm member and the second arm member may be disposed to form the included angle when the foldable electronic device is in the folded state.

According to an embodiment, the foldable electronic device may further include an interlocking member that is coupled with the seventh rail of the first arm member and the eighth rail of the second arm member and that performs a linear motion while the first arm member and the second arm member perform a rotary motion.

According to an embodiment, the interlocking member may include a first interlocking wing coupled with the seventh rail, a second interlocking wing coupled with the eighth rail, and a support part placed on the fixed bracket.

According to an embodiment, the foldable electronic device may further include at least one elastic member mounted on one side of the interlocking member and at least one cam member coupled to the at least one elastic member, and the first arm member and the second arm member may include cam structures that make contact with the cam member.

According to an embodiment, the first rail structure of the first rotating member may rotate in place about a first axis in a clockwise or counterclockwise direction, and the second rail structure of the first rotating member may move in the clockwise or counterclockwise direction and may rotate about a second axis within the third rail.

According to an embodiment, the third rail structure of the second rotating member may rotate in place about a third axis in the clockwise or counterclockwise direction, and the fourth rail structure of the second rotating member may move in the clockwise or counterclockwise direction and may rotate about a fourth axis within the fourth rail.

According to an embodiment, the fifth rail structure of the first arm member may move in the clockwise or counterclockwise direction and may rotate about a fifth axis within the fifth rail, and the sixth rail structure of the second arm member may move in the clockwise or counterclockwise direction and may rotate about a sixth axis within the sixth rail.

According to an embodiment, the seventh rail of the first arm member may rotate in place about a seventh axis in the clockwise or counterclockwise direction, and the eighth rail of the second arm member may rotate in place about an eighth axis in the clockwise or counterclockwise direction.

According to an embodiment, a distance between the first axis and the third axis may be shorter than a distance between the seventh axis and the eighth axis.

According to an embodiment, the fifth axis and the sixth axis are formed outside the foldable electronic device when the foldable electronic device is in a folded state or an unfolded state.

According to an embodiment, the foldable electronic device may further include a support layer including a plurality of lattice pattern regions. The plurality of lattice pattern regions may include a first lattice pattern region disposed in a convex region in a folding region of the display having a convex shape in a direction of the gravity and a second lattice pattern region and a third lattice pattern region disposed in a region having a curvature opposite to a curvature of the convex region.

According to an embodiment, the foldable electronic device may further at least one elastic member mounted on the fixed bracket and at least one cam member coupled to the at least one elastic member. The first arm member and the second arm member may include cam structures that make contact with the cam member.

According to at least one embodiment among the above-described various embodiments, a hinge structure includes a fixed bracket including a first rail and a second rail, a first rotating member including a first rail structure inserted into the first rail and a second rail structure that extends from the first rail structure, a second rotating member including a third rail structure inserted into the second rail and a fourth rail structure that extends from the third rail structure, a first link member including a portion coupled with the first housing and a third rail coupled with the second rail structure, a second link member that is coupled with the second housing and that includes a fourth rail coupled with the fourth rail structure, a first arm member including a fifth rail structure fastened with a fifth rail disposed adjacent to the third rail of the first link member, and a second arm member including a sixth rail structure fastened with a sixth rail disposed adjacent to the fourth rail of the second link member. Here, the first arm member according to an embodiment includes a seventh rail disposed at a position extending from the fifth rail structure, and the second arm member includes an eighth rail disposed at a position extending from the sixth rail structure.

According to an embodiment, the hinge structure may further include a first wing plate coupled to the first rotating member and a second wing plate coupled to the second rotating member. When the first wing plate and the second wing plate are in a folded state, a separation distance between lower portions of the first wing plate and the second wing plate in a direction of the gravity may be greater than a separation distance between upper portions of the first wing plate and the second wing plate.

According to an embodiment, when the hinge structure is in a folded state, the first rotating member and the second rotating member may be disposed to form a specified included angle, and when the hinge structure is in the folded state, the first arm member and the second arm member may be disposed to form the included angle.

According to an embodiment, the hinge structure may further include an interlocking member that is coupled with the seventh rail of the first arm member and the eighth rail of the second arm member and that performs a linear motion while the first arm member and the second arm member perform a rotary motion.

In addition, in the above description, the structure related to the rotary motion has been described as the rail or the rail structure. However, the disclosure is not limited to the terms, and a term assigned to the corresponding component may be changed depending on a point of view. For example, the rail may include a protrusion that protrudes in a direction protruding from a flat sidewall surface (or, a bottom surface) (or, in a direction rising from the bottom surface) and has a curved or arc-shaped cross-section. The rail structure may include a structure in which arc-shaped protrusions are arranged to be spaced apart from each other by a predetermined gap and thus an arc-shaped empty space is formed between the protrusions. Accordingly, the rail structure may rotate or slide along the rail when fastened to the rail and rotated by external pressure. Meanwhile, the term of the above-described rail or rail structure may be read differently depending on a point of view, but the disclosure is not limited thereto. That is, the rail or the rail structure may be disposed in different structures for operation thereof. In this case, one of the rail and the rail structure may be formed in the different structures, or at least a portion may be formed as the rail and the remaining portion may be formed as the rail structure.

The invention claimed is:

1. A foldable electronic device comprising:

a display;

a first housing and a second housing in which at least a portion of the display is accommodated;

a hinge structure configured to connect the first housing and the second housing; and a hinge housing in which the hinge structure is seated, wherein the hinge structure includes:

a fixed bracket fixed to the hinge housing, the fixed bracket including a first rail and a second rail, a first rotating member including a first rail structure inserted into the first rail and a second rail structure configured to extend from the first rail structure, a second rotating member including a third rail structure inserted into the second rail and a fourth rail structure configured to extend from the third rail structure, a first link member including a portion coupled with the first housing and a third rail coupled with the second rail structure, a second link member coupled with the second housing, the second link member including a fourth rail coupled with the fourth rail structure, a first arm member including a fifth rail structure fastened with a fifth rail disposed adjacent to the third rail of the first link member, and a second arm member including a sixth rail structure fastened with a sixth rail disposed adjacent to the fourth rail of the second link member, wherein the first arm member includes a seventh rail disposed at a position extending from the fifth rail structure, and wherein the second arm member includes an eighth rail disposed at a position extending from the sixth rail structure.

2. The foldable electronic device of claim 1, further comprising:

a first wing plate coupled to the first rotating member and configured to support a first portion of a folded region of the display; and a second wing plate coupled to the second rotating member and configured to support a second portion of the folded region of the display.

3. The foldable electronic device of claim 2, wherein when the foldable electronic device is in a folded state, the display includes a folding region convex in a direction of the gravity and a first region and a second region connected with the folding region and configured to face each other, wherein the first wing plate supports a flat first region of the folding region, and wherein the second wing plate is disposed to support a flat second region of the folding region.

4. The foldable electronic device of claim 1, wherein the first rotating member and the second rotating member are disposed to form a specified included angle with respect to a direction viewed from the front of the display when the foldable electronic device is in a folded state.

5. The foldable electronic device of claim 4, wherein the first arm member and the second arm member are disposed to form the included angle when the foldable electronic device is in the folded state.

6. The foldable electronic device of claim 1, further comprising:

an interlocking member coupled with the seventh rail of the first arm member and the eighth rail of the second arm member and configured to perform a linear motion while the first arm member and the second arm member perform a rotary motion.

7. The foldable electronic device of claim 6, wherein the interlocking member includes:

a first interlocking wing coupled with the seventh rail;

a second interlocking wing coupled with the eighth rail; and a support part placed on the fixed bracket.

8. The foldable electronic device of claim 6, further comprising:

at least one elastic member mounted on one side of the interlocking member; and at least one cam member coupled to the at least one elastic member, wherein the first arm member and the second arm member include cam structures configured to make contact with the cam member.

9. The foldable electronic device of claim 1, wherein the first rail structure of the first rotating member rotates in place about a first axis in a clockwise or counterclockwise direction, and wherein the second rail structure of the first rotating member moves in the clockwise or counterclockwise direction and rotates about a second axis within the third rail.

10. The foldable electronic device of claim 9, wherein the third rail structure of the second rotating member rotates in place about a third axis in the clockwise or counterclockwise direction, and wherein the fourth rail structure of the second rotating member moves in the clockwise or counterclockwise direction and rotates about a fourth axis within the fourth rail.

11. The foldable electronic device of claim 10, wherein the fifth rail structure of the first arm member moves in the clockwise or counterclockwise direction and rotates about a fifth axis within the fifth rail, and wherein the sixth rail structure of the second arm member moves in the clockwise or counterclockwise direction and rotates about a sixth axis within the sixth rail.

12. The foldable electronic device of claim 11, wherein the seventh rail of the first arm member rotates in place about a seventh axis in the clockwise or counterclockwise direction, and wherein the eighth rail of the second arm member rotates in place about an eighth axis in the clockwise or counterclockwise direction.

13. The foldable electronic device of claim 12, wherein a distance between the first axis and the third axis is shorter than a distance between the seventh axis and the eighth axis, and wherein the fifth axis and the sixth axis are formed outside the foldable electronic device.

14. The foldable electronic device of claim 1, further comprising:

a support layer including a plurality of lattice pattern regions, wherein the plurality of lattice pattern regions include:

a first lattice pattern region disposed in a convex region in a folding region of the display having a convex shape in a direction of the gravity, and a second lattice pattern region and a third lattice pattern region disposed in a region having a curvature opposite to a curvature of the convex region.

15. The foldable electronic device of claim 1, further comprising:

at least one elastic member mounted on the fixed bracket; and at least one cam member coupled to the at least one elastic member, wherein the first arm member and the second arm member include cam structures configured to make contact with the cam member.

* * * * *